(12) United States Patent
Uehara et al.

(10) Patent No.: US 12,270,974 B1
(45) Date of Patent: Apr. 8, 2025

(54) IMAGE FORMING LENS

(71) Applicant: MEJIRO 67 INC., Tokyo (JP)

(72) Inventors: Makoto Uehara, Tokyo (JP); Kouhei Nakamura, Tokyo (JP)

(73) Assignee: MEJIRO 67 INC., Tokyo (JP)

( * ) Notice: Subject to any disclaimer, the term of this patent is extended or adjusted under 35 U.S.C. 154(b) by 0 days.

(21) Appl. No.: 18/839,730

(22) PCT Filed: May 18, 2023

(86) PCT No.: PCT/JP2023/018580
§ 371 (c)(1),
(2) Date: Aug. 20, 2024

(87) PCT Pub. No.: WO2023/234051
PCT Pub. Date: Dec. 7, 2023

(30) Foreign Application Priority Data

Jun. 1, 2022 (JP) ................................ 2022-089667

(51) Int. Cl.
*G02B 13/00* (2006.01)
*H04N 23/55* (2023.01)

(52) U.S. Cl.
CPC ....... *G02B 13/0045* (2013.01); *G02B 13/006* (2013.01); *H04N 23/55* (2023.01)

(58) Field of Classification Search
CPC ...... H04N 23/55; H04N 5/2254; H04N 5/222; G02B 13/006; G02B 13/18; G02B 13/16; G02B 13/0015; G02B 13/0045; G02B 27/0172; G02B 27/0012; G02B 27/0025; G02B 15/146; G02B 9/62; G02B 9/64

(Continued)

(56) References Cited

U.S. PATENT DOCUMENTS

2012/0026609 A1* 2/2012 Kubota ............... G02B 13/02
359/784

FOREIGN PATENT DOCUMENTS

JP 2011107313 6/2011
JP 2016-61903 A 4/2016
(Continued)

OTHER PUBLICATIONS

"Written Opinion" mailed on Jul. 4, 2023 for international application No. PCT/JP2023/018580, international filing date: May 18, 2023.
(Continued)

*Primary Examiner* — Travis S Fissel
(74) *Attorney, Agent, or Firm* — Winston Hsu

(57) ABSTRACT

An imaging lens includes a focusing lens assembly with a positive refractive power, which can move in a direction of an optical axis depending on an object distance and have two positive lens groups with an aperture disposed therebetween, and a fixed lens assembly with a negative refractive power fixed near the imaging plane. The focusing lens assembly includes a 2-division-3-piece front group with positive refractive power consisting of single lens and doublet lenses, the aperture, and a 2-division-3-piece back group with positive refractive power consisting of doublet lenses and single lens. The focusing lens closest to the object side is a meniscus lens convex at the object side and concave at an image side and has the weakest refractive power out of all. The front group and the back group relative to the aperture have focal lengths f1 and f2 complying with correlation of $0.9 < f1/f2 < 1.3$.

20 Claims, 61 Drawing Sheets

(58) Field of Classification Search
USPC ................ 359/714, 656–658, 708, 713, 749, 359/756–762
See application file for complete search history.

(56) References Cited

FOREIGN PATENT DOCUMENTS

| JP | 2016-61919 A | 4/2016 |
| JP | 2018155776 A | 10/2018 |
| JP | 2020118846 A | 8/2020 |

OTHER PUBLICATIONS

"International Search Report" mailed on Jul. 4, 2023 for international application No. PCT/JP2023/018580, international filing date: May 18, 2023.

* cited by examiner

[FIG. 1]

Chart 1 — Equivalent to Fullsize 85.9mm — Embodiment 1

| | Configuration | 4-division-6-piece + Concave (1 Aspheric) |
|---|---|---|
| | | MGauss+Concave |
| | Image Size | 1/1.8inch 9mm φ 7.2×5.4mm |
| | t1 3: Galileo Concave-Cover Glass | 0.2mm |
| | t0[mm] | ∞ |
| | t1 | 7.913 |
| | (F) Combined Focal Length | 18.006 |
| | Magnification | 1/∞ |
| Entirety | Angle of View (Object Side) — Diagonal | ±14.0° |
| | Long Side | ±11.3° |
| | Short Side | ±8.5° |
| | Chief Ray Angle — Diagonal | 27.5° |
| | F Number | 2.80 |
| | 2)Entirety Focus Plane - Front Group Paraxial Focus: Plane | −0.466 |
| | (FR)Radius of Petzval Curvature | 226.195 |
| Focusing Lens Assembly | (fP)Focal Length | 16.295 |
| Negative Fixed Lens | (R1)Radius of Petzval Curvature | −19.584 |
| | ( N ) Concave Focal Length | −12.325 |
| | (FR)Radius of Petzval Curvature | 18.023 |
| Claims | 0.8<dP/F<1.7 | 0.90 |
| | -1.5< f P/f N <-1.1 | |
| | -1.3<R P/RN <-0.9 | |
| | 0.6<D/F<-0.4 | −0.478 |

Embodiment 1 lens data:

| Surf | Radius | Thick | Catalog | Glass Index | Abbe | Semi-Dia |
|---|---|---|---|---|---|---|
| OBJ | Infinity | t0 | | | | |
| 1 | 9.658 | 1.500 | L-BSL7 | 1.5163 | 64.065 | 5.400 |
| 2 | 6.980 | 0.500 | | | | 4.400 |
| 3 | 8.846 | 2.500 | S-FPL51 | 1.4970 | 81.546 | 4.800 |
| 4 | −38.922 | 0.800 | S-NSL36 | 1.5174 | 52.431 | 4.800 |
| 5 | −106.734 | 2.500 | | | | 4.800 |
| STO | Infinity | 0.500 | | | | 2.600 |
| 7 | −12.614 | 0.800 | S-NSL36 | 1.5174 | 52.431 | 2.600 |
| 8 | 6.473 | 3.000 | S-FPL51 | 1.4970 | 81.546 | 4.100 |
| 9 | −10.968 | 3.247 | | | | 4.100 |
| 10 | 28.456 | 1.400 | S-FPM2 | 1.5952 | 67.736 | 4.800 |
| 11 | −40.909 | t11 | | | | 4.800 |
| *12 | −6.698 | 0.800 | L-BAL35 | 1.5891 | 61.153 | 4.000 |
| 13 | Infinity | 0.200 | | | | 5.000 |
| 14 | Infinity | 0.500 | D63TEC | 1.5233 | 54.517 | 5.000 |
| 15 | Infinity | 0.150 | | | | 5.000 |
| IMA | Infinity | | | | | 5.000 |

D=(Virtual) Projection Pupil=-8.6
D/F −0.478

| Surf | Radius | d | D | F | D/F |
|---|---|---|---|---|---|
| *12Aspheric | −6.698 | | | | |
| Wavelength | | 2ndTerm | 4thTerm | 6thTerm | 8thTerm | 10thTerm |
|---|---|---|---|---|---|---|
| Wavelength μm | | 0.000 | 1.4E-03 | -6.09E-05 | 2.74E-06 | -4.365-08 |
| Weight | | | | | | |

| | 0.546 | 1.0 | 0.436 | 0.486 | 0.579 | 0.656 |
| | | | 0.6 | 0.2 | 0.6 | 0.2 |

| Glass Name | L-LAL53 | L-LAL13 | L-BAL35 | L-BSL7 |
|---|---|---|---|---|
| Refraction Index N d | 1.8061 | 1.6935 | 1.5891 | 1.5163 |

| Concave Lens | R1 | R2 | d | dR1 | F | D/F |
|---|---|---|---|---|---|---|
| L-LAL53 | -3.139 | ∞ | 6.33 | -0.778 | 18.000 | -0.444 |
| L-LAL13 | 7.390 | ∞ | 6.6 | -0.893 | 18.006 | -0.464 |
| *L-BAL35* | *-6.698* | ∞ | *6.95* | *-1.038* | *18.006* | *-0.478* |
| L-BSL7 | -6.179 | ∞ | 7.30 | -1.181 | 18.011 | -0.500 |

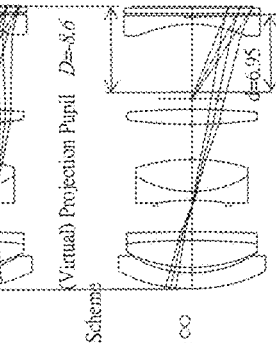

(b) Chief Ray Scheme

Entirety Focus Plane — Spherical — Non-spherical — 26.319mm — (Virtual) Projection Pupil D=-8.6 — t0=∞

[FIG. 2a]
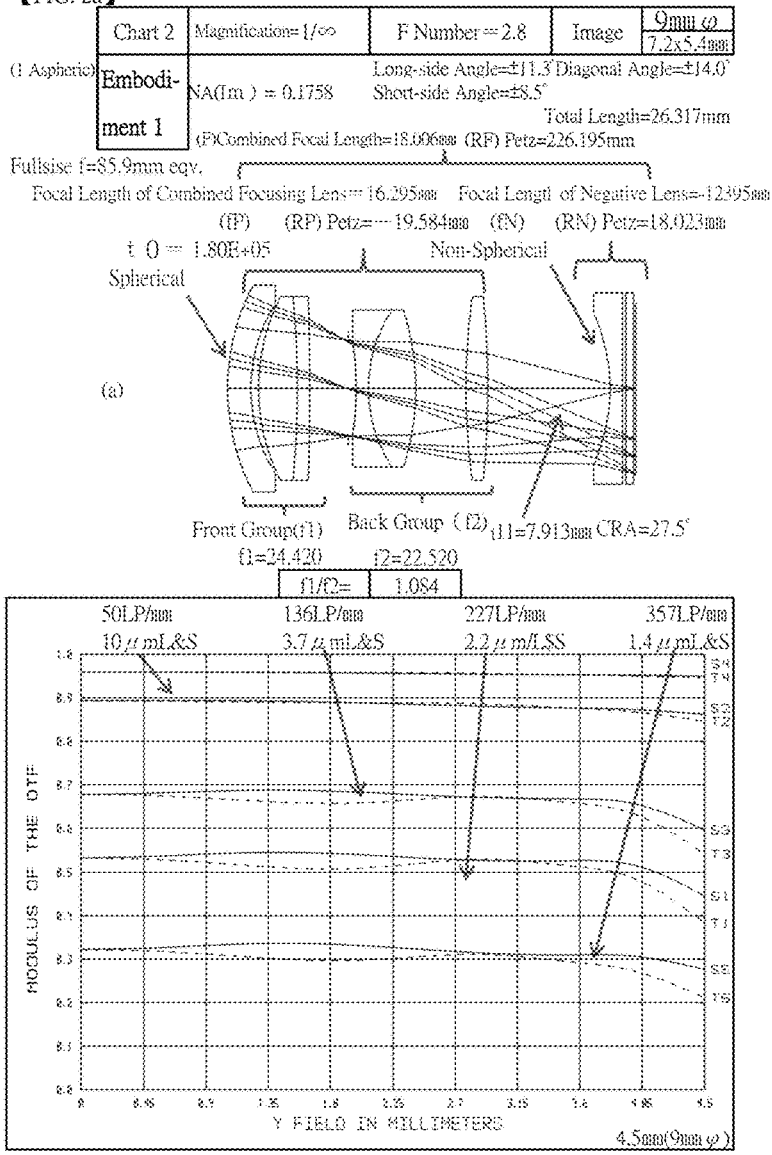
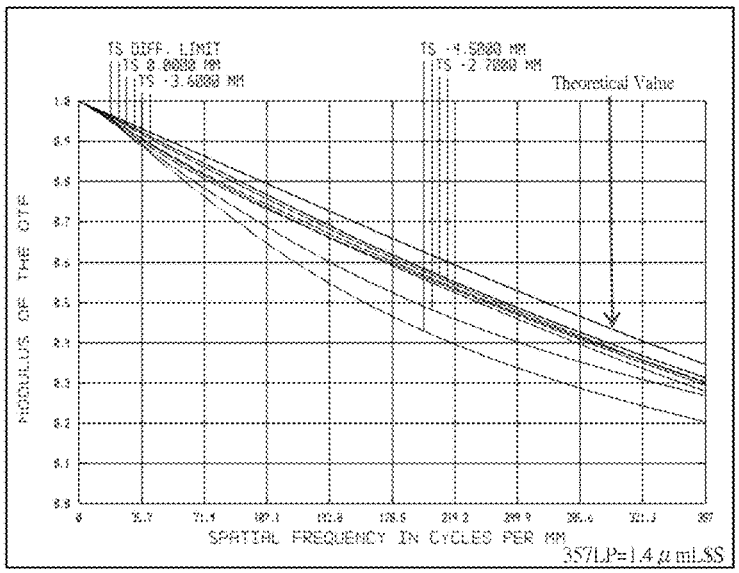

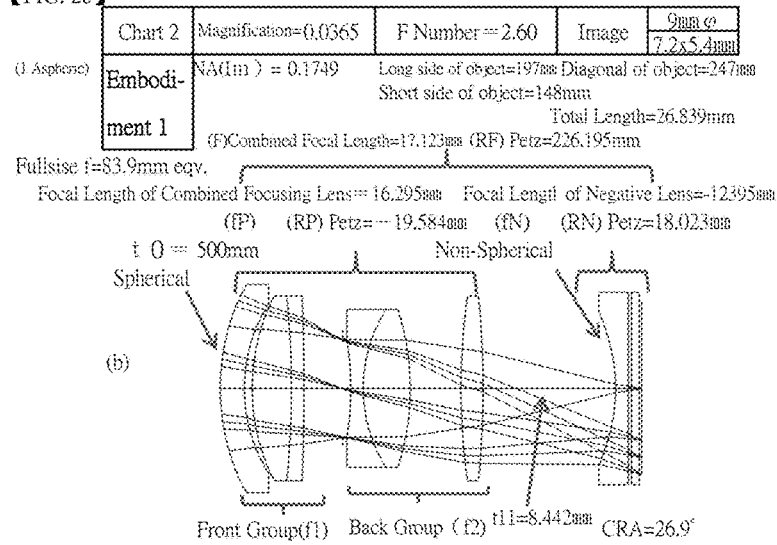
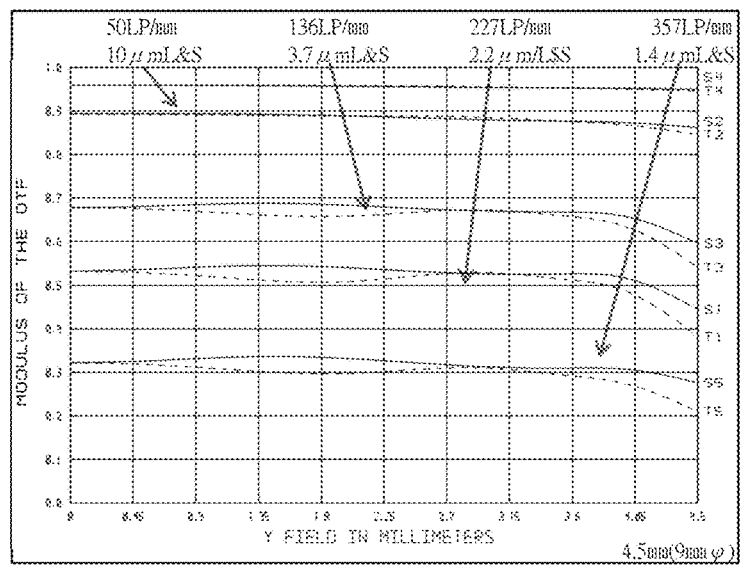
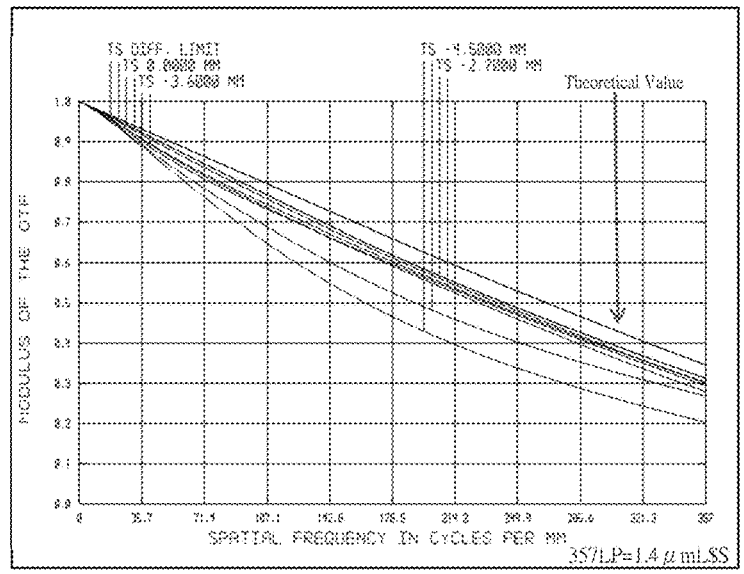

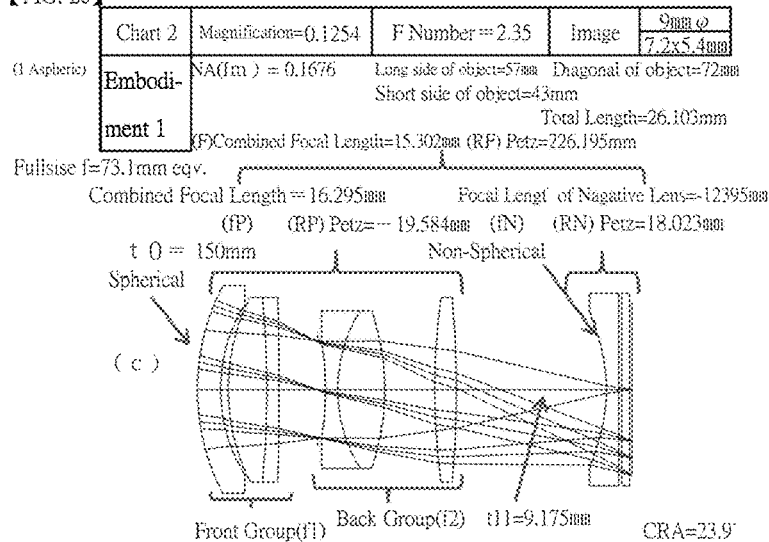
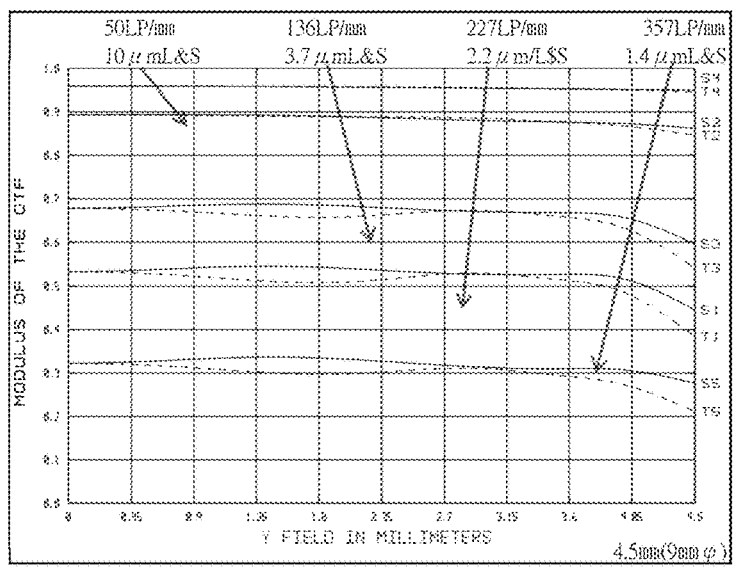
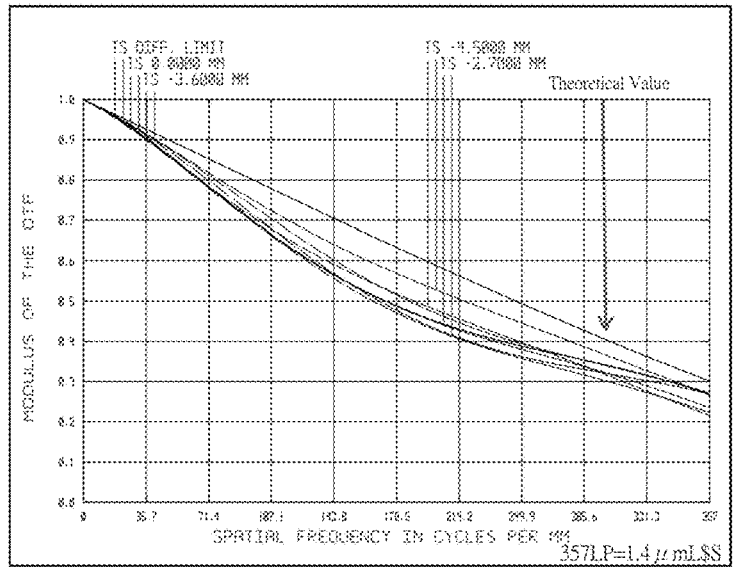

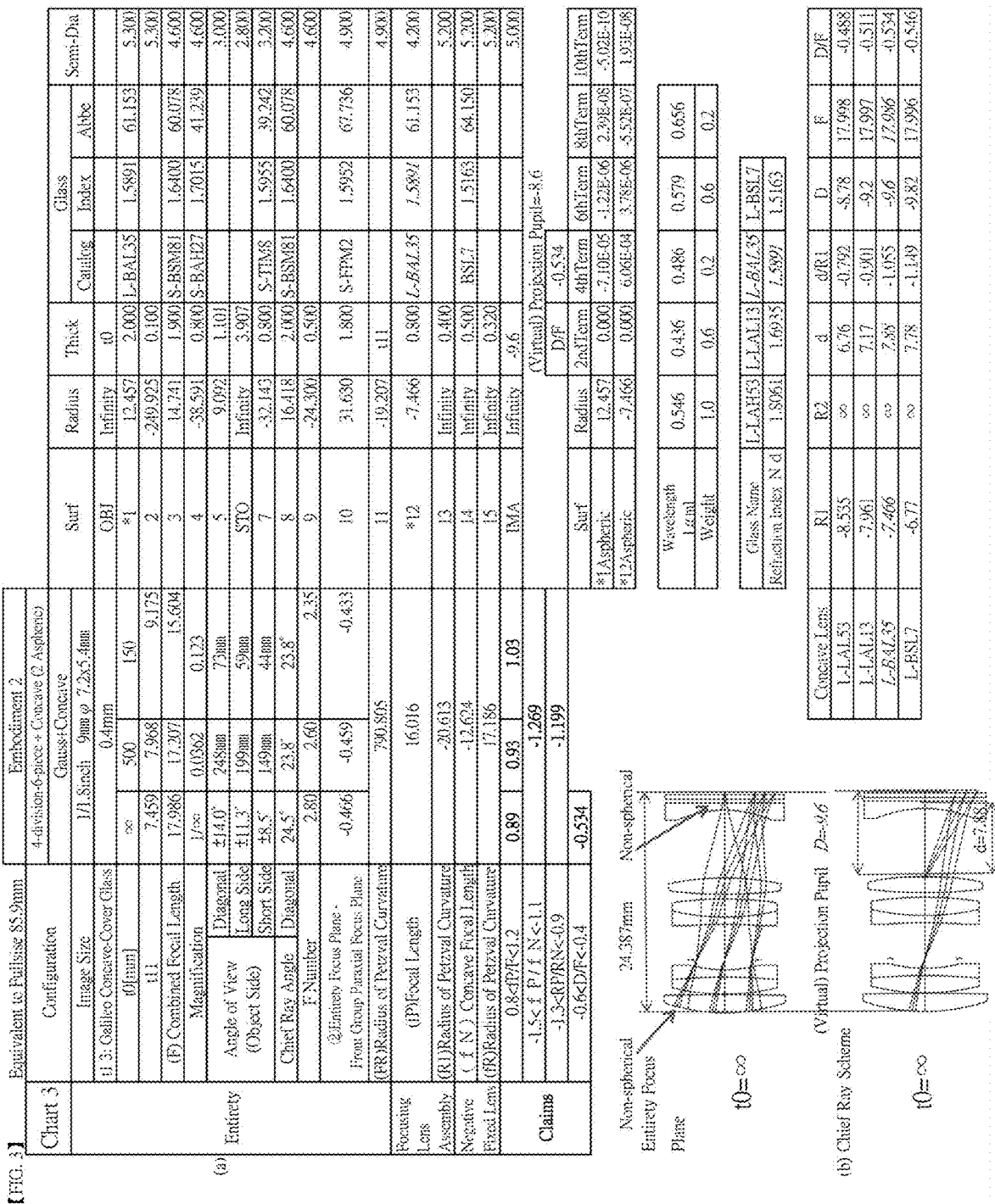
[FIG. 3]

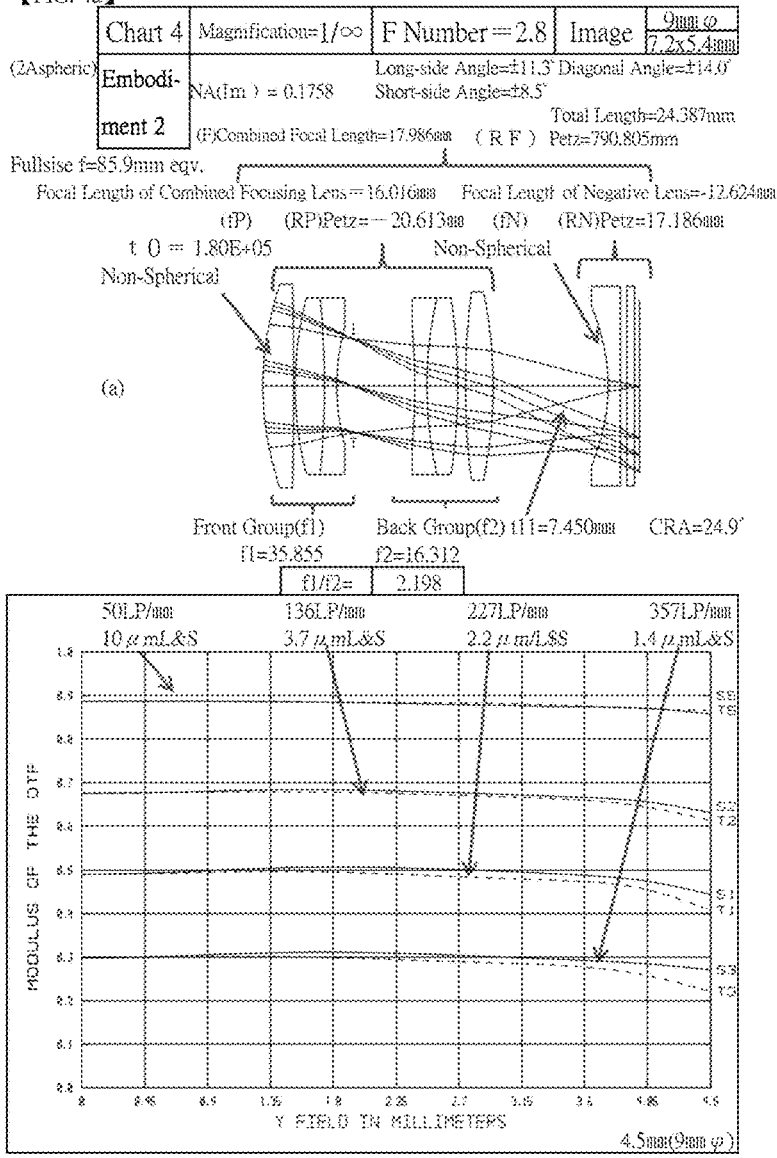
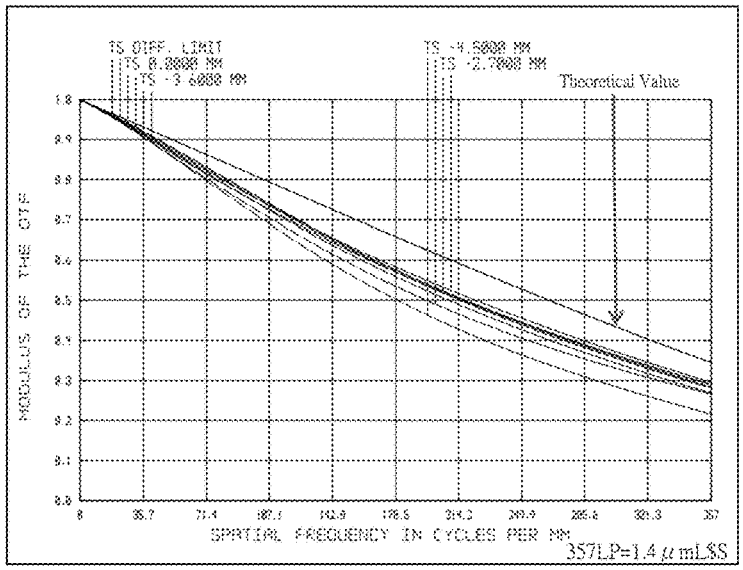
[FIG. 4a]

[FIG. 4b]
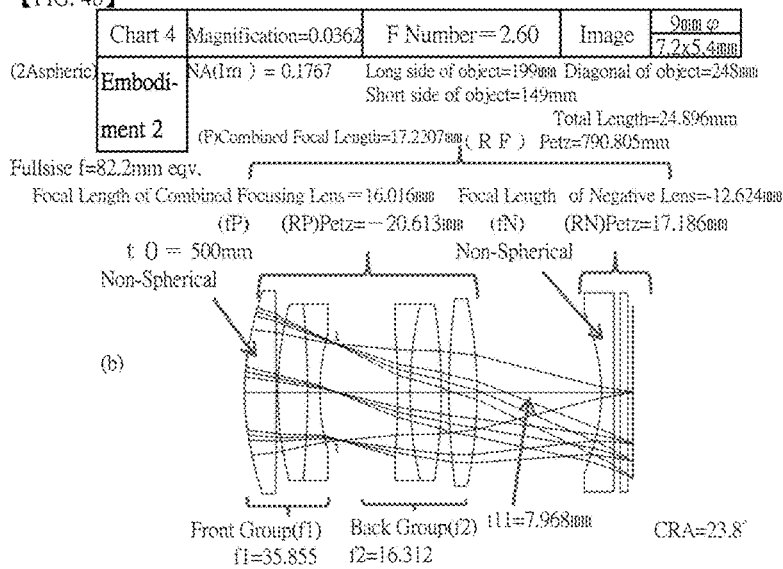
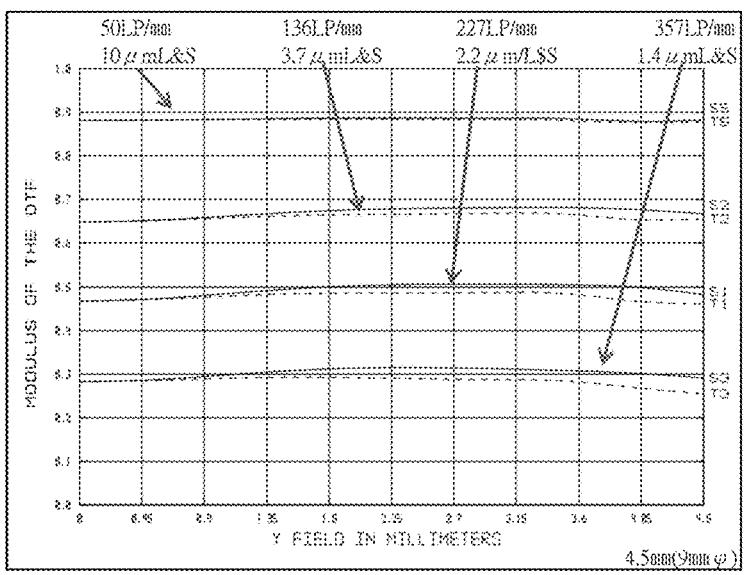
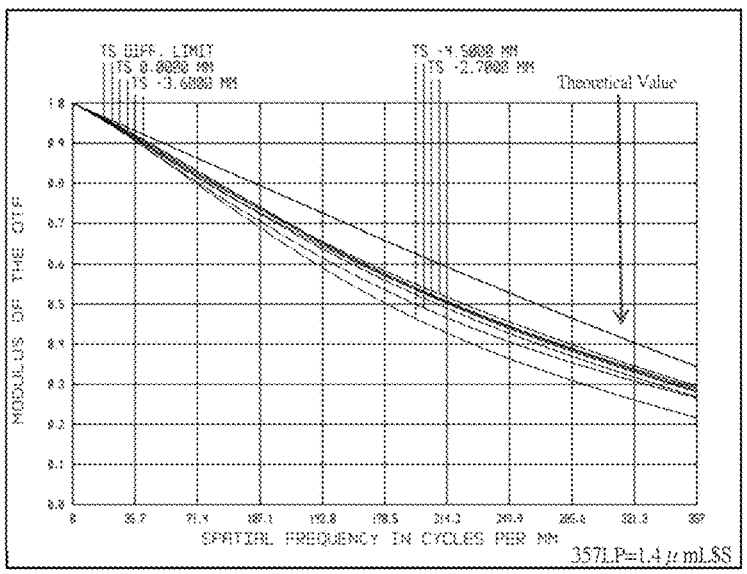

[FIG. 4c]

| Chart 4 | Magnification=0.1230 | F Number = 2.35 | Image | 9mm φ / 7.2x5.4mm |
|---|---|---|---|---|
| (2Aspheric) Embodiment 2 | NA(Im) = 0.1676 | Long side of object=59mm | Diagonal of object=73mm | |
| | | Short side of object=44mm | | |
| | (F)Combined Focal Length=15.604mm | (R F) Petz=790.805mm | Total Length=26.103mm | |

Fullsize f=74.6mm eqv.

Focal Length of Combined Focusing Lens = 16.016mm  Focal Length of Negative Lens=-12.624mm
(fP)   (RP)Petz= -20.613mm   (fN)   (RN)Petz=17.186mm t O = 150mm Non-Spherical       Non-Spherical (c)

Front Group(f1)   Back Group(f2)   t11=9.175mm   CRA=23.9°
f1=35.855        f2=16.312

[FIG. 5]

Chart 5 — Equivalent to Fullsize 71.7mm — Embodiment 3

(a) Entirety

| | Configuration | | | 4-division-5-piece + Concave (2 Aspheric) | | | | | | | | |
|---|---|---|---|---|---|---|---|---|---|---|---|---|
| | Image Size | | | 1/1.8inch 9mm @ 7.2x5.4mm | | | | | | | | |
| | | | | | | | | | | | Glass | |
| | | | | | | Surf | Radius | Thick | Catalog | Index | Abbe | Semi-Dia |
| | t1 3: Galileo Concave-Cover Glass | | | 0.4mm | | OBJ | Infinity | t0 | | | | 4.500 |
| | t0[mm] | | | ∞ | 150 | *1 | 10.437 | 1.800 | L-BSL7 | 1.5163 | 64.065 | 4.500 |
| | t1 | | | 6.169 | 7.418 | 2 | -201.322 | 0.100 | | | | 3.700 |
| | (F)Combined Focal Length | | | 14.998 | 13.300 | 3 | 9.665 | 1.700 | S-BSM81 | 1.6400 | 60.078 | 3.700 |
| | Magnification | | | 1/∞ | 0.10341 | 4 | -30.851 | 0.600 | S-BAH27 | 1.7015 | 41.229 | 2.200 |
| | Angle of View (Object Side) | Diagonal | | 0.0303 | ±16.7° | 5 | 7.115 | 0.500 | | | | 1.800 |
| | | Long Side | | 14.998 | ±13.5° | STO | Infinity | 3.563 | | | | |
| | | Short Side | | 297mm | ±10.2° | 7 | -30.234 | 0.600 | S-TIM8 | 1.5955 | 39.242 | 3.200 |
| | Chief Ray Angle | Diagonal | | 238mm | 30.1° | 8 | 23.727 | 1.600 | S-BSM51 | 1.6400 | 60.078 | 4.200 |
| | F Number | | | 178mm | 2.35 | 9 | -22.754 | 0.100 | | | | 4.200 |
| | @Entirety Focus Plane - Front Group Paraxial Focus Plane | | | -0.277 | -0.291 | 10 | 21.308 | 1.900 | S-FPM2 | 1.5952 | 67.736 | 4.500 |
| | (fR)Radius of Petzval Curvature | | | -957.228 | | 11 | -16.520 | t11 | | | | 4.500 |
| Focusing Lens | (FP)Focal Length | | | 13.604 | | *12 | -6.721 | 0.500 | L-BAL35 | 1.4891 | 61.153 | 4.200 |
| Assembly | (R1)Radius of Petzval Curvature | | | -16.883 | | 13 | 128.548 | 0.200 | | | | 4.800 |
| Negative | (CN)Concave Focal Length | | | -10.784 | | 14 | Infinity | 0.600 | BSL7 | 1.5163 | 64.150 | 5.200 |
| Fixed Lens | (fR)Radius of Petzval Curvature | | | 17.186 | | 15 | Infinity | 0.200 | | | | 5.200 |
| Claims | 0.8<P/F<1.2 | | | 0.91 | 0.94 | IMA | Infinity | -7.55 | | | | 5.000 |
| | -1.5<f P/f N<1.1 | | | -1.261 | | | (Virtual) Projection Pupil=-7.85 | | | | | |
| | -1.3<RP/RN<-0.9 | | | -0.982 | | | | D/F | | | | |
| | -0.6<D/F<-0.4 | | | -0.505 | | | | | | | | |

| | Wavelength 1 mL | 2ndTerm | 4thTerm | 6thTerm | 8thTerm | 10thTerm |
|---|---|---|---|---|---|---|
| *1Aspheric | | 0.000 | -8.15E-05 | -6.05E-05 | 3.72E-07 | -1.17E-08 |
| *12Aspheric | Weight | 0.000 | 2.65E-04 | 4.36E-05 | -2.58E-06 | 6.65E-08 |

| Surf | Radius | d | dR1 | D | F | D/F |
|---|---|---|---|---|---|---|
| | 10.437 | 5.55 | -0.735 | -7.036 | 14.999 | -0.469 |
| | -6.721 | 5.8 | -0.812 | -7.3 | 14.999 | -0.487 |
| | 0.546 | 0.436 | 0.486 | 0.579 | 0.656 | |
| | 1.0 | 0.6 | 0.2 | 0.6 | 0.2 | |

| Concave Lens | Glass Name | R1 | R2 | d | dR1 | D | F | D/F |
|---|---|---|---|---|---|---|---|---|
| | L-LAH53 | -7.547 | -216.698 | L-LAL13 | L-BAL35 | L-BSL7 | | |
| | L-LAL13 | -7.146 | 192.883 | 1.6935 | 1.5897 | 1.5163 | | |
| | L-BAL35 | -6.721 | 128.548 | 6.10 | -0.948 | -7.58 | 14.948 | -0.505 |
| | L-BSL7 | -6.378 | 89.024 | 6.29 | -0.986 | -7.73 | 14.998 | -0.519 |

| Concave Lens | Glass Name | Refraction Index N_d |
|---|---|---|
| | L-LAH53 | 1.8061 |

(b) Chief Ray Scheme t0=∞ (Virtual) Projection Pupil D=-7.58, d=6.08

Non-spherical, Entirety Focus Plane, 20.132mm, t0=∞

[FIG. 6a]

| Chart 6 | Magnification= 1/∞ | F Number = 2.8 | Image | 9mm φ |
|---|---|---|---|---|
| (2Aspheric) Embodiment 3 | NA(Im) = 0.175S | Long-side Angle=±13.5° Diagonal Angle=±16.7° Short-side Angle=±10.2° | | 7.2×5.4mm |

Total Length=20.132mm
(F)Combined Focal Length=14.995mm ( R F ) Petz=-957.228mm

Fullsize f=71.7mm eqv.
Focal Length of Combined Focusing Lens = 13.604mm  Concave Lens Focal Length=-10.784mm
(fP)  (RP)Petz = -16.883mm  Petz=17.186mm t O = 1.80E+05
Non-Spherical  Non-Spherical (a)

Front Group(f1)  Back Group(f2)  CRA=30.5°
f1=28.192  f2=15.516  t11=6.169mm
f1/f2 = 1.817

*(MTF charts: Modulus of the OTF vs Y Field in millimeters at 50LP/mm (10μm L&S), 136LP/mm (3.7μm L&S), 227LP/mm (2.2μm L&S), 357LP/mm (1.4μm L&S); 4.5mm(9mm φ))*

*(MTF chart: Modulus of the OTF vs Spatial Frequency in cycles per mm, Theoretical Value; 357LP=1.4μm L&S)*

【FIG. 6b】
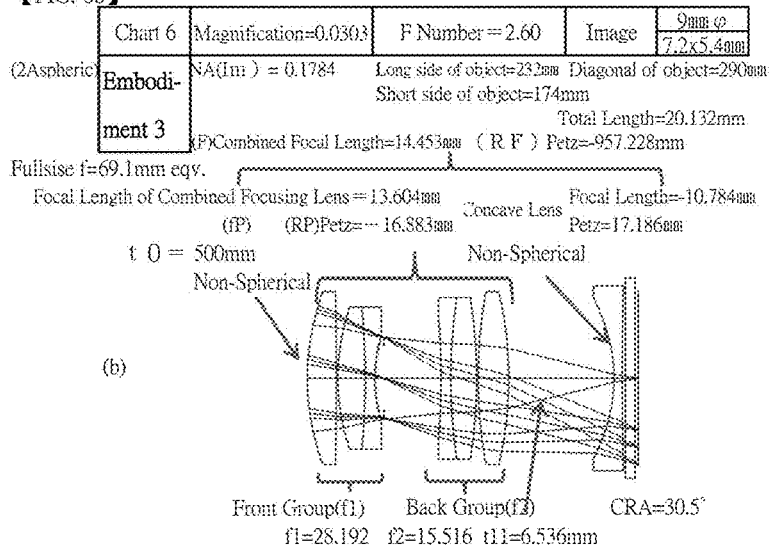
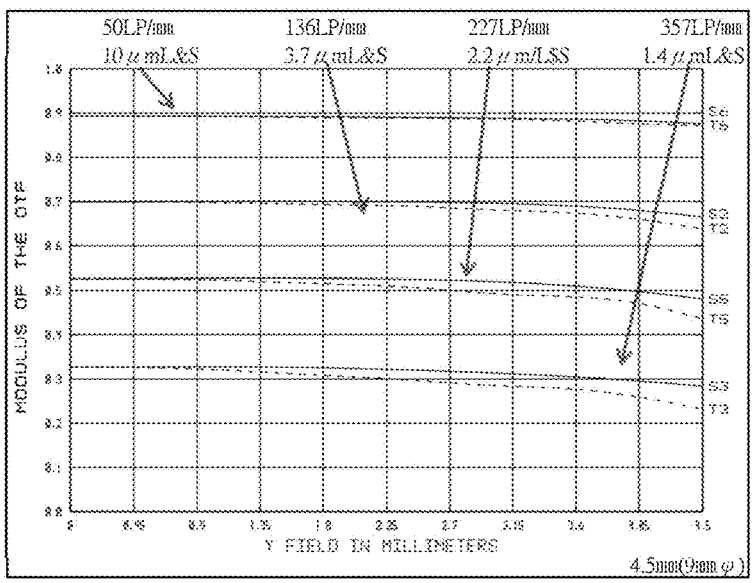
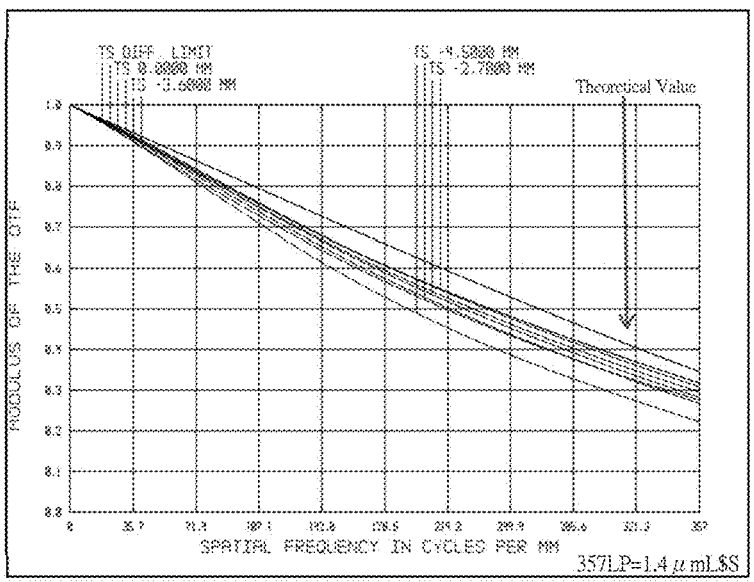

[FIG. 6c]
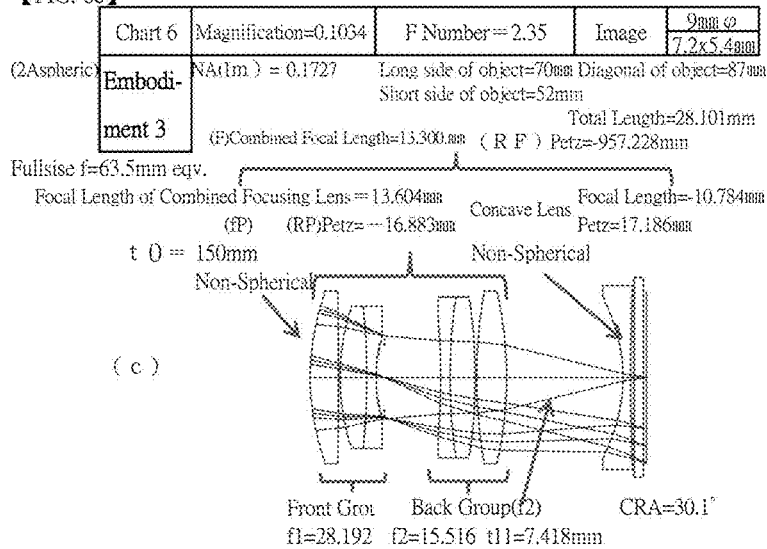
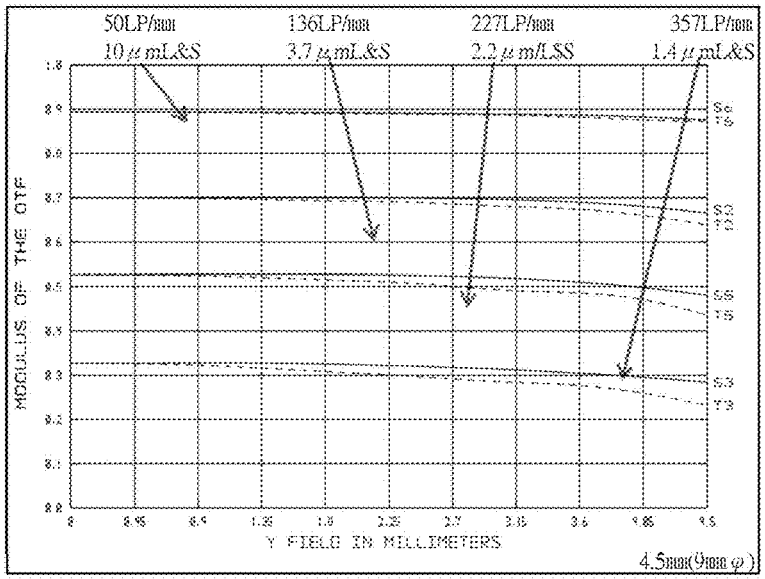
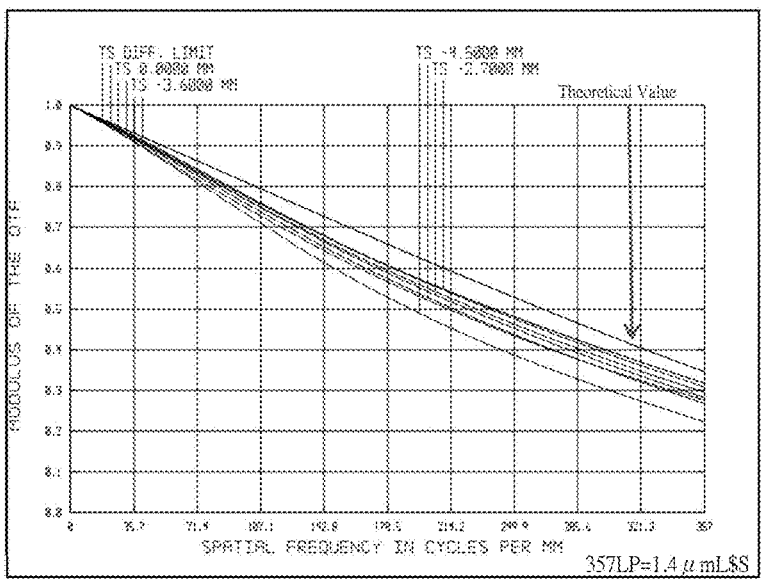

[FIG. 7]

Chart 7

(a) Entirety

| | Embodiment 4 |
|---|---|
| Configuration | 4-division-6-piece + Concave (2 Aspheric) Gauss+oConcave |
| Image Size | 1/1.8inch 9mm φ 7.2×5.4mm |

| | | | | | |
|---|---|---|---|---|---|
| t0[mm] | 0.2mm | ∞ | 500 | 150 | |
| t1 | | 4.440 | 4.706 | 5.334 | |
| (F) Confined Focal Length | | 13.000 | 12.581 | 11.690 | |
| Magnification | | 1/∞ | 0.0262 | 0.0888 | |
| Angle of View (Object Side) | Diagonal | ±19.1 | 34.4mm | 101mm | |
| | Long Side | ±15.5 | 27.5mm | 81mm | |
| | Short Side | ±11.7° | 20.6mm | 61mm | |
| Chief Ray Angle | Diagonal | 34.2° | 33.6 | | |
| F Number | | 2.80 | 2.60 | 2.35 | |
| ②Entirety Focus Plane - Front Group Paraxial Focus: Plane | | -0.086 | -0.101 | -0.086 | |
| (FR)Radius of Petzval Curvature | | -1935.778 | | | |

Focusing Lens Assembly

| (fP)Focal Length | 11.572 |
|---|---|
| (R1)Radius of Petzval Curvature | -14.192 |

Negative

| (fN) Concave Focal Length | -8.965 |
|---|---|
| (fR)Radius of Petzval Curvature | 14.296 |

Fixed Lens

Claims

| 0.8<fP/f<1.2 | 0.89 | 0.92 | 0.99 |
|---|---|---|---|
| -1.5<fP/fN<-1.1 | -1.291 | | |
| -1.3<R/R/N<-0.9 | -0.993 | | |
| -0.6<D/fc<-0.4 | -0.505 | | |

Lens Data

| Surf | Radius | Thick | Catalog | Glass Index | Abbe | Semi-Dia |
|---|---|---|---|---|---|---|
| OBJ | Infinity | t0 | | | | |
| *1 | 9.439 | 1.600 | L-BSL7 | 1.5163 | 64.065 | 4.300 |
| 2 | -516.199 | 0.100 | | | | 4.300 |
| 3 | 7.903 | 1.400 | S-BSM81 | 1.6400 | 60.078 | 3.600 |
| 4 | 40.992 | 0.600 | S-BAH27 | 1.7015 | 41.239 | 3.600 |
| STO | 5.949 | 0.500 | | | | 2.200 |
| 5 | Infinity | 0.828 | | | | 1.700 |
| 7 | -25.433 | 0.600 | S-TIM8 | 1.5955 | 39.242 | 2.000 |
| 8 | 9.658 | 1.600 | S-BSM81 | 1.6400 | 60.078 | 3.300 |
| 9 | -17.864 | 2.486 | | | | 3.300 |
| 10 | 19.751 | 2.000 | S-FPM3 | 1.5378 | 73.703 | 4.200 |
| 11 | -13.217 | t11 | | | | 4.200 |
| *12 | -5.666 | 0.500 | L-BAL35 | 1.5891 | 61.153 | 3.800 |
| 13 | 85.249 | 0.200 | | | | 4.800 |
| 14 | Infinity | 0.600 | D263TEC | 1.5233 | 54.517 | 5.200 |
| 15 | Infinity | 0.200 | | | | 5.200 |
| IMA | Infinity | | | | | |

(Virtual) Projection Pupil=-6.57

| Wavelength | D/F | 2ndTerm | 4thTerm | 6thTerm | 8thTerm | 10thTerm |
|---|---|---|---|---|---|---|
| 1μm | -0.505 | 0.000 | -1.26E-04 | -1.46E-06 | 1.16E-06 | -4.48E-08 |
| Weight | | 0.000 | 8.59E-05 | 3.24E-05 | -1.80E-05 | 6.87E-08 |

*1 Aspheric
*12 Aspheric

| | Glass Name | | | | |
|---|---|---|---|---|---|
| | L-LAH53 | L-LAL13 | L-BAL35 | L-BSL7 | |
| Refraction Index N d | 1.8061 | 1.6935 | 1.5891 | 1.5163 | |

| | Surf | Radius | d | dR1 | D | F | DF |
|---|---|---|---|---|---|---|---|
| | | 9.438 | 0.546 | 0.486 | 0.579 | -6.27 | 13.001 | -0.482 |
| | | -5.666 | 1.0 | 0.2 | 0.6 | -6.37 | 12.999 | -0.490 |

| Concave Lens | R1 | R2 | d | dR1 | D | F | DF |
|---|---|---|---|---|---|---|---|
| L-LAH53 | -6.891 | 65.016 | 4.75 | -0.689 | 0.486 | -6.27 | 13.001 | -0.482 |
| L-LAL13 | 6.205 | 84.589 | 4.88 | 0.786 | | | | -0.490 |
| L-BAL35 | -5.666 | 85.249 | 5.07 | -0.895 | | | 12.999 | -0.505 |
| L-BSL7 | -5.282 | 77.474 | 5.25 | -0.994 | | | 12.999 | -0.519 |

(b)

Non-spherical 17.654mm Non-spherical
Entirety Focus Plane
t0=∞

(Virtual) Projection Pupil D=-6.57
d=5.07
Chief Ray Scheme
t0=∞

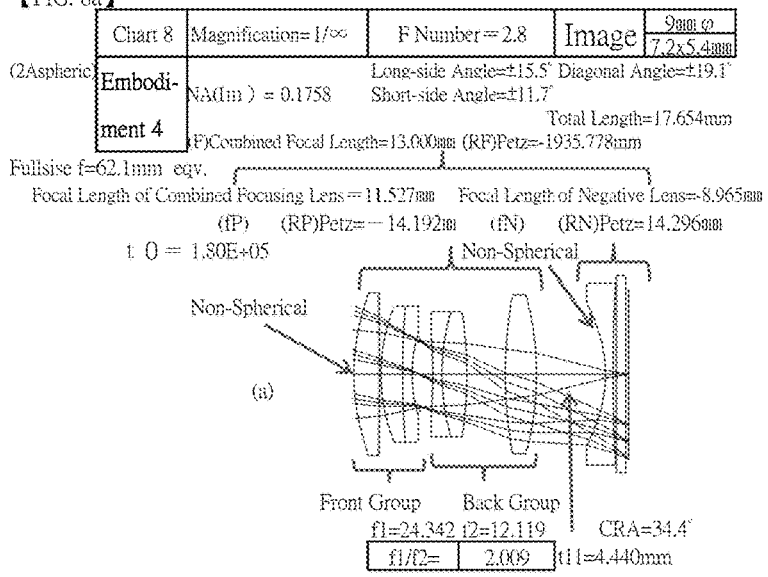
[FIG. 8a]
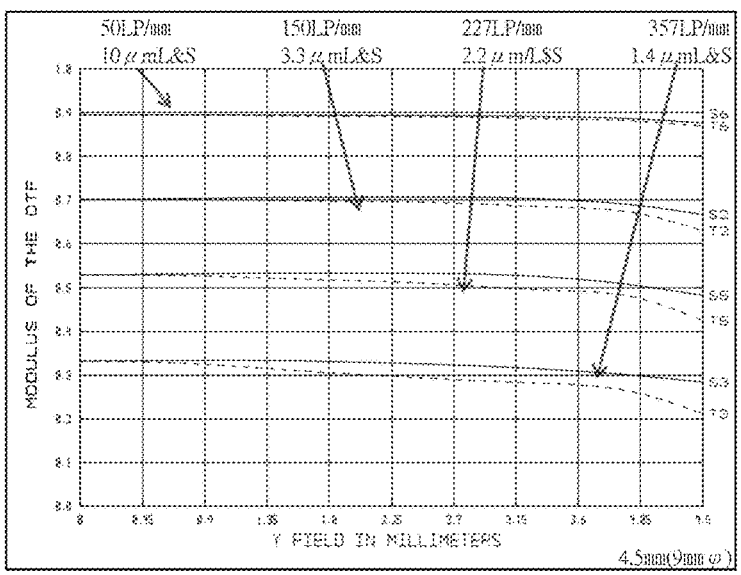
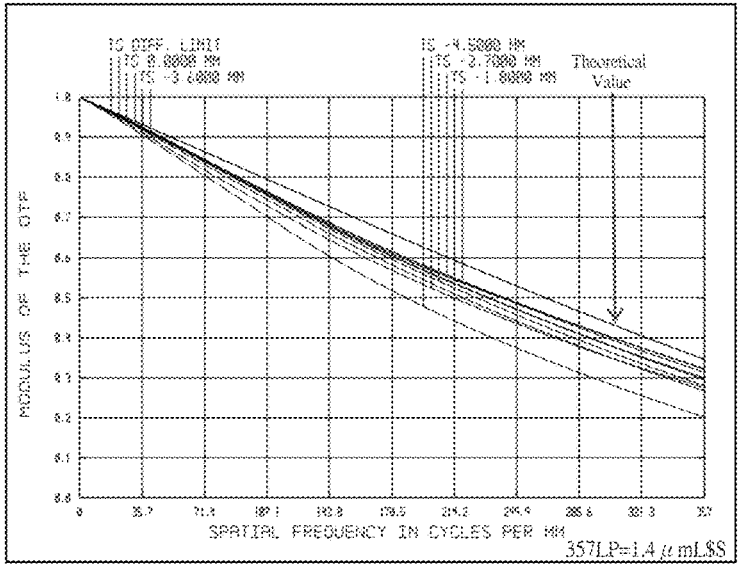

[FIG. 8b]
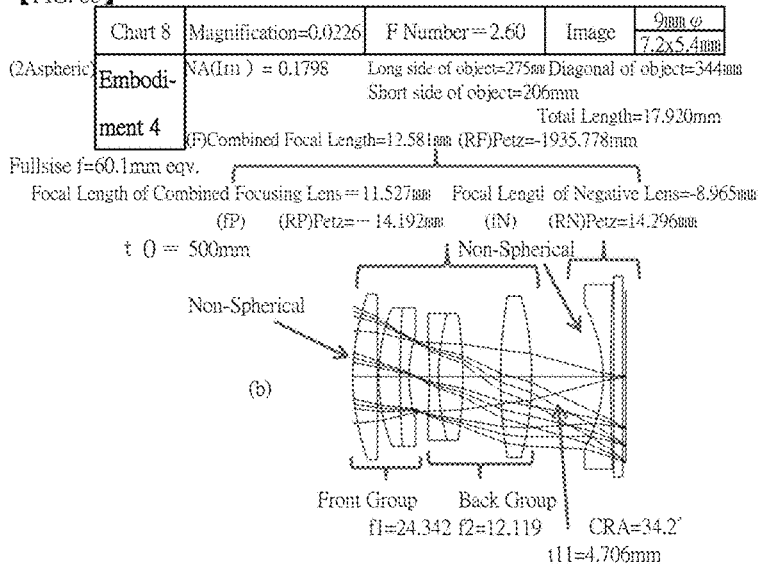
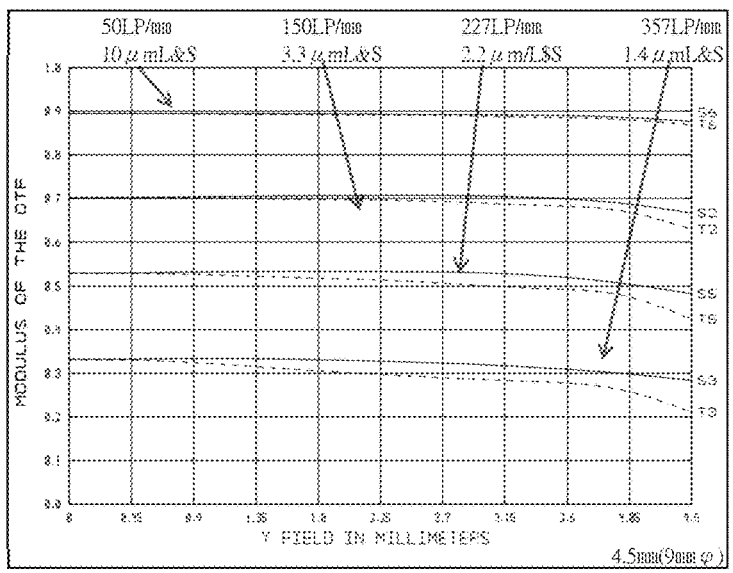
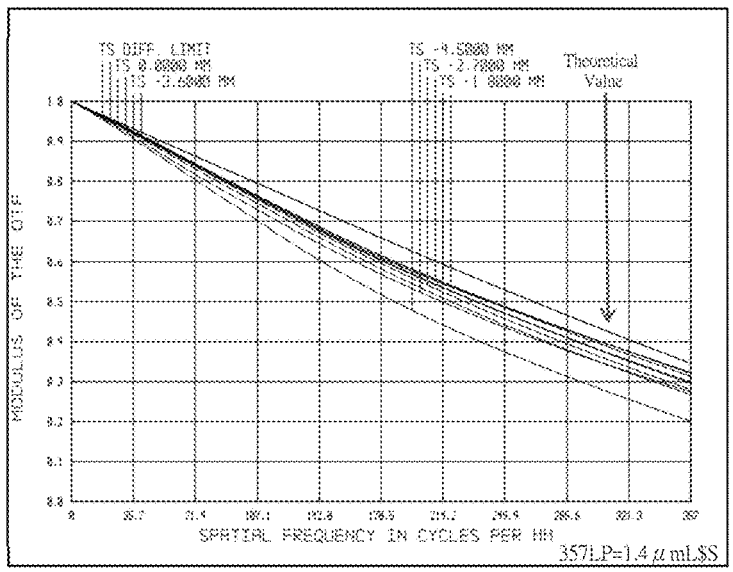

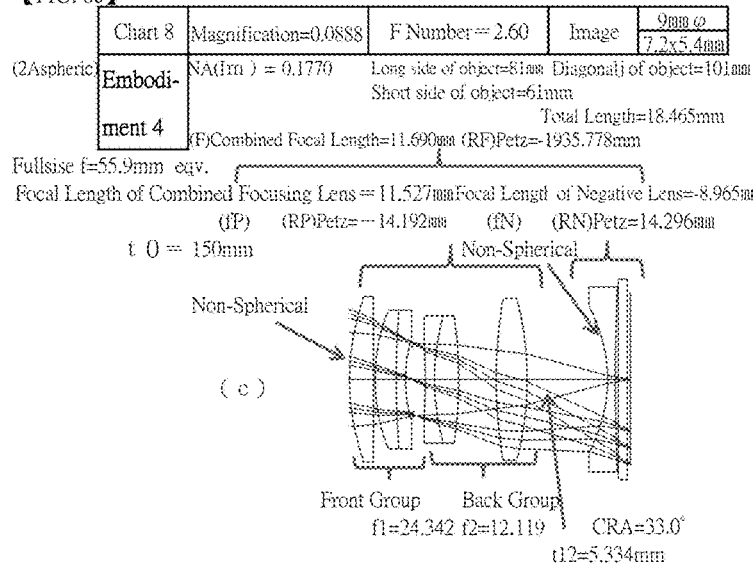
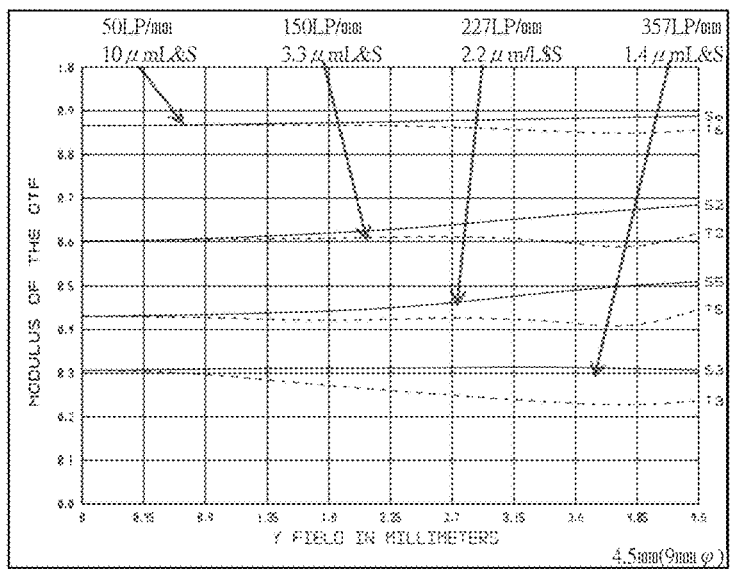
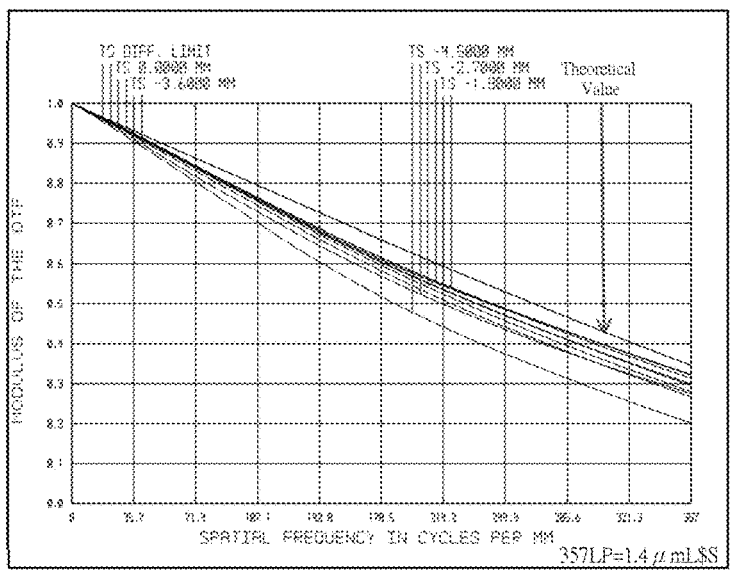

[FIG. 9]

Chart 9 — Equivalent to Fullsize f=52.6mm / Embodiment 5

(a) Entirety

| Configuration | | 4-division-6-piece + Concave (2 Aspheric) |  |
|---|---|---|---|
| | | Gauss+Concave | |
| Image Size | | 1/1.8inch 9.88φ 7.2×5.4mm | |
| t1 3: Galileo Concave-Cover Glass | | 0.2mm | |
| (t)[mm] | | ∞ | 500 | 150 |
| t1 | | 3.694 | 3.878 | 4.309 |
| (F) Combined Focal Length | | 11.005 | 10.707 | 10.067 |
| Magnification | | 1/∞ | 0.0221 | 0.07431 |
| Angle of View (Object Side) | Diagonal | ±22.1° | 407mm | 121mm |
| | Long Side | ±18.1° | 326mm | 87mm |
| | Short Side | ±13.8° | 244mm | 73mm |
| Chief Ray Angle | Diagonal | 37.4° | 37.2° | 36.9° |
| F Number | | 2.80 | 2.65 | 2.60 |
| ② Entirety Focus Plane - Front Group Paraxial Focus Plane | | -0.119 | -0.116 | -0.106 |
| (FR)Radius of Petzval Curvature | | -1798.013 | | |

Focusing Lens Assembly
| (FP)Focal Length | 9.654 |
| (R1)Radius of Petzval Curvature | -11.853 |

Negative Fixed Lens
| (N) Concave Focal Length | -7.515 |
| (fR)Radius of Petzval Curvature | 11.962 |

Claims
| 0.8<P/f<1.2 | 0.88 | 0.90 | 0.96 |
| -1.5<f P/f N<1.1 | -1.285 | | |
| -1.3<RP/RN<-0.9 | -0.991 | | |
| -0.6<D/F<-0.4 | -0.520 | | |

| Surf | Radius | Thick | Catalog | Glass Index | Abbe | Semi-Dia |
|---|---|---|---|---|---|---|
| OBJ | Infinity | t0 | | | | |
| *1 | 17.353 | 1.600 | L-BSL7 | 1.5163 | 64.065 | 4.300 |
| 2 | -31.560 | 0.100 | | | | 4.300 |
| 3 | 6.053 | 2.000 | S-BSM81 | 1.6400 | 60.078 | 3.300 |
| 4 | -18.941 | 0.600 | S-BAH27 | 1.7015 | 41.239 | 3.300 |
| 5 | 5.025 | 0.500 | | | | 1.800 |
| STO | Infinity | 1.556 | | | | 1.700 |
| 7 | -73.806 | 0.600 | S-TIM8 | 1.5955 | 39.242 | 2.200 |
| 8 | 11.062 | 1.600 | S-BSM81 | 1.6400 | 60.078 | 3.600 |
| 9 | -24.172 | 0.100 | | | | 3.600 |
| 10 | 15.959 | 2.200 | S-FPM3 | 1.5378 | 73.703 | 4.100 |
| 11 | -9.175 | t11 | | | | 5.100 |
| *12 | -4.465 | 0.500 | L-BAL35 | 1.5891 | 61.153 | 3.800 |
| 13 | 1013.384 | 0.200 | | | | 4.800 |
| 14 | Infinity | 0.500 | D263TEC | 1.5233 | 54.517 | 5.200 |
| 15 | Infinity | 0.200 | | | | 5.200 |
| IMA | Infinity | -5.72 | | | | |

(Virtual) Projection Pupil=-5.72

| Surf | Radius | 2ndTerm | 4thTerm | 6thTerm | 8thTerm | 10thTerm |
|---|---|---|---|---|---|---|
| *1 Aspheric | 17.353 | 0.000 | -1.93E-06 | -5.98E-06 | 3.42E-07 | -1.01E-08 |
| *12 Aspheric | -4.465 | 0.000 | 1.63E-03 | 1.67E-04 | -1.36E-05 | 5.59E-07 |

| Wavelength [μm] | D | F |
|---|---|---|
| | 0.546 | 0.486 | 0.579 | 0.656 |
| Weight | 1.0 | 0.2 | 0.6 | 0.2 |

| Glass Name | L-LAH53 | L-LAL13 | L-BAL35 | L-BSL7 |
|---|---|---|---|---|
| Refraction Index N d | 1.8061 | 1.6935 | 1.5891 | 1.5163 |

| Concave Lens | R1 | R2 | d | dR1 | D | F | D/F |
|---|---|---|---|---|---|---|---|
| L-LAH53 | -4.695 | -174.056 | 3.9 | -0.832 | -5.3 | 11.005 | -0.482 |
| L-LAL13 | -4.610 | -250.835 | 4.15 | -0.900 | -5.52 | 11.005 | -0.502 |
| L-BAL35 | -4.465 | 1013.38 | 4.20 | -0.941 | -5.72 | 11.006 | -0.521 |
| L-BSL7 | -4.355 | 140.008 | 4.40 | -1.010 | -5.82 | 11.006 | -0.529 |

(b) Chief Ray Scheme

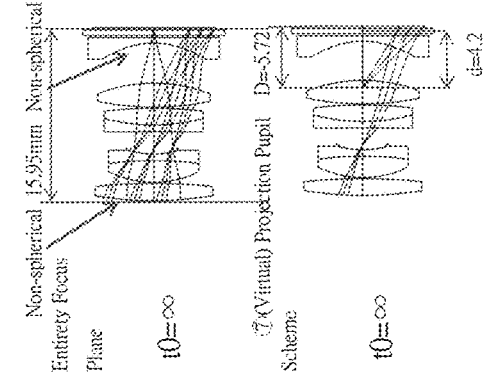

Non-spherical 15.95mm  Non-spherical
Entirety Focus Plane
t0=∞
t0=∞
d=4.2

[FIG. 10a]

| Chart 10 | Magnification= 1/∞ | F Number = 2.8 | Image | 9㎜ φ |
|---|---|---|---|---|
| (2Aspheric) Embodiment 5 | NA(Im) = 0.1758 | Long-side Angle=±18.1.2° Diagonal Angle=±22.2° Short-side Angle=13.8° | | 7.2×5.4㎜ |

Total Length=17.850mm
(F)Combined Focal Length=11.005㎜  (RF)Petz=-1298.013mm

Fullsize f=52.6mm eqv.
Focal Length of Combined Focusing Lens =9.654㎜   Focal Length of Negative Lens=-7.515㎜
(fP)   (RP)Petz=-11.853㎜   (fN)   (RN)Petz=11.962㎜ t O = 1.80E+05

Non-Spherical

Non-Spherical (a)

Front Group   Back Group   CRA=37.4°
f1=22.439   f2=9.018   t11=3.694mm
f1/f2= 2.599

【FIG. 10b】
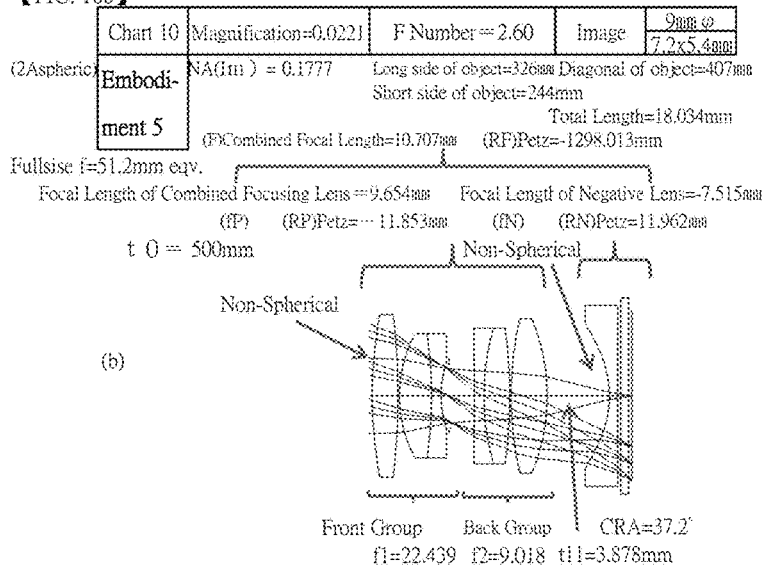
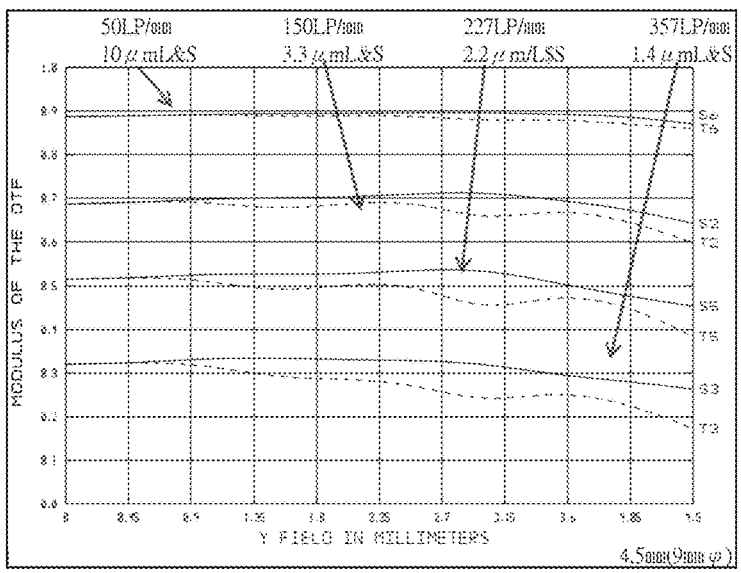
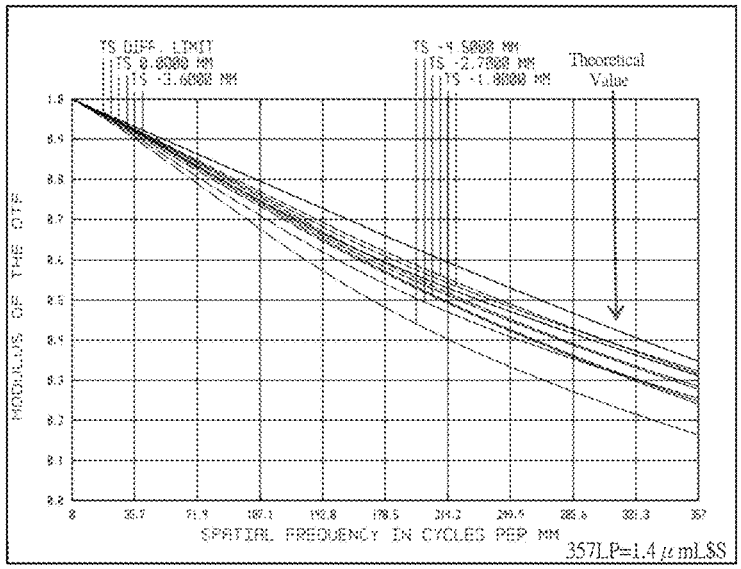

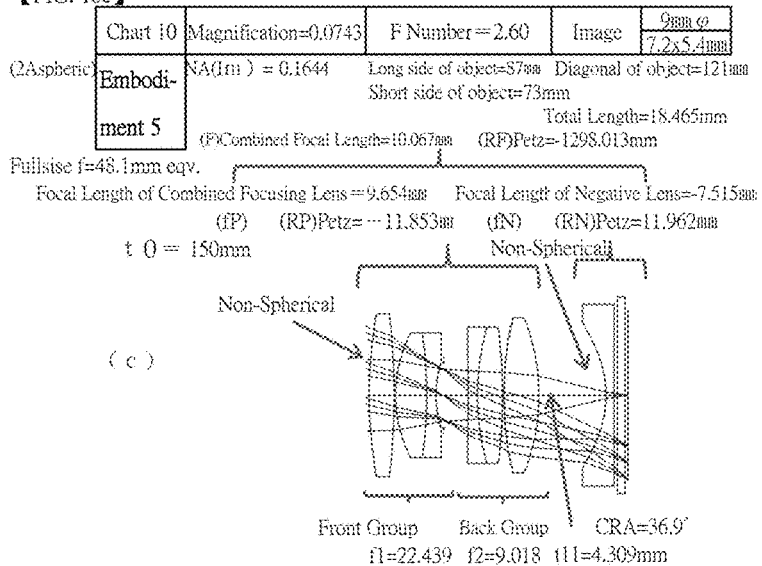
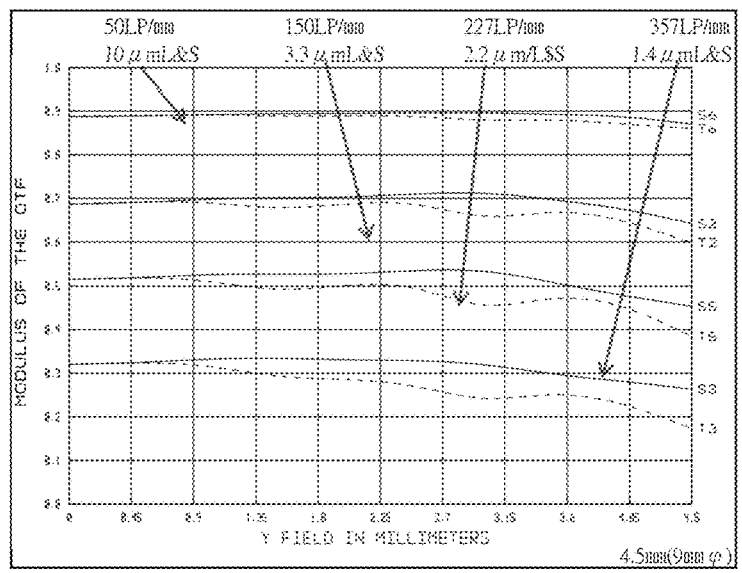
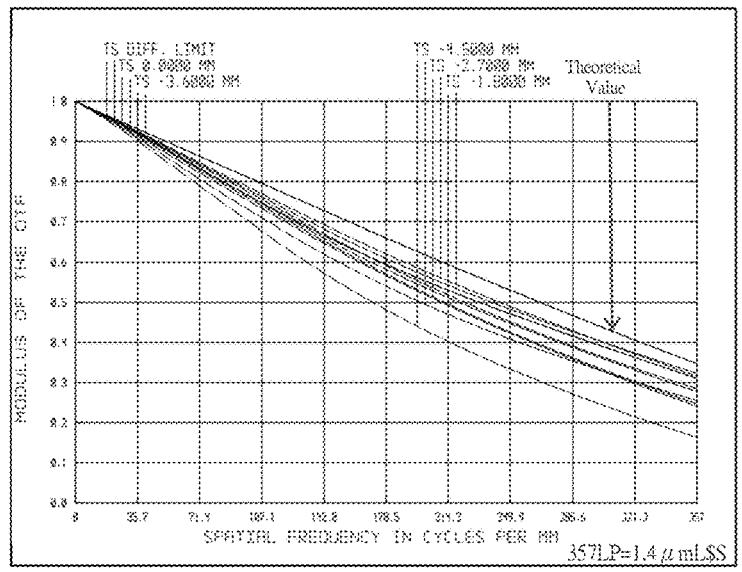

[FIG. 11]
Chart 11
(a)
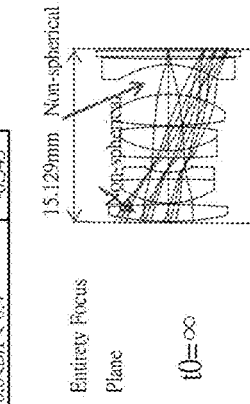
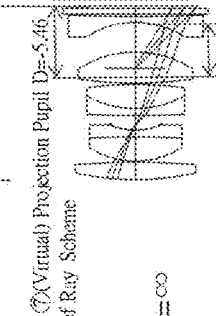
(b) Entirety Focus Plane
$t0=\infty$
(b') (Virtual) Projection Pupil D=-5.46
Chief Ray Scheme
$t0=\infty$ 【FIG. 12a】
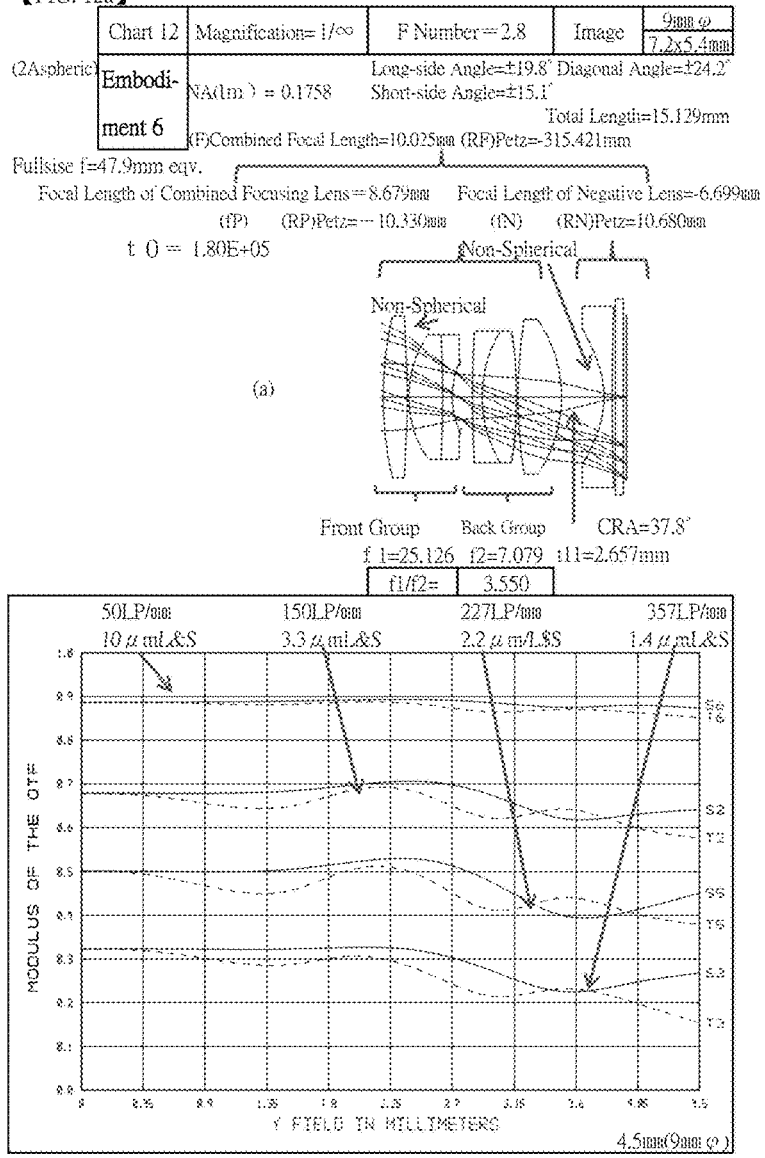
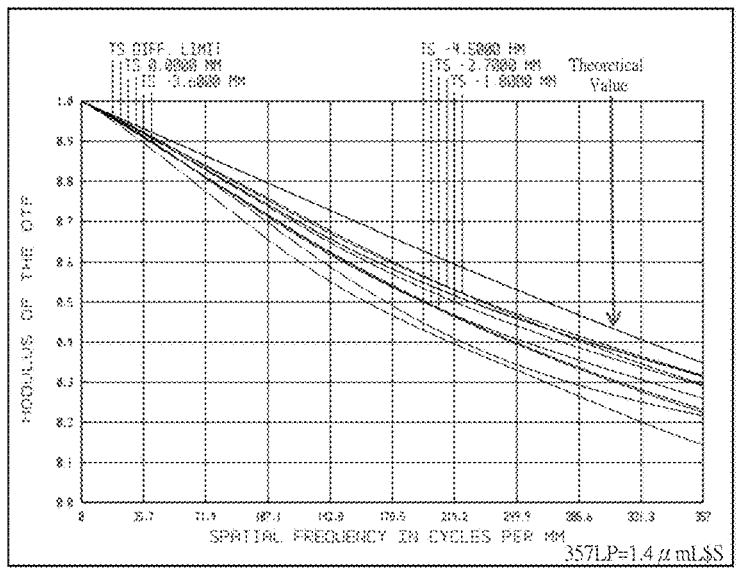

[FIG. 12b]

| Chart 12 | Magnification=0.0201 | F Number = 2.65 | Image | 9mm φ / 7.2×5.4mm |

(2Aspheric) Embodiment 6  NA(Im) = 0.1785  Long side of object=359mm  Long side of object=449mm
Short side of object=269mm
Total Length=15.277mm
(F)Combined Focal Length=9.776mm  (RF)Petz=-315.421mm Fullsize f=446.7mm eqv.
Focal Length of Combined Focusing Lens=8.679mm  Focal Length of Negative Lens=-6.699mm
(P)  (RP)Petz=-10.330mm  (N)  (RN)Petz=10.680mm
t O = 500mm

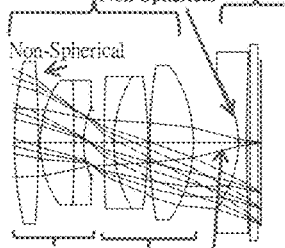

(b)

Front Group   Back Group   CRA=37.6°
f1=25.126  f2=7.079  t11=4.706mm

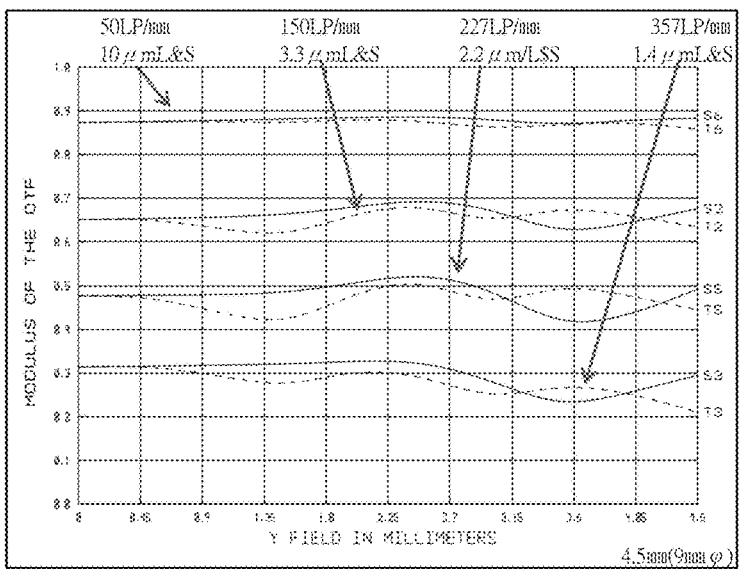

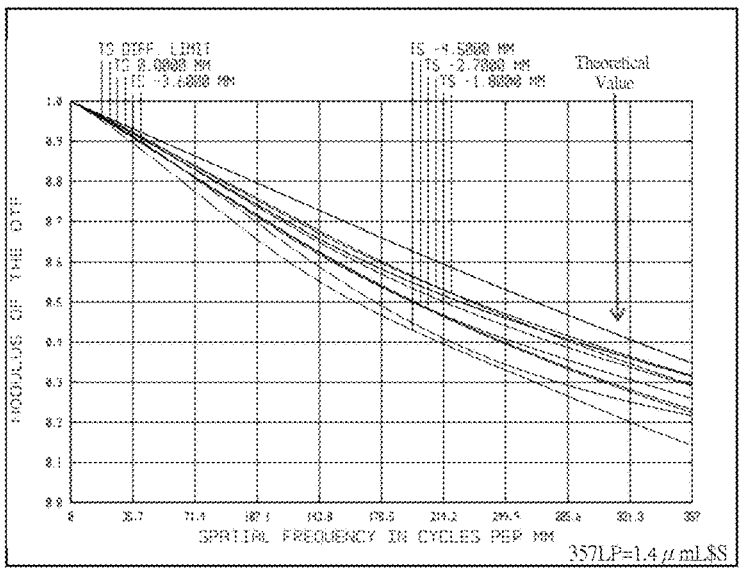

[FIG. 12c]

| Chart 12 | Magnification=0.0670 | F Number = 2.60 | Image | 9mm φ |
|---|---|---|---|---|
| | | | | 7.2×5.4mm |

(2Aspheric) Embodiment 6  NA(Im) = 0.1670   Long side of object=8mm   Long side of object=10mm
Short side of object=6mm
Total Length=15.620mm
(F)Combined Focal Length=9.243mm   (RF)Petz=−315.421mm Fullsize f=44.2mm eqv.
Focal Length of Combined Focusing Lens=8.679mm   Focal Length of Negative Lens=−6.699mm
(FP)   (RP)Petz=−10.330mm   (fN)   (RN)Petz=10.680mm
t O = 150mm

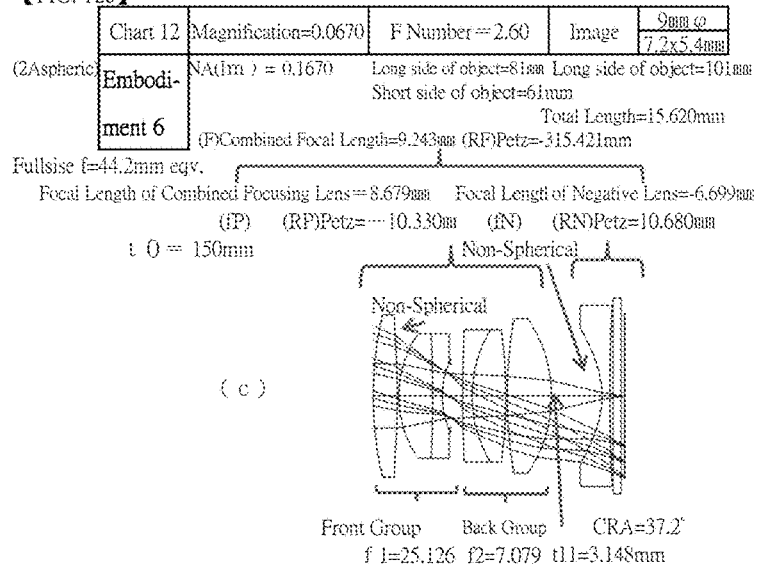

(c)

Front Group   Back Group   CRA=37.2°
f1=25.126  f2=7.079  t11=3.148mm

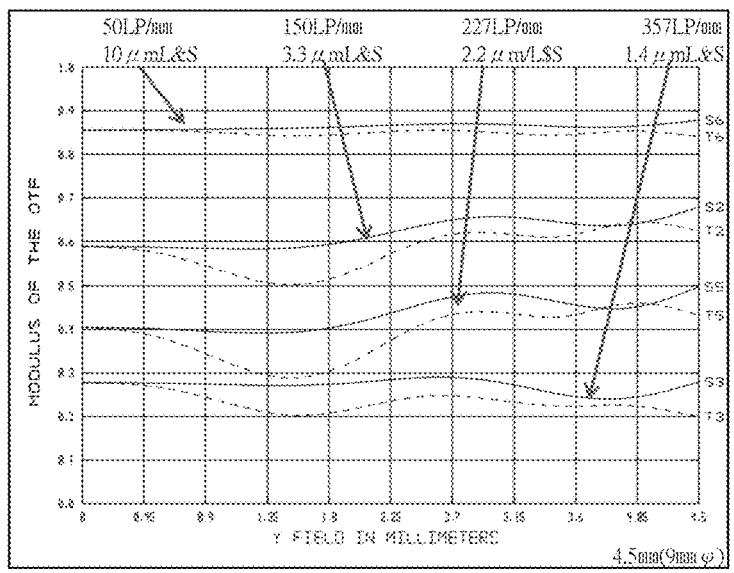

4.5mm(9mm φ)

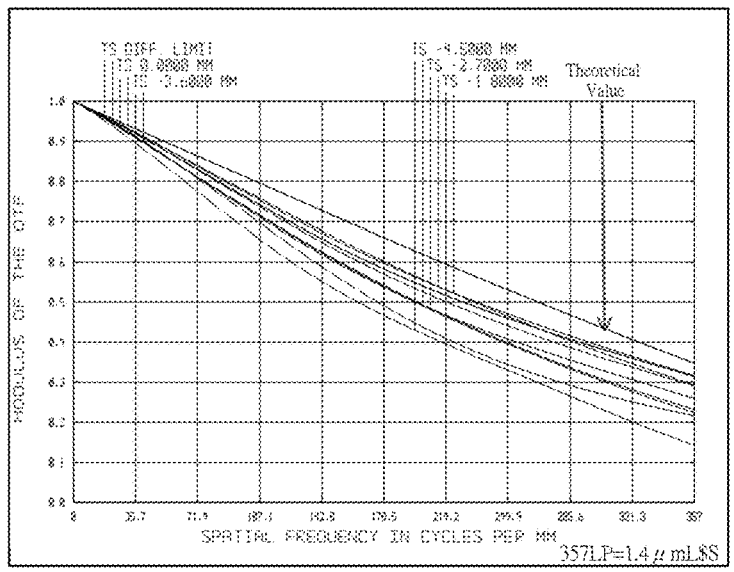

Chart 13

| Equivalent to Fullsize 86.0mm | Embodiment 7 | | | | | | | | |
|---|---|---|---|---|---|---|---|---|---|
| Configuration | 4-division-6-piece + Concave (1 Aspheric) MGauss+Concave | | | | | | | | |

(a)

| | | | | | | | | | | | |
|---|---|---|---|---|---|---|---|---|---|---|---|
| Entirety | Image Size | 2/3inch | 11mm φ 8.8x6.6mm | | | | | | | | |
| | t1 3: Galileo Concave-Cover Glass | | 0.2mm | | | | | | | | |
| | t0[mm] | ∞ | 500 | 200 | | | | | | | |
| | t1 | 9.930 | 10.734 | 11.988 | | | | | | | |
| | (F) Combined Focal Length | 22.003 | 20.976 | 18.912 | | | | | | | |
| | Magnification | 1/∞ | 0.0447 | 0.1147 | | | | | | | |
| | Angle of View (Object Side) | Diagonal | ±14.0° | 246mm | 96mm | | | | | | |
| | | Long Side | ±11.3 | 197mm | 77mm | | | | | | |
| | | Short Side | ±8.5 | 143mm | 56mm | | | | | | |
| | Chief Ray Angle | Diagonal | 25.9° | 26.6 | 26.1 | | | | | | |
| | F Number | | 3.00 | 2.75 | 2.50 | | | | | | |
| | ②Entirety Focus Plane - Front Group Peraxial Focus Plane | | -0.107 | -0.096 | -0.075 | | | | | | |
| | (FF)Radius of Petzval Curvature | | 227.399 | | | | | | | | |
| Focusing Lens Assembly | (FP)Focal Length | | 20.058 | | | | | | | | |
| Negative | (R1)Radius of Petzval Curvature | | -24.340 | | | | | | | | |
| Fixed Lens | (fN) Concave Focal Length | | -13.816 | | | | | | | | |
| | (fR)Radius of Petzval Curvature | | 21.987 | | | | | | | | |
| Claims | 0.8<fP/fF<1.2 | | 0.91 | 0.96 | 1.06 | | | | | | |
| | -1.5<fP/fN<1.1 | | -1.452 | | | | | | | | |
| | -1.3<RP/RN<-0.9 | | -1.107 | | | | | | | | |
| | -0.6<D/F<-0.4 | | -0.485 | | | | | | | | |

| Surf | Radius | Thick | Catalog | Glass Index | Abbe | Semi-Dia |
|---|---|---|---|---|---|---|
| OBJ | Infinity | t0 | | | | |
| 1 | 10.577 | 1.500 | L-BSL7 | 1.5163 | 64.065 | 5.600 |
| 2 | 8.296 | 0.700 | | | | 5.400 |
| 3 | 11.677 | 2.800 | S-FPL53 | 1.4970 | 81.546 | 5.800 |
| 4 | -46.798 | 1.000 | S-NSL36 | 1.5174 | 52.431 | 5.800 |
| 5 | -188.089 | 3.000 | | | | 5.800 |
| STO | Infinity | 0.800 | | | | 3.000 |
| 7 | -14.868 | 1.000 | S-NSL36 | 1.5174 | 52.431 | 3.200 |
| 8 | 8.202 | 3.300 | S-FPL51 | 1.4970 | 81.546 | 4.700 |
| 9 | -12.796 | 4.342 | | | | 4.700 |
| 10 | 34.935 | 1.700 | S-FPM2 | 1.5952 | 67.736 | 5.600 |
| 11 | -51.261 | t1 | | | | 5.600 |
| *12 | -8.171 | 0.800 | L-BAL35 | 1.5891 | 61.153 | 4.900 |
| 13 | Infinity | 0.200 | | | | 6.200 |
| 14 | Infinity | 0.500 | D632TEC | 1.5233 | 54.517 | 6.200 |
| 15 | Infinity | 0.150 | | | | 6.200 |
| IMA | Infinity | | | | | 6.200 |

D=(Virtual) Projection Pupil=-10.67

| *12:Aspheric | | | | | | | |
|---|---|---|---|---|---|---|---|
| Wavelength | D/F | 2ndTerm | 4thTerm | 6thTerm | 8thTerm | 10thTerm |
| 1[nm] | -0.485 | | | | 0.656 | |
| Weight | | 0.000 | 8.96E-04 | -3.21E-05 | 1.07E-04 | -1.30E-08 |
| | | 0.6 | 0.2 | 0.6 | 0.2 | |

| Glass Name | L-LAH53 | L-LAL13 | L-BAL35 | L-BSL7 |
|---|---|---|---|---|
| Refraction Index N.d | 1.8061 | 1.6935 | 1.5891 | 1.5163 |

| Concave Lens | R1 | R2 | d | D | F | D/F |
|---|---|---|---|---|---|---|
| L-LAH53 | 0.546 | ∞ | 0.436 | 0.579 | 22.000 | -0.448 |
| L-LAL13 | -10.091 | ∞ | 8.07 | -9.86 | 22.004 | -0.464 |
| L-BAL35 | -9.100 | ∞ | 8.4 | -10.2 | 22.003 | -0.485 |
| L-BSL7 | -8.171 | ∞ | 8.85 | -10.67 | 22.003 | -0.485 |
| | -7.466 | ∞ | 9.22 | -11.00 | 22.006 | -0.500 |

Spherical Entirety Focus Plane  31.872mm  Non-spherical

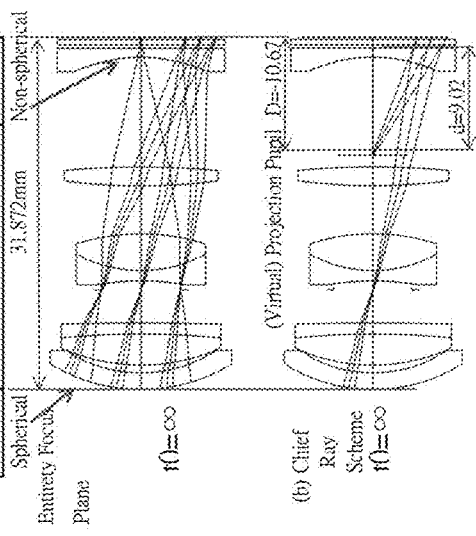

(b) Chief Ray Scheme f0=∞

(Virtual) Projection Pupil D=-10.67 d=0.02

[FIG. 14a]
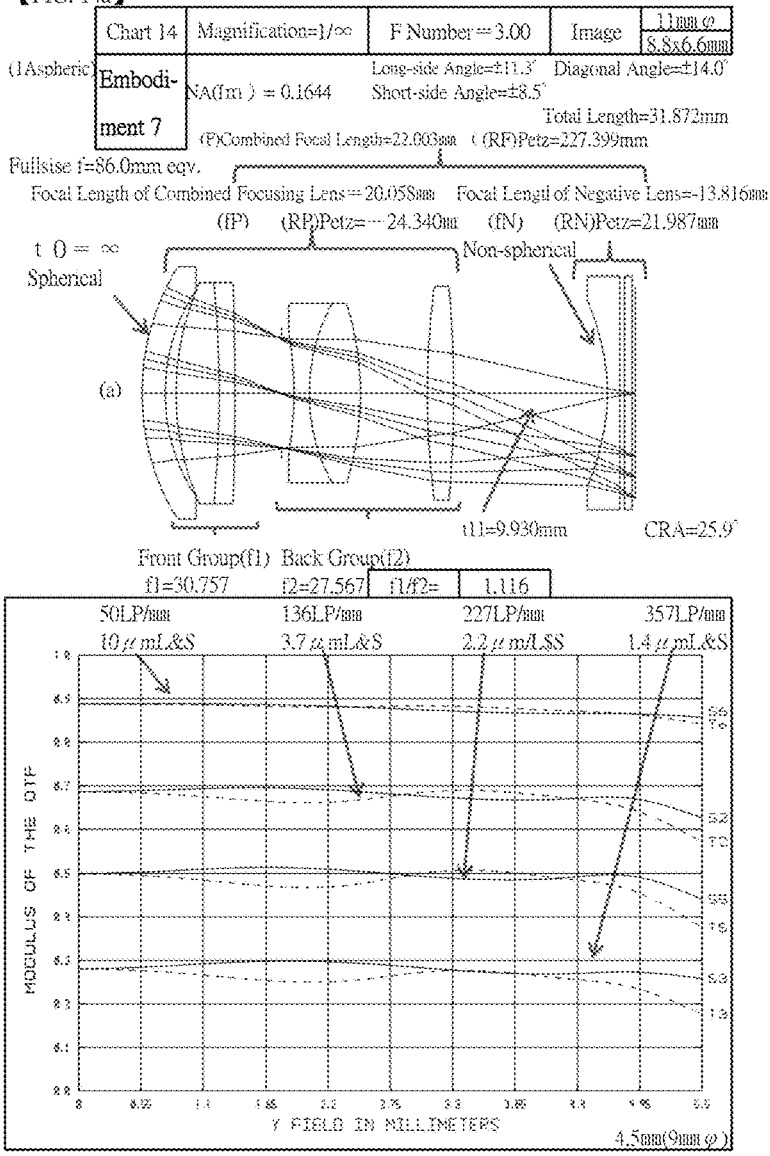
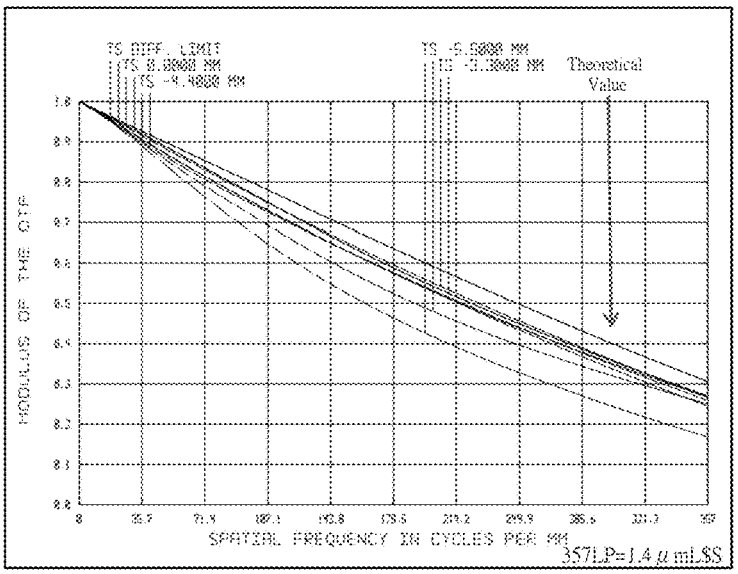

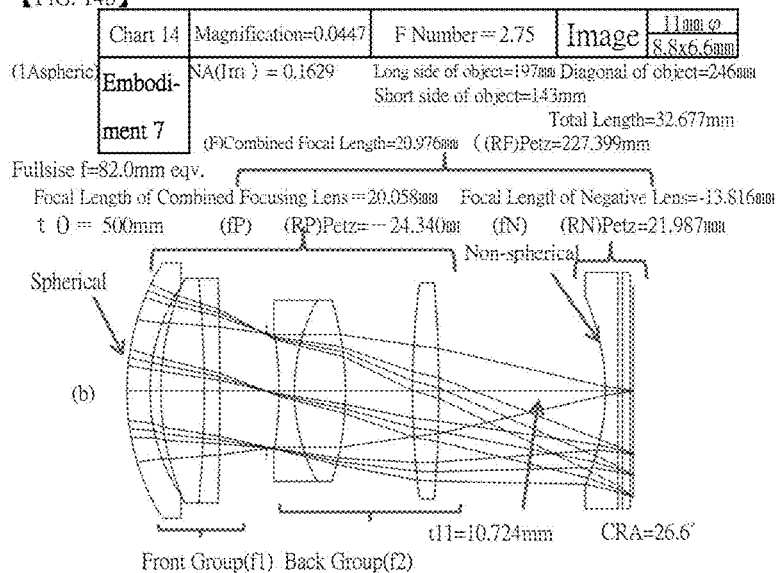
[FIG. 14b]
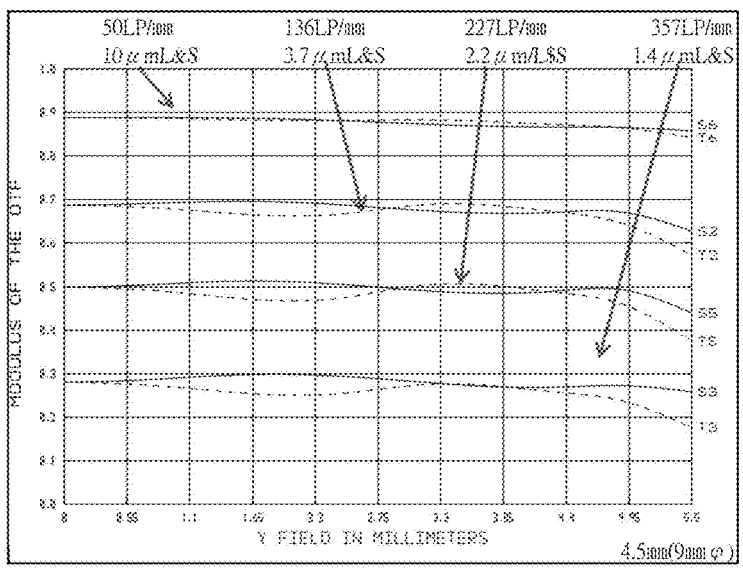
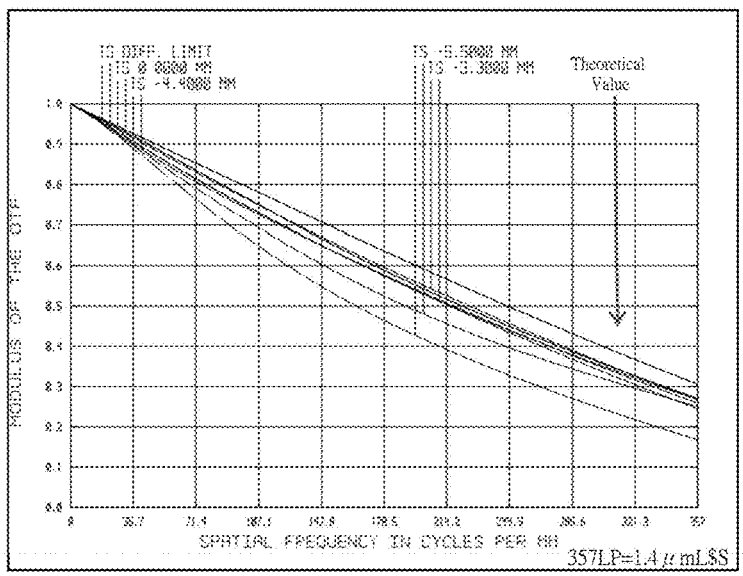

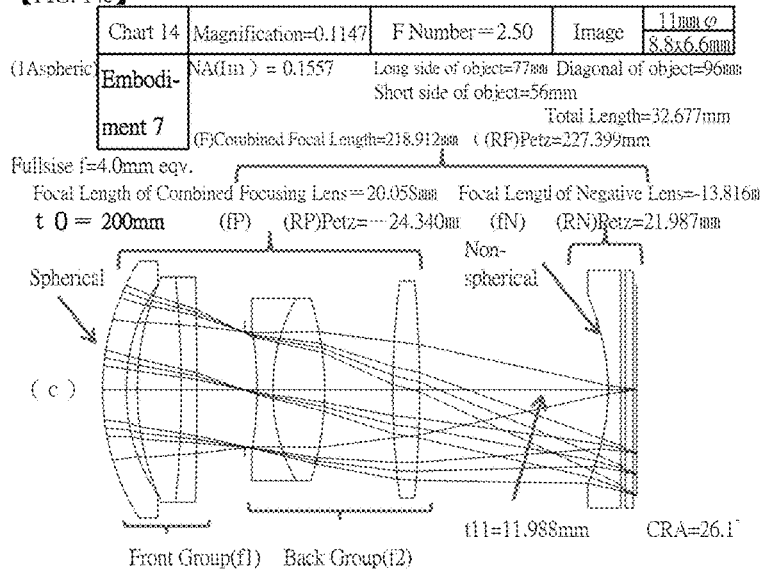
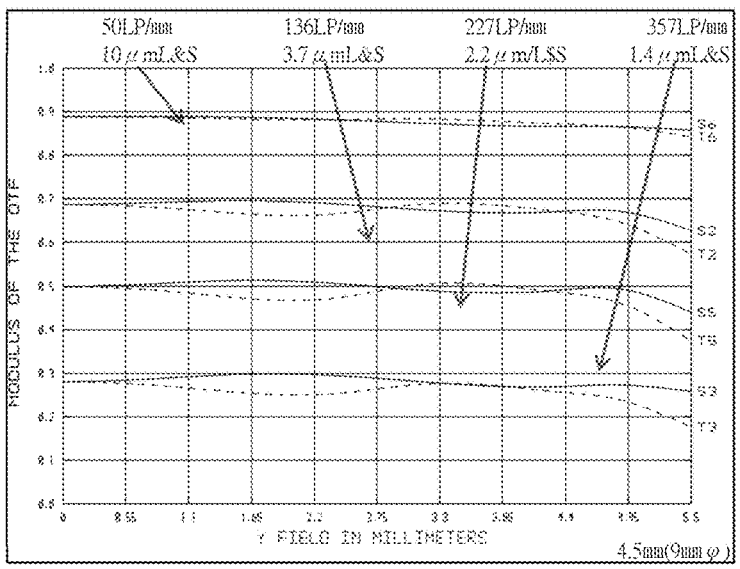
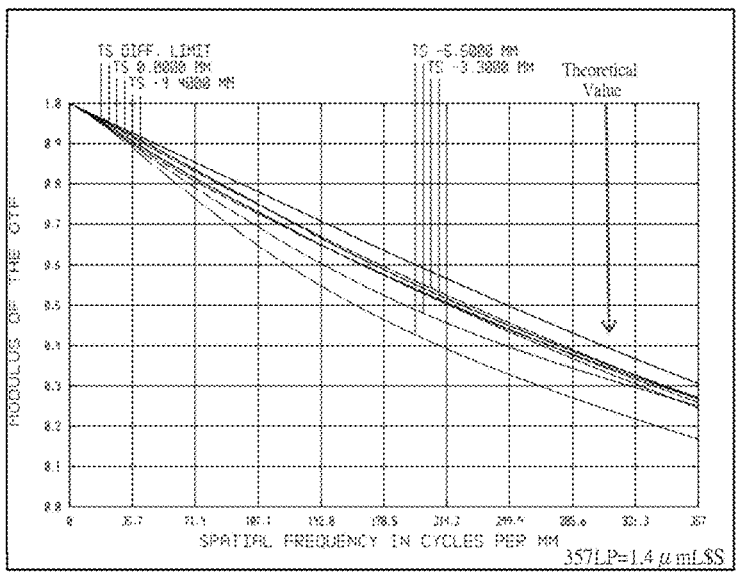

[FIG. 15]

Chart 15 — Equivalent to Fullsize 62.1mm — Embodiment 8

(a) Entirety

| Configuration | | | 4-division-6-piece + Concave (2 Aspheric) Gauss + Concave |
|---|---|---|---|
| Image Size | | | 2/3 inch 11mm φ 8.8×6.6mm |
| t0: Galileo Concave-Cover Glass | | | 0.3mm |
| t0(mm) | | ∞ | 500 | 200 |
| t1 | | 5.791 | 6.183 | 6.779 |
| (F) Combined Focal Length | | 15.889 | 15.270 | 14.416 |
| Magnification | | 1:∞ | 0.0320 | 0.08115 |
| Angle of View (Object Side) | Diagonal | ±19.1° | 136mm | 343mm |
| | Long Side | ±15.5° | 108mm | 275mm |
| | Short Side | ±11.7° | 80mm | 200mm |
| Chief Ray Angle | Diagonal | 38.1° | 34.4° | 33.6° |
| F Number | | 2.80 | 2.70 | 2.35 |
| ② Entirety Focus Plane – Front Group Paraxial Focus Plane | | −0.441 | −0.434 | −0.419 |
| (FR) Radius of Petzval Curvature | | −1695.486 | | |

Focusing Lens Assembly
| (fF) Focal Length | 14.089 |
| (R) Radius of Petzval Curvature | −17.205 |
Negative
| (f N) Concave Focal Length | −10.904 |
| Fixed Lens (fFR) Radius of Petzval Curvature | 17.381 |

Claims
| 0.8 < fP/F < 1.2 | 0.89 | 0.92 | 0.98 |
| −1.5 < f P / f N < −1.3 | −1.292 | | |
| −1.3 < RP/RN < −0.9 | −0.900 | | |
| −0.6 < D/F < −0.4 | −0.503 | | |

| Surf | Radius | Thick | Catalog | Index | Abbe | Semi-Dia |
|---|---|---|---|---|---|---|
| OBJ | Infinity | t0 | | | | 5.200 |
| *1 | 12.800 | 2.000 | L-BSL7 | 1.5163 | 64.065 | 5.200 |
| 2 | −150.314 | 0.100 | | | | 5.200 |
| 3 | 9.674 | 2.000 | S-BSM81 | 1.6400 | 60.078 | 4.400 |
| 4 | −46.795 | 0.700 | S-BAH27 | 1.7015 | 41.249 | 4.400 |
| 5 | 7.518 | 2.417 | | | | 2.500 |
| STO | Infinity | | | | | 2.200 |
| 7 | −38.106 | 0.800 | S-TIM8 | 1.5955 | 39.242 | 4.400 |
| 8 | 18.219 | 1.800 | S-BSM81 | 1.6400 | 60.078 | 4.400 |
| 9 | −26.340 | 1.153 | | | | 4.400 |
| 10 | 22.184 | 2.400 | S-FPM3 | 1.5378 | 74.703 | 5.300 |
| 11 | −15.553 | t1 | | | | 5.300 |
| *12 | −6.710 | 0.800 | L-BAL35 | 1.5891 | 61.153 | 4.700 |
| 13 | 173.009 | 0.300 | | | | 6.300 |
| 14 | Infinity | 0.600 | BSL7 | 1.5163 | 54.150 | 6.400 |
| 15 | Infinity | 0.200 | | | | 6.400 |
| IMA | Infinity | −8.0 | | | | 6.200 |

D = (Virtual) Projection Pupil = 8.0

| | D/F |
| | −0.503 |

| Surf | Radius | 2nd Term | 4th Term | 6th Term | 8th Term | 10th Term |
|---|---|---|---|---|---|---|
| *1 Aspheric | 12.800 | 0.000 | −6.13E-05 | −4.22E-06 | 2.35E-07 | −5.58E-09 |
| *12 Aspheric | −6.710 | 0.000 | 3.98E-04 | 2.15E-05 | −9.12E-07 | 2.07E-08 |

| Wavelength | C | d | F | |
|---|---|---|---|---|
| λ nm | 0.546 | 0.436 | 0.486 | 0.579 | 0.656 |
| Weight | 1.0 | 0.2 | 0.2 | 0.6 | 0.2 |

| Glass Name | L-LAH53 | L-LAL13 | L-BAL35 | L-BAL7 |
| Refraction Index N d | 1.8061 | 1.6935 | 1.5891 | 1.5163 |

Concave Lens
| | R1 | R2 | d | fR1 | F |
|---|---|---|---|---|---|
| L-LAL53 | −7.695 | −226.444 | 6.1 | −0.795 | 15.892 |
| L-LAL13 | −7.283 | 381.195 | 5.84 | −0.802 | 15.888 |
| L-BAL35 | −6.71 | 173.009 | 6.10 | −0.929 | 15.889 |
| L-BSL7 | −6.619 | 119.684 | 6.30 | −0.952 | 15.887 |

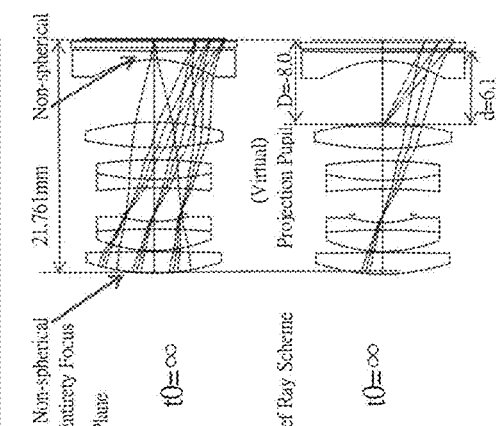

(b) Chief Ray Scheme

Non-spherical Entirety Focus Plane
Non-spherical
21.761mm
t0 = ∞

(Virtual) Projection Pupil D = 8.0
d = 6.1
t0 = ∞

[FIG. 16a]

| Chart 16 | Magnification=1/∞ | F Number=2.80 | Image | 11mm φ 8.8x6.6mm |

(2Aspheric) Embodiment 8

NA(Im) = 0.1758

Long-side Angle=±15.5°  Diagonal Angle=±19.1°
Short-side Angle=±11.7°

Total Length=21.761mm (F)Combined Focal Length=15.889mm  (RF)Petz=-1695.486mm

Fullsize f=62.1mm eqv.

Focal Length of Combined Focusing Lens=14.089mm  Focal Length of Negative Lens=-10.904mm (P) (RP)Petz=-17.205mm  (N) (RN)Petz=17.381mm $t0 = \infty$ Non-spherical / Non-spherical (a)

Front Group(f1)  Back Group(f2)  CRA=38.1°
f1=30.290        f2=14.440       t11=5.791mm
         f1/f2= 2.098

【FIG. 16b】
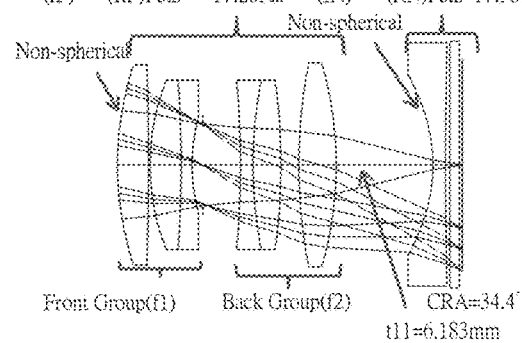
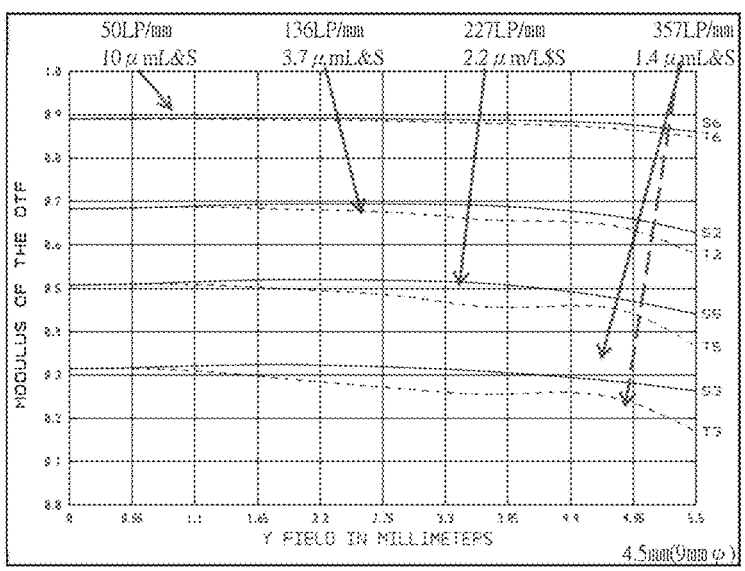
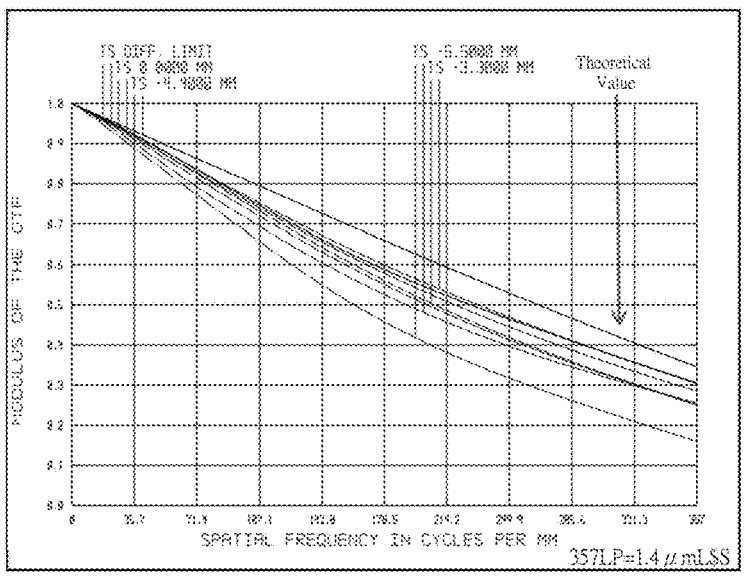

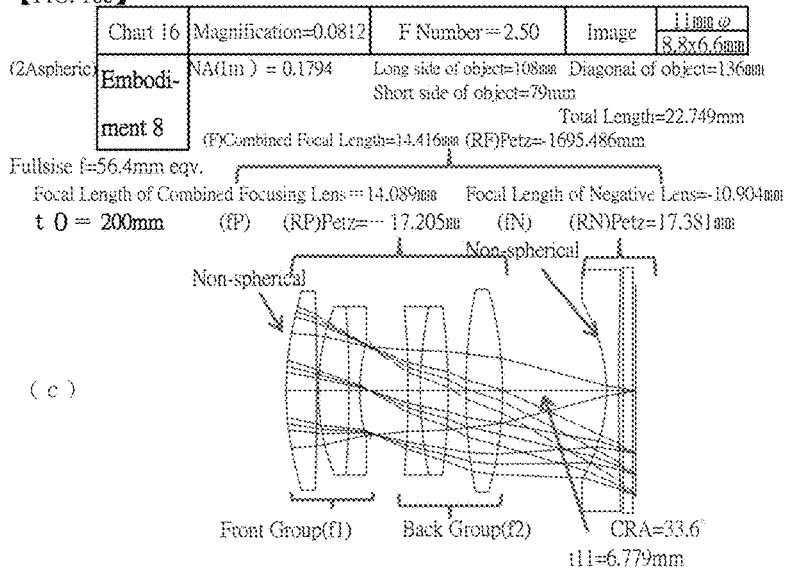
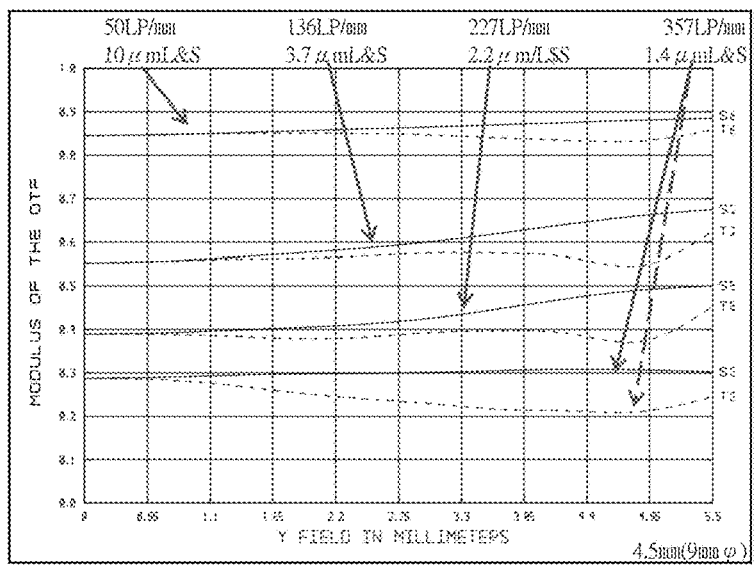
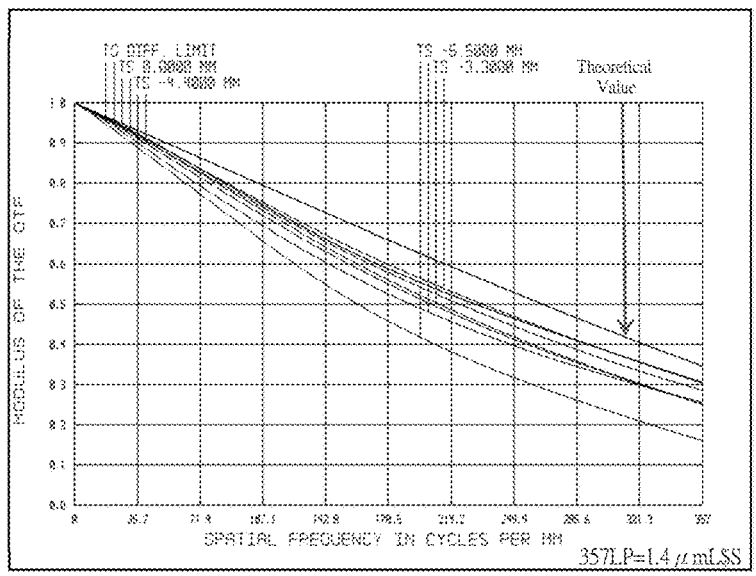

[FIG. 17]

Chart 17

| | | Embodiment 9 | |
|---|---|---|---|
| | Equivalent to Fullsize 86.0mm | | |
| | Configuration | 4-division-6-piece + Concave (2 Aspheric) | |
| | | Gauss+Concave | |
| | Image Size | 2/3inch | 11mm φ 8.8×6.6mm |
| | t1: Galileo Concave+Cover Glass | 0.3mm | |
| (a) Entirety | t[mm] | ∞ | 500 | 200 |
| | t1 | 3.963 | 4.189 | 4.533 |
| | (F) Combined Focal Length | 12.528 | 12.139 | 11.593 |
| | Magnification | 1/∞ | 0.0252 | 0.06348 |
| | Angle of View (Object Side) | Diagonal | ±23.7 | 437mm | 167mm |
| | | Long Side | ±19.4 | 349mm | 133mm |
| | | Short Side | ±14.8 | 254mm | 97mm |
| | Chief Ray Angle | Diagonal | 37.2 | 36.5 | 36.6 |
| | F Number | 2.80 | 2.90 | 2.75 |
| | ②Entirety Focus Plane - Front Group Paraxial Focus Plane | -0.648 | -0.641 | -0.630 |
| | (FR)Radius of Petzval Curvature | 564.879 | | |
| Focusing Lens Assembly | (F)Focal Length | 10.801 | | |
| | (R)Radius of Petzval Curvature | -13.400 | | |
| Negative Fixed Lens | ( f N ) Concave Focal Length | -8.206 | | |
| | (fR)Radius of Petzval Curvature | 13.089 | | |
| Claims | 0.8<fY/f<1.2 | 0.86 | 0.89 | 0.93 |
| | -1.5< f P/ f N <-1.1 | -1.316 | | |
| | -1.3<RP/RN<-0.9 | -1.024 | | |
| | -0.6<D/F<-0.4 | -0.549 | | |

| Surf | Radius | Thick | Catalog | Glass Index | Abbe | Semi-Dia |
|---|---|---|---|---|---|---|
| OBJ | Infinity | t0 | | | | 5.300 |
| *1 | 11.870 | 1.800 | L-BSL7 | 1.5163 | 64.065 | 5.300 |
| 2 | 61.306 | 0.100 | | | | 4.100 |
| 3 | 7.422 | 2.500 | S-BSM81 | 1.6400 | 60.078 | 4.100 |
| 4 | 52.604 | 0.800 | S-BAH27 | 1.7015 | 41.239 | 4.100 |
| 5 | 4.305 | 0.800 | | | | 2.000 |
| STO | Infinity | 0.590 | | | | 1.500 |
| 7 | 312.142 | 0.800 | S-TIM8 | 1.5955 | 39.242 | 4.200 |
| 8 | 6.282 | 2.561 | S-BSM81 | 1.6400 | 60.078 | 4.200 |
| 9 | -20.041 | 0.100 | | | | 4.200 |
| 10 | 47.319 | 3.100 | S-FPM3 | 1.5378 | 74.703 | 4.900 |
| 11 | -6.675 | t11 | | | | 4.900 |
| *12 | -5.065 | 0.800 | L-BAL35 | 1.5891 | 61.153 | 4.400 |
| 13 | 122.974 | 0.900 | | | | 6.000 |
| 14 | Infinity | 0.500 | BSL7 | 1.5163 | 54.150 | 6.400 |
| 15 | Infinity | 0.200 | | | | 6.400 |
| IMA | Infinity | | | | | 6.300 |

D=(Virtual) Projection Pupil=-6.88
D/F -0.549

| Surf | Radius | d | dR1 | 2ndTerm | 4thTerm | 6thTerm | 8thTerm | 10thTerm |
|---|---|---|---|---|---|---|---|---|
| *1Aspheric | 11.870 | 0.000 | -0.905 | 0.000 | -2.02E-04 | 1.12E-06 | 3.30E-08 | 7.40E-10 |
| *12Aspheric | -5.065 | 0.436 | -0.953 | 2.50E-03 | 1.06E-05 | 2.64E-06 | 1.28E-07 | |

| | Wavelength | R1 | R2 | d | dR1 | D | F | D/F |
|---|---|---|---|---|---|---|---|---|
| | [nm] | | | | | | | |
| | Weight | | | | | | | |
| | | 0.546 | -209.812 | 4.93 | -0.905 | -6.73 | 12.501 | -0.538 |
| | | 1.0 | -1193.66 | 4.95 | -0.953 | -6.75 | 12.614 | -0.535 |

| | Glass Name | L-LAH53 | L-LAL13 | L-BAL35 | L-BSL7 |
|---|---|---|---|---|---|
| | Refraction Index N.d | 1.8061 | 1.6935 | 1.5891 | 1.5163 |

| Concave Lens | | | |
|---|---|---|---|
| L-LAL53 | -5.445 | | |
| L-LAL13 | -5.192 | | |
| L-BAL35 | -5.065 | | |
| L-BSL7 | -5.124 | | |

| | | 0.486 | 122.974 | 5.08 | -1.003 | -6.88 | 12.528 | -0.549 |
| | | 0.656 | 70.937 | 5.23 | -1.031 | -7.03 | 12.530 | -0.561 |

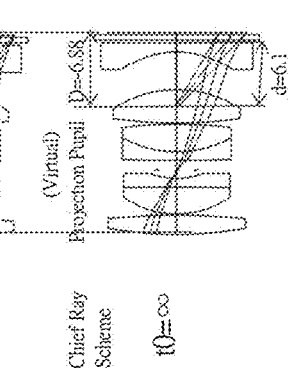

(b) Chief Ray Scheme

Entirety Focus Plane
t0=∞
16.785mm Non-spherical (Virtual) Projection Pupil D=-6.88
t0=∞
d=6.1

[FIG. 18a]
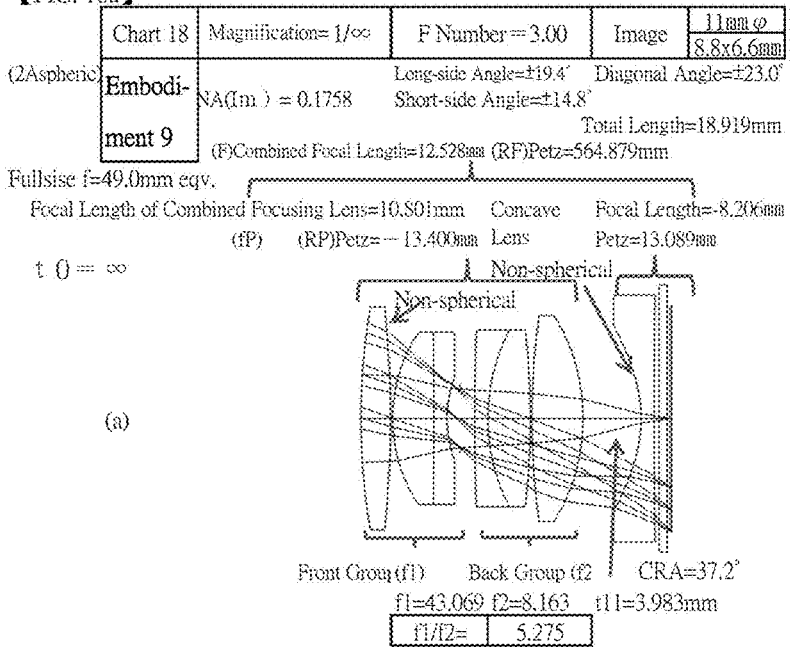
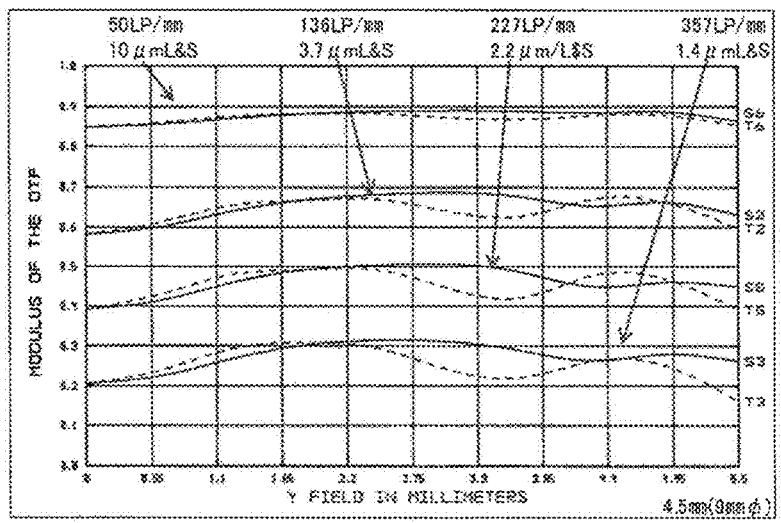
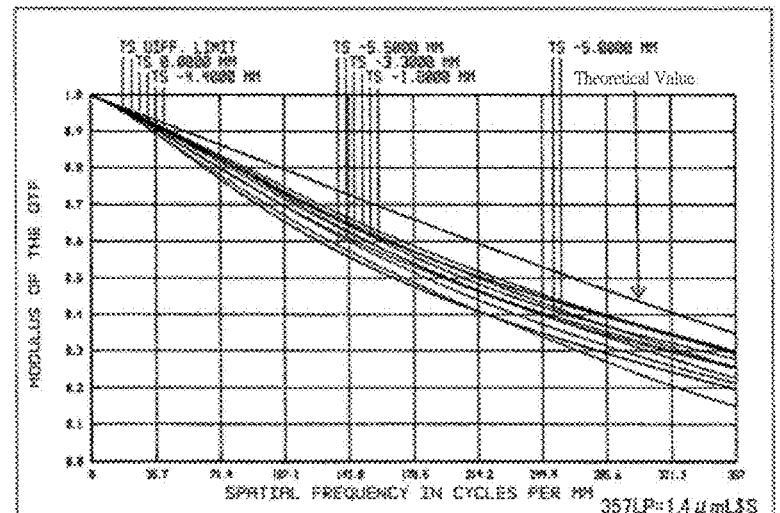

【FIG. 18b】
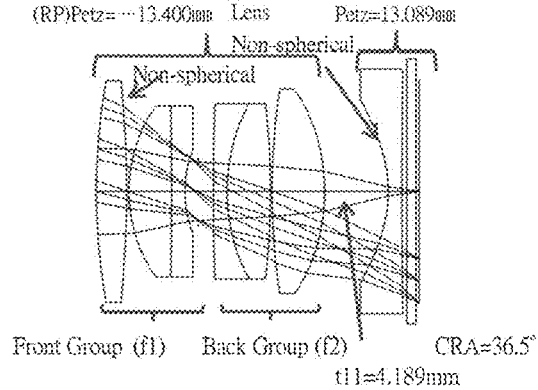
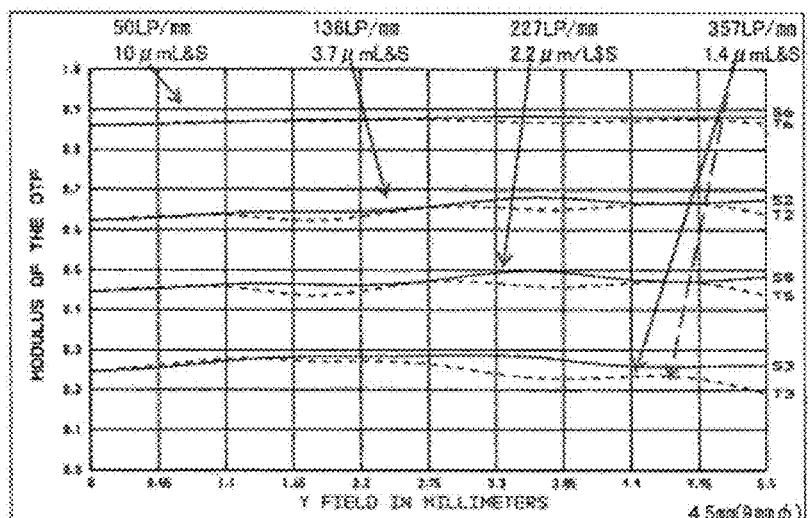
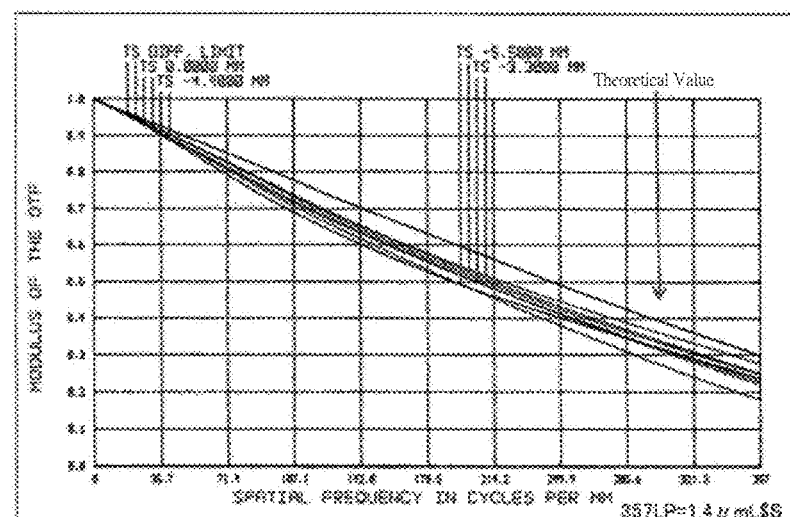

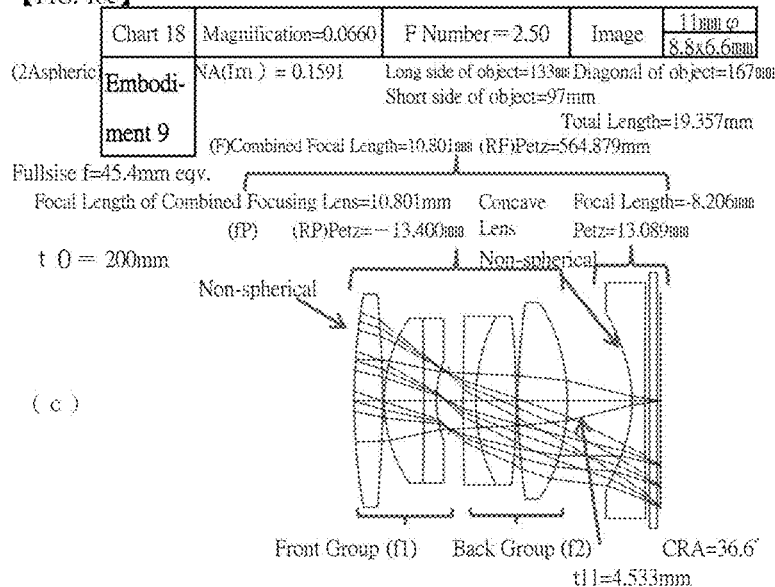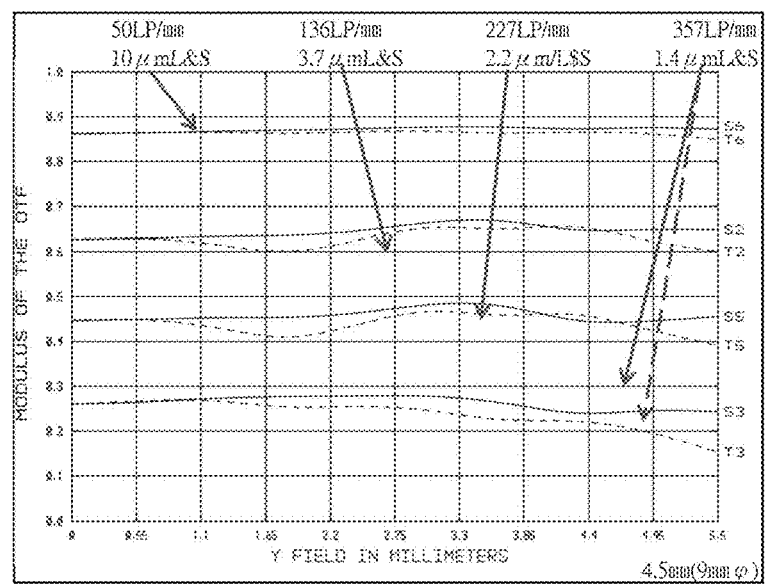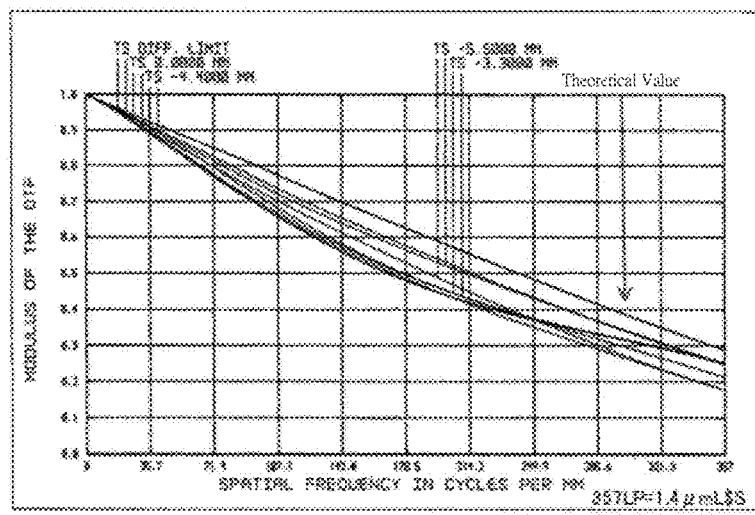

[FIG. 19]
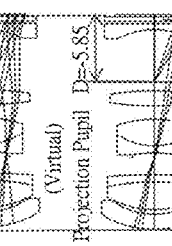

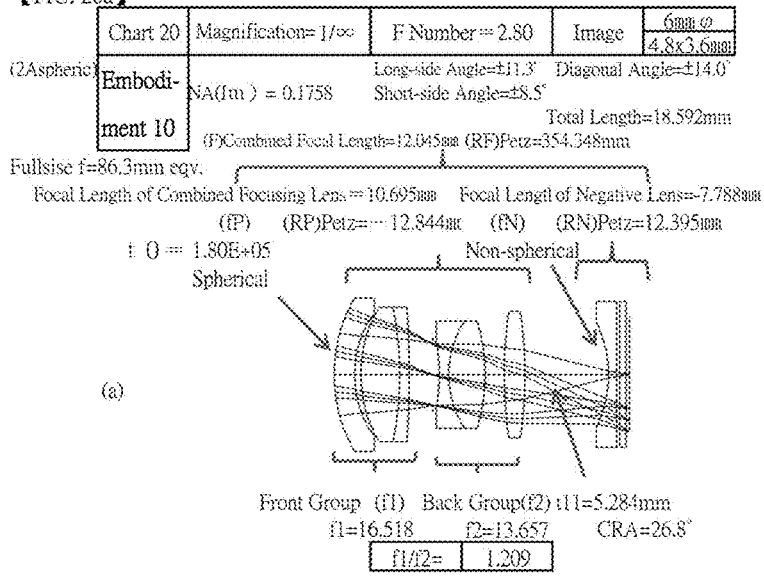
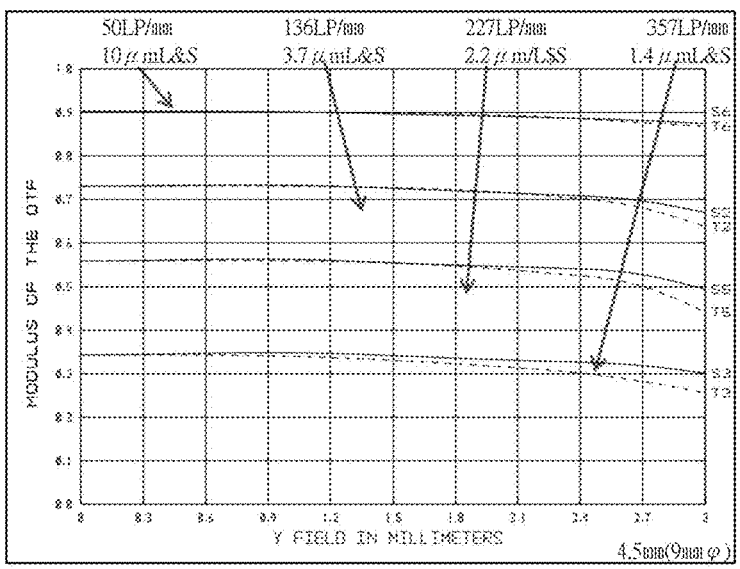
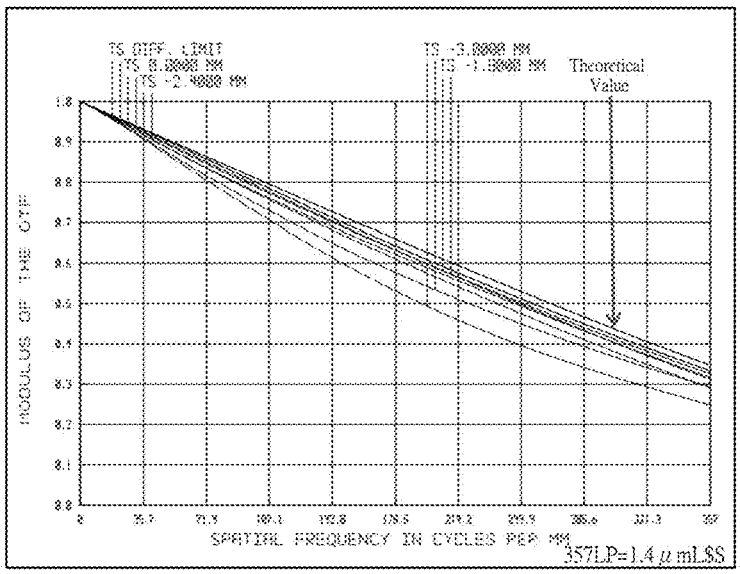

[FIG. 20b]
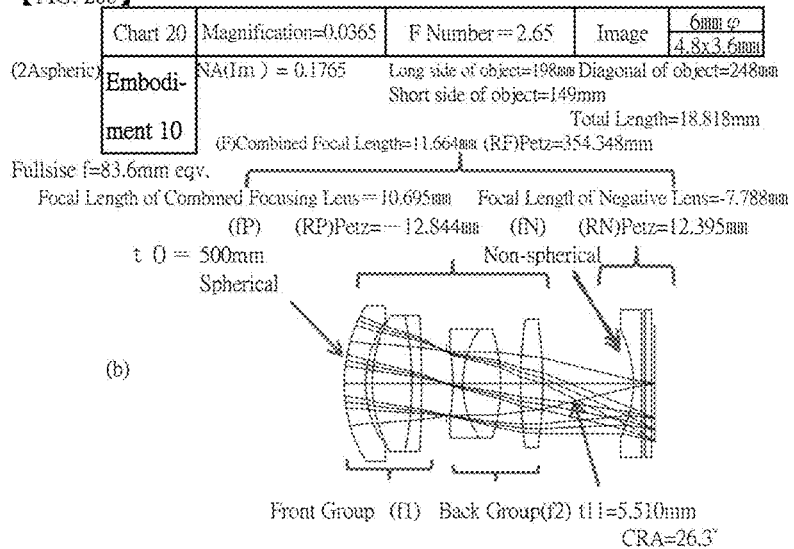
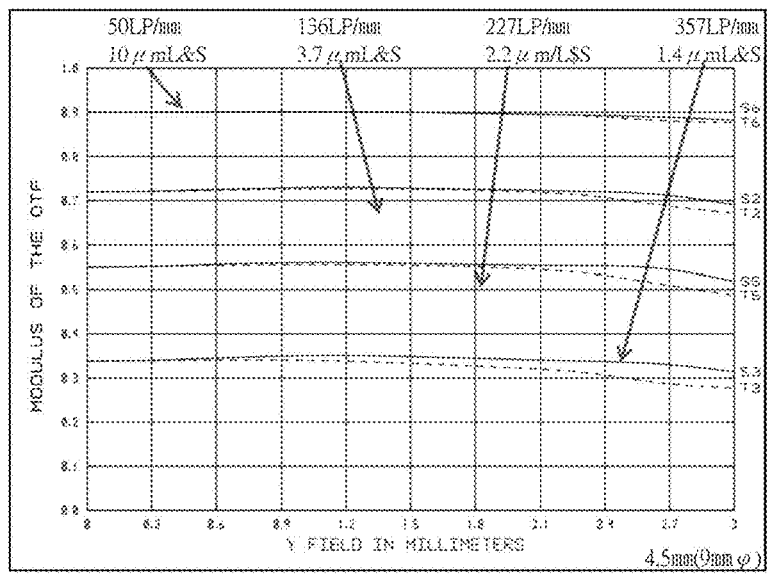
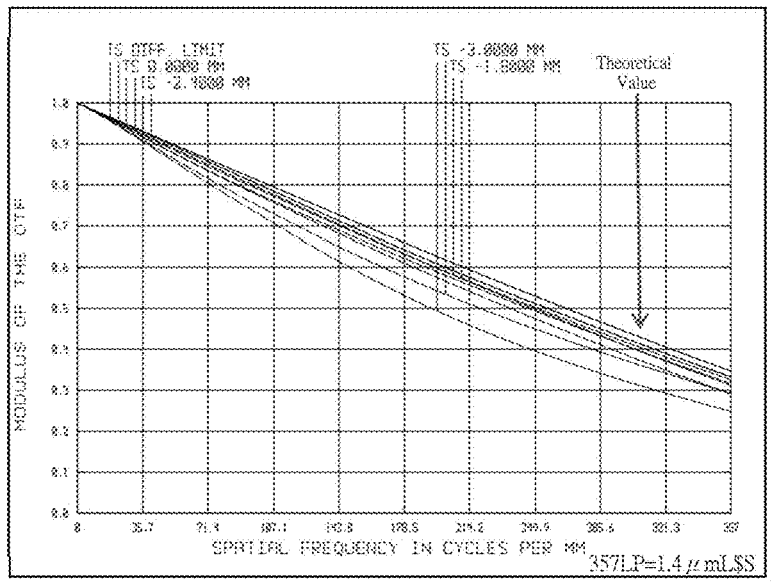

[FIG. 20c]

| Chart 20 | Magnification=0.0820 | Number = 2.45 | Image | 6mm φ |
|---|---|---|---|---|
| | | | | 4.8x3.6mm |

(2Aspheric) Embodiment 10

NA(1m) = 0.1676    Long side of object=59mm    Diagonal of object=73㎜
                   Short side of object=44mm
                                                Total Length=19.354mm
(F)Combined Focal Length=10.348mm  (RF)Petz=354.348mm Fullsize f=77.7mm eqv.

Focal Length of Combined Focusing Lens = 10.695mm    Focal Length of Negative Lens=-7.788mm
   (fP)    (RP)Petz=-12.844mm    (fN)    (RN)Petz=12.395mm t 0 = 150mm
Spherical        Non-spherical (c)

Front Group(f1)  Back Group(f2)
                                t11=6.046mm
                                CRA=26.1°

[FIG. 21]

Chart 21 — Equivalent to Fullsize 62.1mm

Embodiment 11
4-division·5-piece + Concave (2 Aspheric)
Gauss+Concave
1/3inch 6mm φ 4.8x3.6mm

| | Configuration | | | | | | | | |
|---|---|---|---|---|---|---|---|---|---|
| | Image Size | 0.2mm | | | | | | | |
| | t1 3: Galileo Concave-Cover Glass | ∞ | 500 | 150 | | | | | |
| | t0[mm] | 2.412 | 2.521 | 2.777 | | | | | |
| | t11 | 8.666 | 8.476 | 8.060 | | | | | |
| | (F) Combined Focal Length | 1/∞ | 0.0174 | 0.05894 | | | | | |
| | Magnification | 1/∞ | 345mm | 102mm | | | | | |
| Entirety | Angle of View (Object Side) Diagonal | ±19.1° | ±15.5° | ±11.7° | | | | | |
| | Long Side | 276mm | 207mm | | | | | | |
| | Short Side | 81mm | 61mm | | | | | | |
| | Chief Ray Angle | 32.8° | 32.4° | 32.2° | | | | | |
| | F Number Diagonal | 2.80 | 2.70 | 2.55 | | | | | |
| | | −0.268 | −0.266 | −0.256 | | | | | |
| | (FR)Radius of Petzval Curvature | −3128.683 | | | | | | | |
| | | Entirety Focus Plane − Front Group Paraxial Focus Plane | | | | | | | |
| Focusing Lens | (fP)Focal Length | 7.460 | | | | | | | |
| Assembly | (R1)Radius of Petzval Curvature | −8.970 | | | | | | | |
| Negative | ( f N ) Concave Focal Length | −5.644 | | | | | | | |
| Fixed Lens | (FR)Radius of Petzval Curvature | 8.996 | | | | | | | |
| | | 0.86 | 0.88 | 0.93 | | | | | |
| | | −1.322 | | | | | | | |
| | | −0.997 | | | | | | | |
| Claims | 0.8<fP/f·N<1.2 | | | | | | | | |
| | −1.5< f P / f N<−1.1 | | | | | | | | |
| | −1.3<RP/RN<−0.9 | −0.525 | | | | | | | |
| | −0.6<D/F<−0.4 | | | | | | | | |

| Surf | Radius | Thick | Catalog | Glass Index | Abbe | Semi-Dia |
|---|---|---|---|---|---|---|
| OBJ | Infinity | t0 | | | | |
| *1 | 9.280 | 1.300 | L-BSL7 | 1.5163 | 64.065 | 3.000 |
| 2 | −49.227 | 0.100 | | | | 3.000 |
| 3 | 4.556 | 1.200 | S-BSM81 | 1.6400 | 60.078 | 2.500 |
| 4 | 29.198 | 0.400 | S-BAH27 | 1.7015 | 41.233 | 2.500 |
| 5 | 3.792 | 0.300 | | | | 1.300 |
| STO | Infinity | 0.300 | | | | 1.200 |
| 7 | −18.242 | 0.400 | S-TIM8 | 1.5955 | 39.242 | 1.500 |
| 8 | 5.918 | 1.300 | S-BSM81 | 1.6400 | 60.078 | 2.200 |
| 9 | −11.696 | 1.687 | | | | 2.200 |
| 10 | 11.305 | 1.600 | S-FPM3 | 1.5378 | 74.703 | 3.100 |
| 11 | −8.049 | t11 | | | | 3.100 |
| *12 | −3.470 | 0.400 | L-BAL35 | 1.5891 | 61.153 | 2.600 |
| 13 | 91.634 | 0.200 | | | | 3.500 |
| 14 | Infinity | 0.400 | BSL7 | 1.5163 | 54.150 | 3.800 |
| 15 | Infinity | 0.200 | | | | 3.800 |
| IMA | Infinity | −4.55 | | | | 3.800 |

D=(Virtual) Projection Pupil=-4.55

| | Wavelength | λ[nm] | D/F | 2ndTerm | 4thTerm | 6thTerm | 8thTerm | 10bTerm |
|---|---|---|---|---|---|---|---|---|
| *1 Aspheric | | | −0.525 | 0.000 | −3.72E-04 | −7.03E-05 | 1.17E-05 | −8.90E-07 |
| *12 Aspheric | | | | 0.000 | 4.76E-03 | 1.25E-04 | −1.29E-04 | 2.61E-05 |
| | Weight | 1.0 | | 0.436 | 0.486 | 0.579 | 0.656 | |
| | | | | 0.6 | 0.2 | 0.6 | 0.2 | |

| | Glass Name | L-LAH53 | L-LAL13 | L-BAL35 | L-BSL7 |
|---|---|---|---|---|---|
| | Refraction Index N_d | 1.8061 | 1.6935 | 1.5891 | 1.5163 |

| Concave Lens | R1 | R2 | d | dR1 | D | F | D/F |
|---|---|---|---|---|---|---|---|
| L-LAH53 | −3.658 | −161.833 | 3.2 | −0.875 | −4.4 | 8.670 | −0.507 |
| L-LAL13 | −3.605 | 159.443 | 3.25 | −0.902 | −4.45 | 8.667 | −0.513 |
| L-BAL35 | −3.470 | 91.634 | 3.55 | −1.023 | −4.55 | 8.666 | −0.525 |
| L-BSL7 | −3.328 | 64.758 | 3.50 | −1.052 | −4.70 | 8.666 | −0.542 |

(a)

(b) (Virtual) Projection Pupil D=-4.55

Chief Ray Scheme

Non-spherical
Entirety Focus Plane
12.190mm Non-spherical t0=∞
d=3.55
t0=∞

[FIG. 22a]
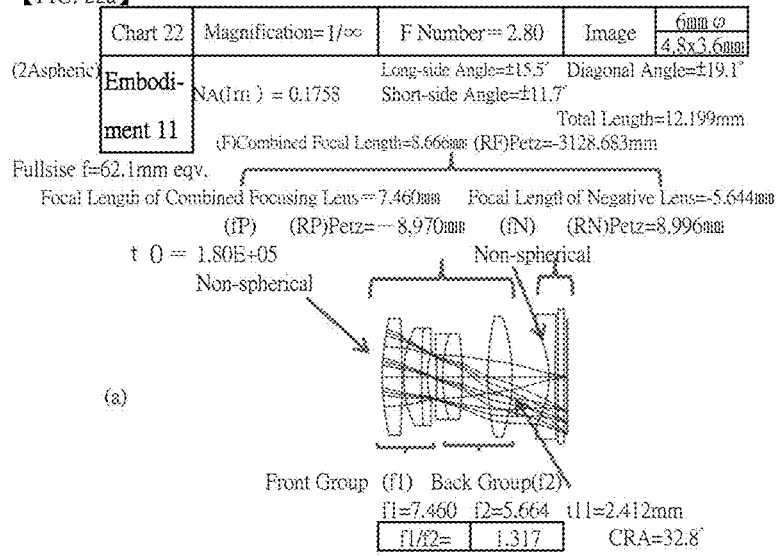
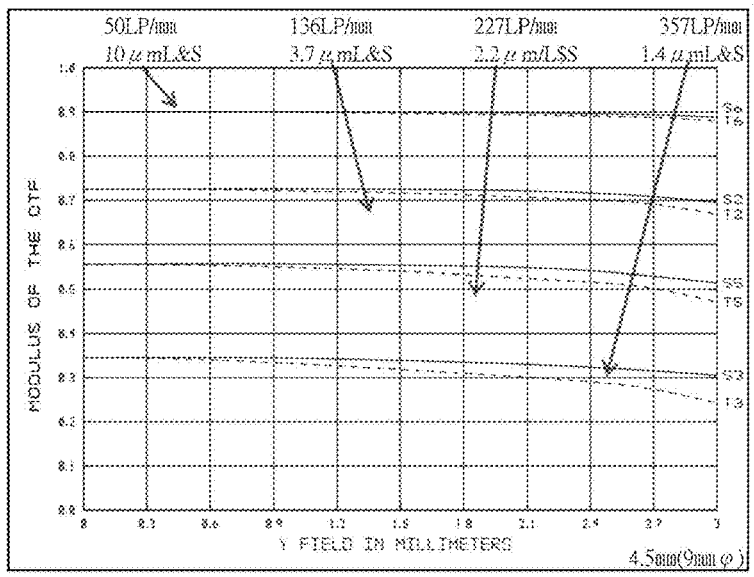
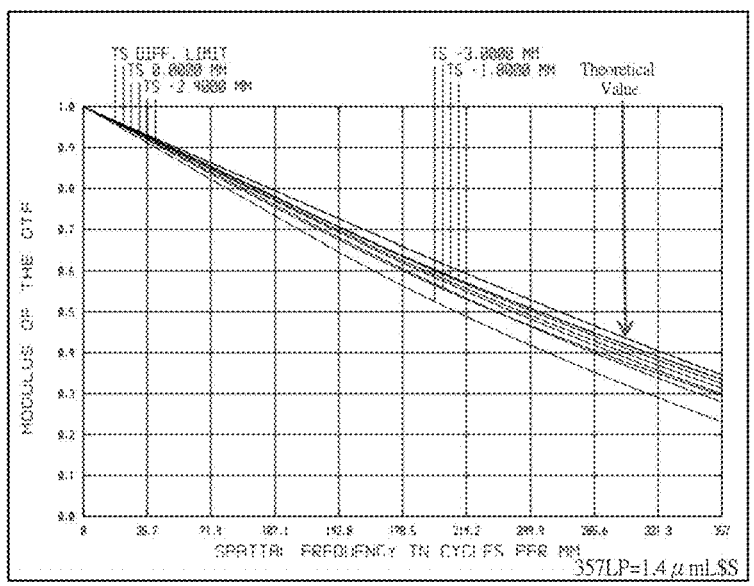

【FIG. 22b】
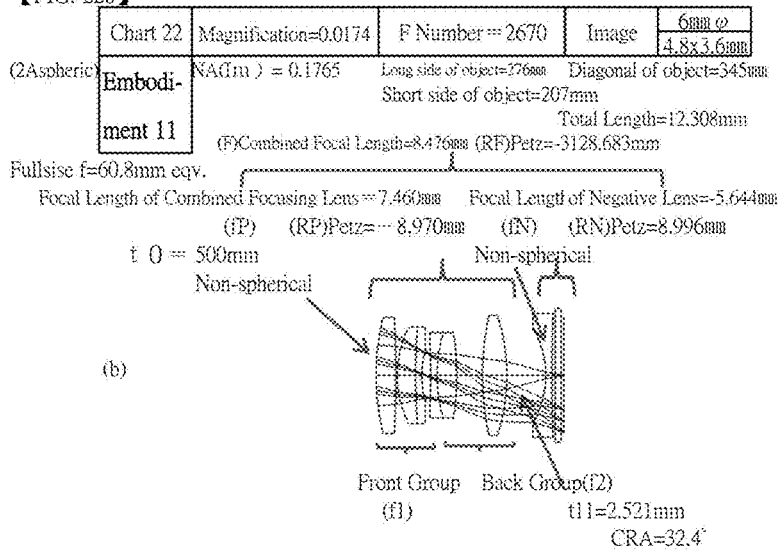
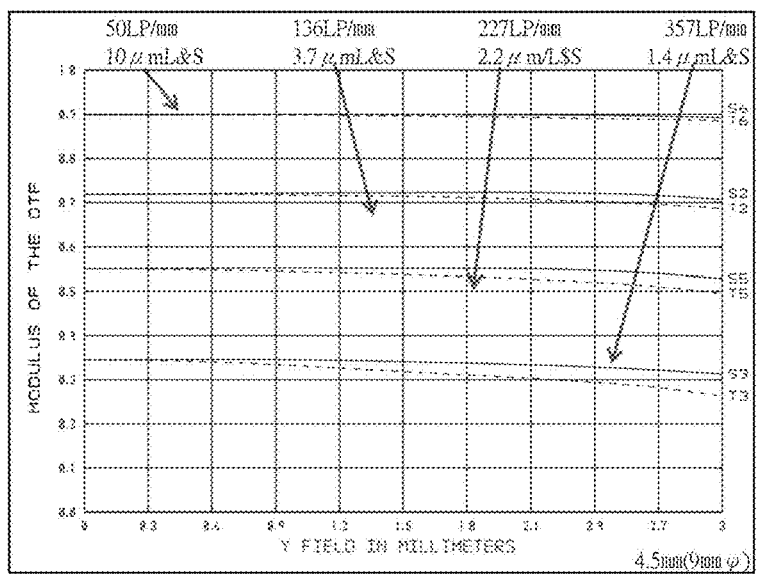
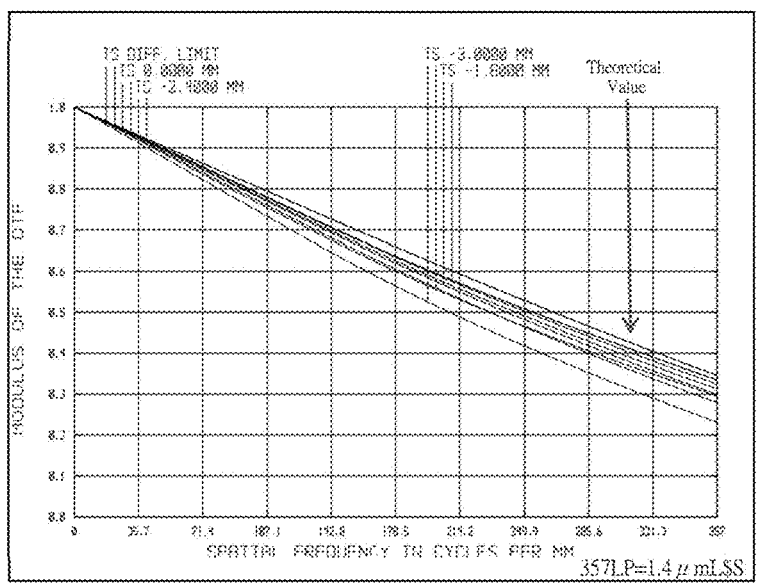

[FIG. 22c]

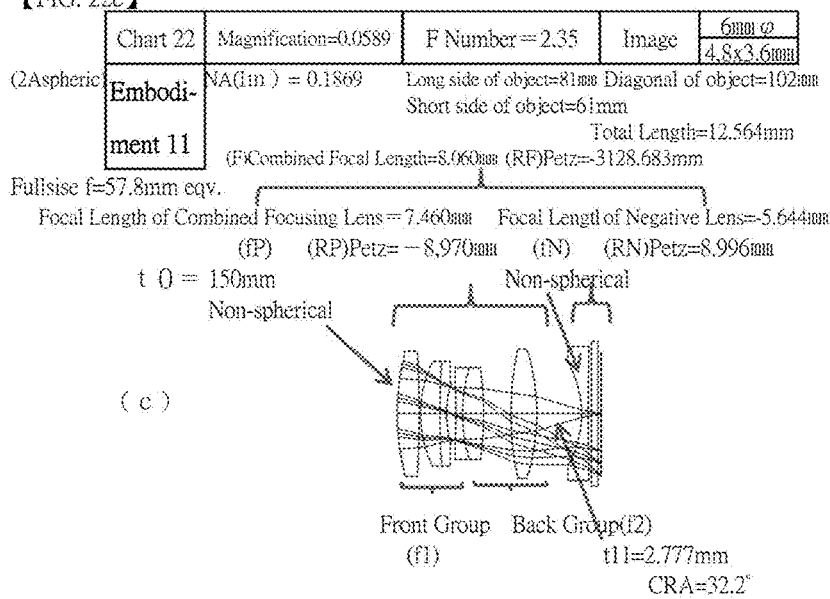

(2Aspheric Embodiment 11)
Chart 22, Magnification=0.0589, F Number=2.35, Image= 6mm φ / 4.8x3.6mm
NA(in) = 0.1869, Long side of object=81mm, Diagonal of object=102mm
Short side of object=61mm
Total Length=12.564mm
(F)Combined Focal Length=8.060mm (RF)Petz=-3128.683mm
Fullsize f=57.8mm eqv.
Focal Length of Combined Focusing Lens = 7.460mm    Focal Length of Negative Lens=-5.644mm
(fP)    (RP)Petz=-8.970mm    (fN)    (RN)Petz=8.996mm
t 0 = 150mm    Non-spherical
Non-spherical
(c)
Front Group    Back Group(f2)
(f1)    t11=2.777mm
CRA=32.2°

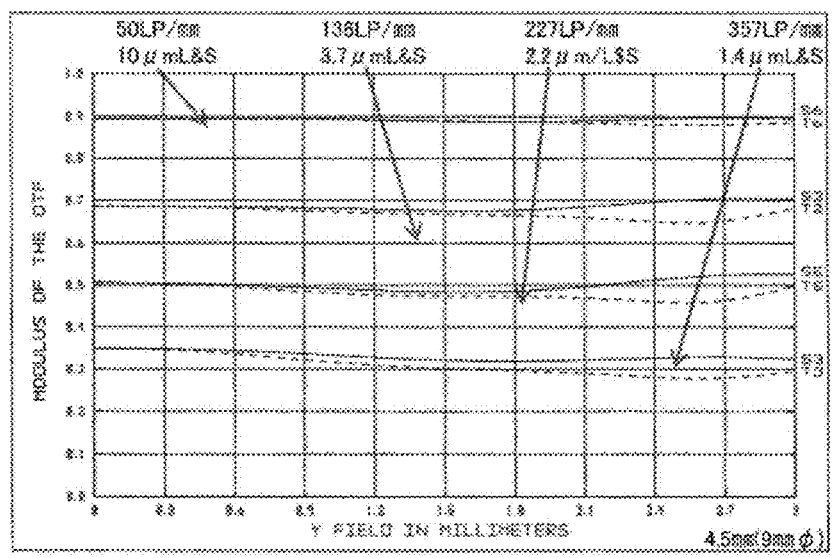

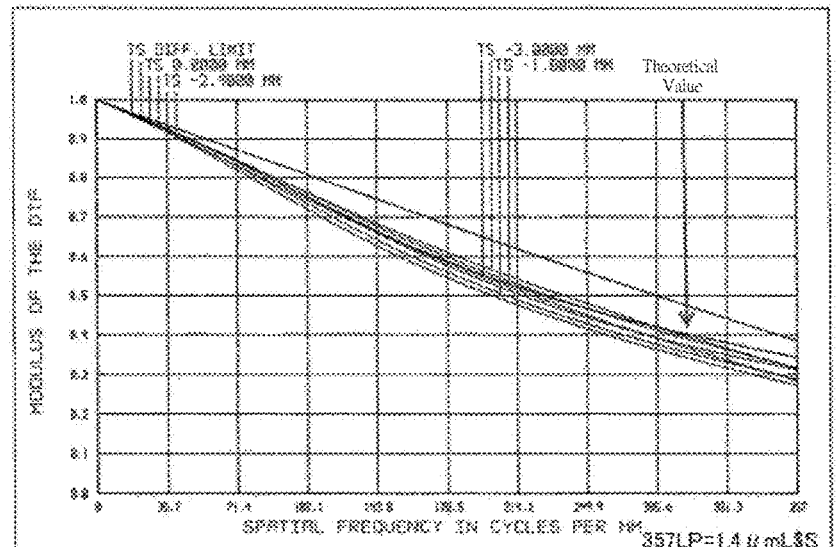

[FIG. 23]

Chart 23

(a)

| | Equivalent to Fullsize 48.2mm | Embodiment 12 | | | | | | | | |
|---|---|---|---|---|---|---|---|---|---|---|
| | Configuration | 4-division-6-piece + Concave (2 Aspheric) Gauss+Concave | | | | | | | | |
| | Image Size | 1/3inch 6mm φ 4.8x3.6mm | | | | | | | | |
| | | 0.2mm | | | | | | | | |
| | t0[mm] | ∞ | 500 | 150 | | | | | | |
| | t11 | 1.733 | 1.793 | 1.933 | | | | | | |
| | (F) Combined Focal Length | 6.721 | 6.615 | 6.379 | | | | | | |
| | Magnification | 1/∞ | 0.0135 | 0.0454 | | | | | | |
| Entirety | Angle of View (Object Side) | Diagonal | ±24.1 | 445mm | 132mm | | | | | |
| | | Long Side | ±19.7 | 356mm | 79mm | | | | | |
| | | Short Side | ±15.0 | 267mm | 61mm | | | | | |
| | Chief Ray Angle | Diagonal | 39.2° | 38.5° | 38.7° | | | | | |
| | F Number | | 2.80 | 2.70 | 2.50 | | | | | |
| | (7)Entirety Focus Phase - Front Group Paraxial Focus Plane | | −0.300 | −0.297 | −0.291 | | | | | |
| | (FR)Radius of Petzval Curvature | | −127.382 | | | | | | | |
| Focusing Lens | (F)Focal Length | | 5.575 | | | | | | | |
| Assembly Negative | (R)Radius of Petzval Curvature | | −6.776 | | | | | | | |
| | ( F N ) Concave Focal Length | | −4.501 | | | | | | | |
| Fixed Lens | (fR)Radius of Petzval Curvature | | 7.157 | | | | | | | |
| Claims | 0.8<fPf<1.2 | | 0.84 | 0.83 | 0.87 | | | | | |
| | −1.5< f P/ f N <−1.1 | | −1.239 | | | | | | | |
| | −1.3<RP/fRN<−0.9 | | −0.947 | | | | | | | |
| | −0.6<D/F<−0.4 | | −0.526 | | | | | | | |

| Surf | Radius | Thick | Catalog | Glass Index | Abbe | Semi-Dia |
|---|---|---|---|---|---|---|
| OBJ | Infinity | t0 | | | | |
| 1 | −1891.67 | 1.000 | L-BSL7 | 1.5163 | 64.065 | 3.000 |
| *2 | −10.414 | 0.100 | | | | 3.000 |
| 3 | 3.446 | 1.500 | S-BSM81 | 1.6400 | 60.078 | 2.200 |
| 4 | −12.828 | 0.400 | S-BAH27 | 1.7015 | 41.233 | 2.200 |
| STO | 3.031 | 0.333 | | | | 1.100 |
| 6 | Infinity | 0.498 | | | | 1.000 |
| 7 | 33.962 | 0.400 | S-TIM8 | 1.5955 | 39.242 | 2.400 |
| 8 | 4.921 | 1.300 | S-BSM81 | 1.6400 | 60.078 | 2.400 |
| 9 | −15.772 | 0.100 | | | | 2.400 |
| 10 | 14.257 | 1.600 | S-FPM3 | 1.5378 | 74.703 | 2.700 |
| 11 | −4.842 | t11 | | | | 2.700 |
| *12 | −2.622 | 0.400 | L-BAL35 | 1.5891 | 61.153 | 2.300 |
| 13 | −185.763 | 0.200 | | | | 3.000 |
| 14 | Infinity | 0.400 | BSL7 | 1.5163 | 54.150 | 3.500 |
| 15 | Infinity | 0.200 | | | | 3.500 |
| IMA | Infinity | | | | | 3.800 |

Da(Virtual) Projection Pupil=3.6

| | | D/F | | | | | | | |
|---|---|---|---|---|---|---|---|---|---|
| | | −0.526 | | | | | | | |

| Surf | Radius | 2ndTerm | 4thTerm | 6thTerm | 8thTerm | 10thTerm |
|---|---|---|---|---|---|---|
| *2Aspheric | −10.414 | 0.000 | 1.55E-03 | −3.28E-05 | −4.55E-06 | 6.52E-07 |
| *12Aspheric | −2.622 | 0.000 | 8.34E-03 | 1.64E-03 | −3.61E-04 | 5.34E-05 |

| Wavelength | | | | | | |
|---|---|---|---|---|---|---|
| Weight | | | | | | |

| Glass Name | L-LAH53 | L-LAL13 | L-BAL35 | L-BSL7 | | |
|---|---|---|---|---|---|---|
| Refraction Index N d | 1.80611 | 1.69351 | 1.5891 | 1.5163 | | |

| Concave Lens | R1 | R2 | d | dR1 | D | F | D/F |
|---|---|---|---|---|---|---|---|
| L-LAH53 | −2.514 | −22.622 | 2.3 | −0.915 | −3.5 | 6.708 | −0.522 |
| L-LAL13 | −2.644 | −35.640 | 2.5 | −0.946 | −3.68 | 6.711 | −0.548 |
| L-BAL35 | −2.622 | −185.760 | 2.40 | −0.915 | −3.6 | 6.722 | −0.536 |
| L-BSL7 | −2.636 | 83.413 | 2.56 | −0.971 | −3.77 | 6.724 | −0.561 |

(b)

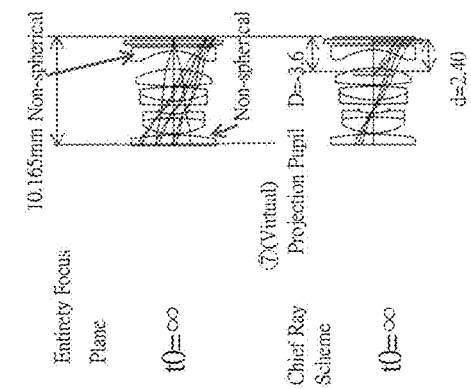

Entirety Focus Plane
t0=∞

Chief Ray Scheme
(7)(Virtual) Projection Pupil D=3.6 t0=∞

10.165mm Non-spherical
Non-spherical d=2.40

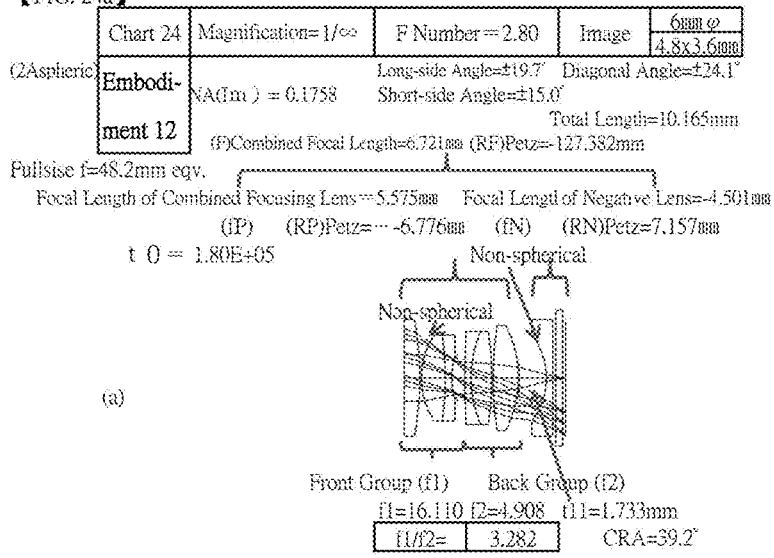
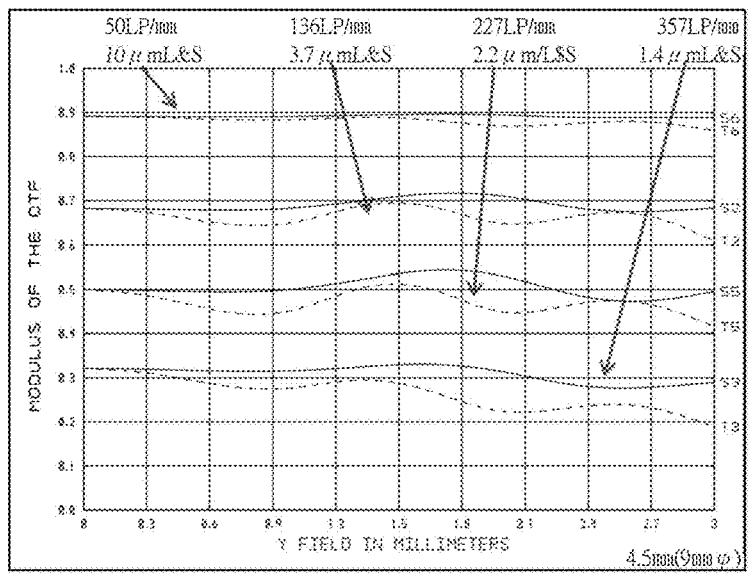
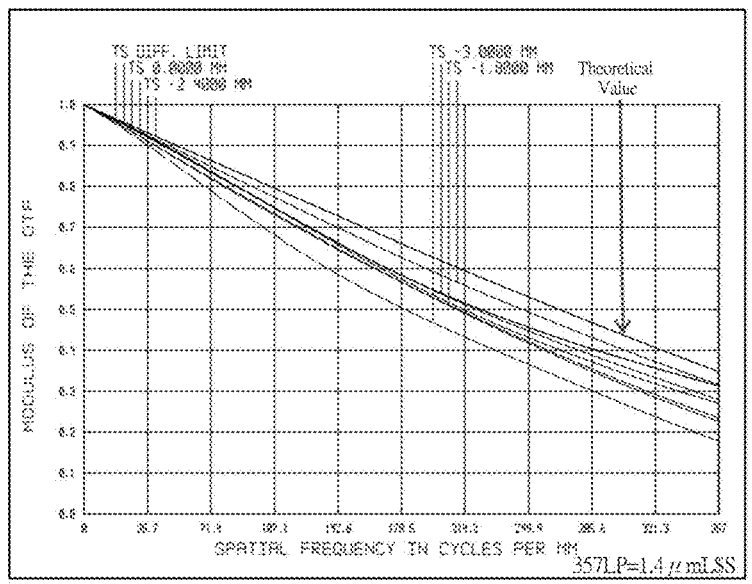

[FIG. 24b]
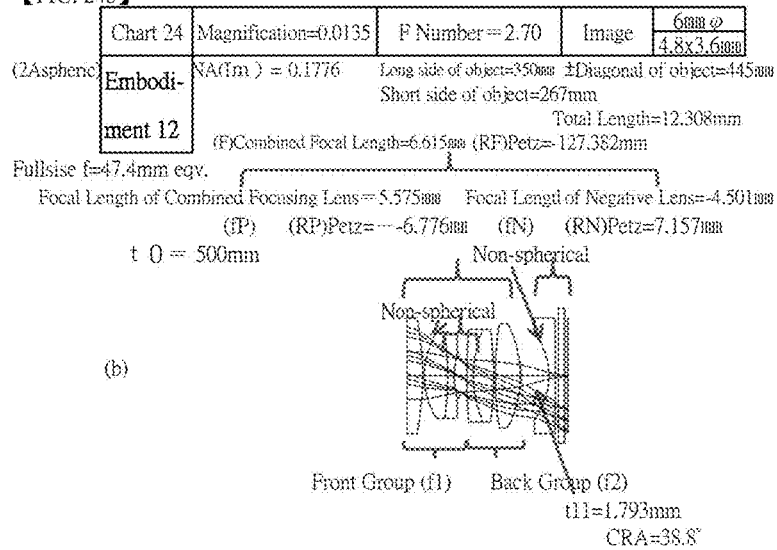
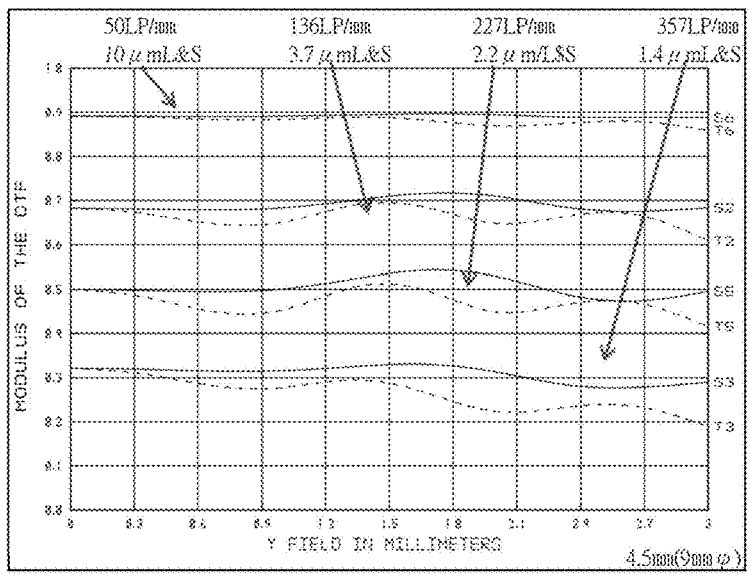
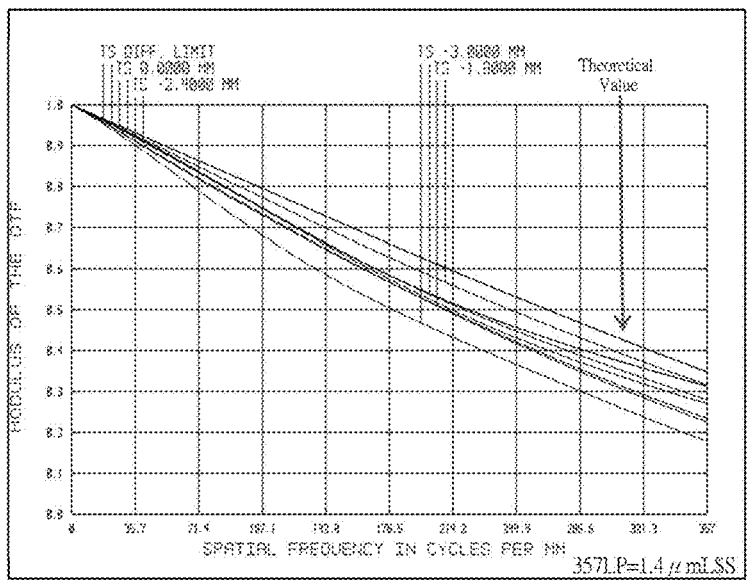

[FIG. 24c]

| Chart 24 | Magnification=0.0454 | F Number = 2.50 | Image | 6mm φ 4.8x3.6mm |

(2Aspheric) Embodiment 12

NA(Im) = 0.1807   Long side of object=106mm  Diagonal of object=132mm
Short side of object=79mm
Total Length=12.564mm
(F)Combined Focal Length=6.379mm  (RF)Petz=-127.382mm Fullsise f=45.7mm eqv.
Focal Length of Combined Focusing Lens=5.575mm   Focal Length of Negative Lens=-4.501mm
(fP)   (RP)Petz= -6.776mm   (fN)   (RN)Petz=7.157mm t O = 150mm (c)

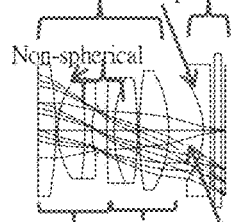

Front Group (f1)   Back Group (f2)
t11=1.933mm
CRA=38.7°

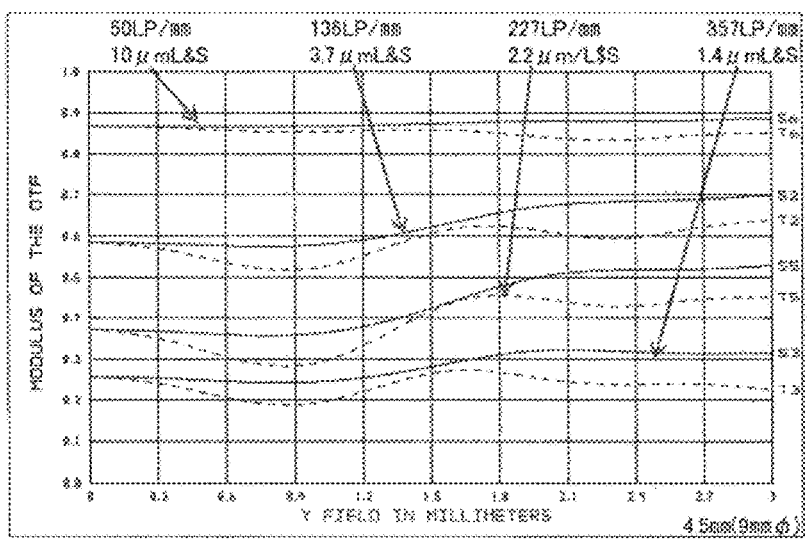

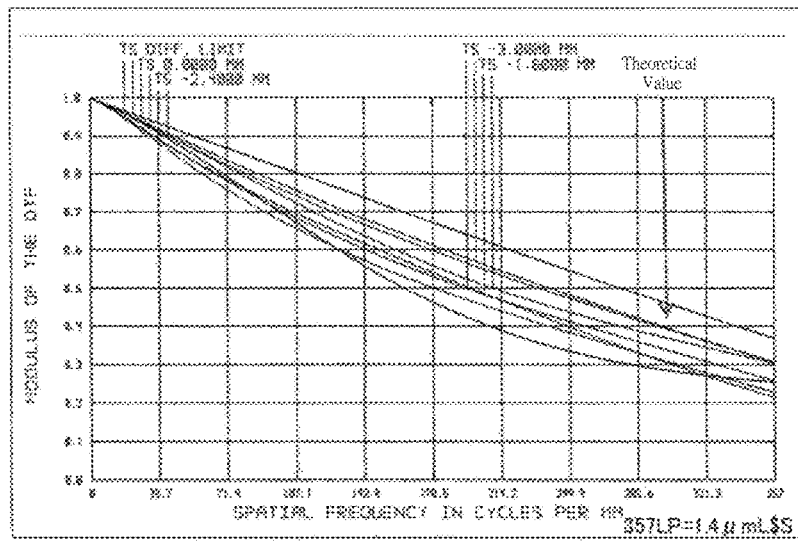

[FIG. 25]

Chart 25 — Equivalent to Fullsize 87.2mm — Embodiment 13(7)

(a) Configuration: 4-division-6-piece + Concave (1 Aspheric) — MGauss+Concave

| | | | |
|---|---|---|---|
| Image Size | 1/1.5inch | 9mm Φ | 7.2x5.4mm |
| t) 3: Galileo Concave-Cover Glass | integral | | |
| t0[mm] | ∞ | 150 | |
| t1 | 12.009 | 12.620 | 14.111 |
| (F) Combined Focal Length | 18.248 | 17.328 | 15.429 |
| Magnification | 1/∞ | 0.0970 | 0.12768 |
| Angle of View (Object Side) — Diagonal | ±13.9° | 245mm | 70mm |
| Long Side | ±11.1° | 195mm | 56mm |
| Short Side | ±8.4° | 146mm | 42mm |
| Chief Ray Angle — Diagonal | 26.8° | 26.3° | 25.6° |
| F Number | 3.00 | 2.75 | 2.35 |
| ① Entirety Focus Plane – Front Group Paraxial Focus Plane | -0.195 | -0.188 | -0.166 |
| (FR) Radius of Petzval Curvature | 101.882 | | |

Focusing Lens Assembly:
| | |
|---|---|
| (Fp) Focal Length | 17.463 |
| (R1) Radius of Petzval Curvature | -23.514 |

Negative:
| | |
|---|---|
| ( N ) Concave Focal Length | -12.005 |

Fixed Lens:
| | |
|---|---|
| (FR) Radius of Petzval Curvature | 19.105 |

Claims:
| | | |
|---|---|---|
| 0.8<|F|/f<1.2 | 0.96 | 1.01 | 1.13 |
| -1.5<| P |/ f | N <-1.1 | -1.456 | |
| -1.3<RP/RN<-0.9 | -1.231 | | |
| -0.6<D/f<-0.4 | -0.485 | | |

| Surf | Radius | Thick | Catalog | Glass Index | Abbe | Semi-Dia |
|---|---|---|---|---|---|---|
| OBJ | Infinity | t0 | | | | 6.000 |
| 1 | 9.329 | 1.500 | L-BSL7 | 1.5163 | 64.065 | 4.700 |
| 2 | 7.224 | 0.700 | | | | 5.300 |
| 3 | 11.070 | 2.900 | S-FPL51 | 1.4970 | 81.546 | 5.300 |
| 4 | -32.396 | 1.000 | S-NSL36 | 1.5174 | 52.431 | 5.300 |
| 5 | -243.567 | 3.000 | | | | 2.600 |
| STO | Infinity | 0.800 | | | | 3.200 |
| 7 | -11.189 | 1.000 | S-NSL36 | 1.5174 | 52.431 | 4.200 |
| 8 | 6.934 | 3.200 | S-FPL51 | 1.4970 | 81.546 | 4.200 |
| 9 | -10.192 | 0.201 | | | | 4.400 |
| 10 | 38.009 | 1.600 | S-PPM2 | 1.5952 | 67.736 | 4.400 |
| 11 | -32.622 | t11 | | | | 5.300 |
| *12 | -7.100 | 0.500 | L-BAL35 | 1.5891 | 61.153 | 5.200 |
| 13 | Infinity | 0.200 | | | | |
| IMA | Infinity | -8.91 | | | | |

De(Virtual) Projection Pupil=-8.91

| Wavelength | D/F | | | |
|---|---|---|---|---|
| Level | 0.488 | | | |
| Weight | 1.0 | | | |

*12 Aspheric:
| | 2ndTerm | 4thTerm | 6thTerm | 8thTerm | 10thTerm |
|---|---|---|---|---|---|
| | 0.000 | 2.90E-03 | -2.10E-04 | 9.34E-06 | -1.57E-07 |

| Glass Name | L-LAH53 | L-LAL13 | L-BAL35 | L-BSL7 |
|---|---|---|---|---|
| Refraction Index N_d | 1.8061 | 1.6935 | 1.5891 | 1.5163 |

Concave Lens:
| | Surf | Radius | R2 | d | dR1 | D | F | D/F |
|---|---|---|---|---|---|---|---|---|
| L-LAH53 | 0.546 | 1.0 | ∞ | -7.1 | 0.886 | -7.8 | 18.238 | -0.428 |
| L-LAL13 | | | ∞ | -7.53 | 1.048 | -8.73 | 18.232 | -0.451 |
| L-BAL35 | -7.100 | | ∞ | -8.21 | 1.156 | -8.91 | 18.248 | -0.488 |
| L-BSL7 | -5.858 | | ∞ | -8.400 | 1.434 | -9.10 | 18.245 | -0.499 |

(b) Chief Ray Scheme — Entirety Focus Plane 26.611mm — Non-spherical — Spherical — D=8.91 — d=8.21 — t0=∞

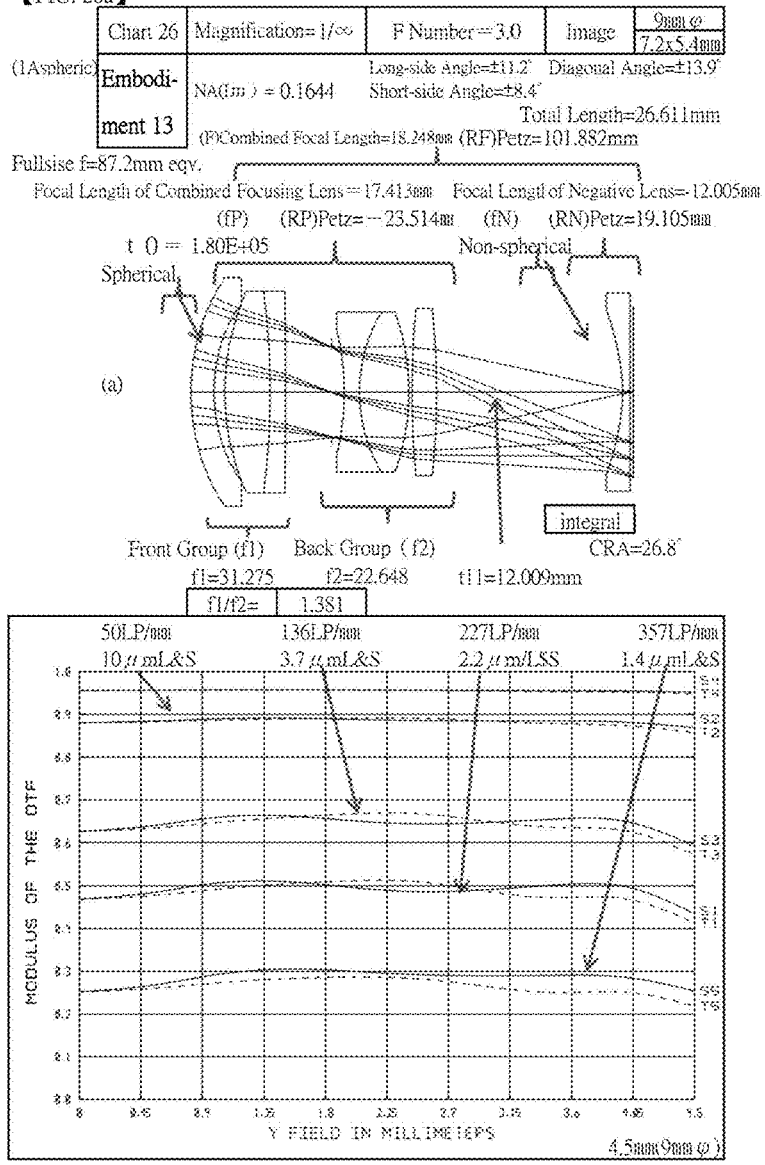
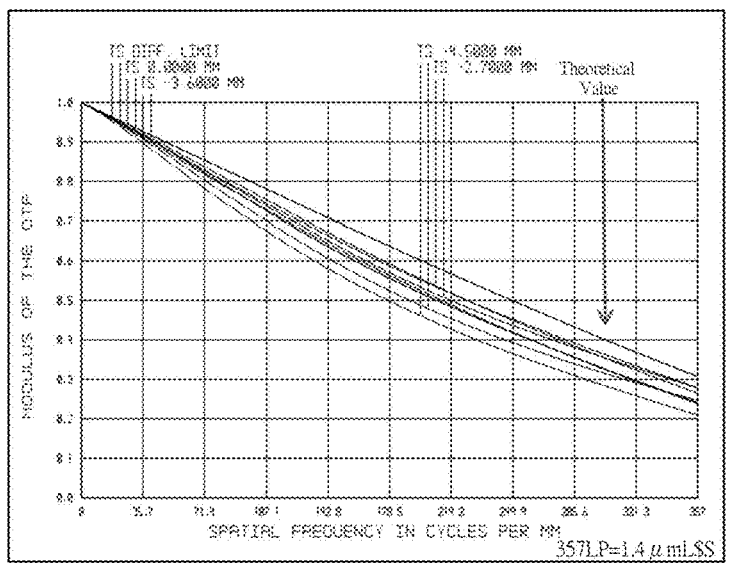

[FIG. 26b]
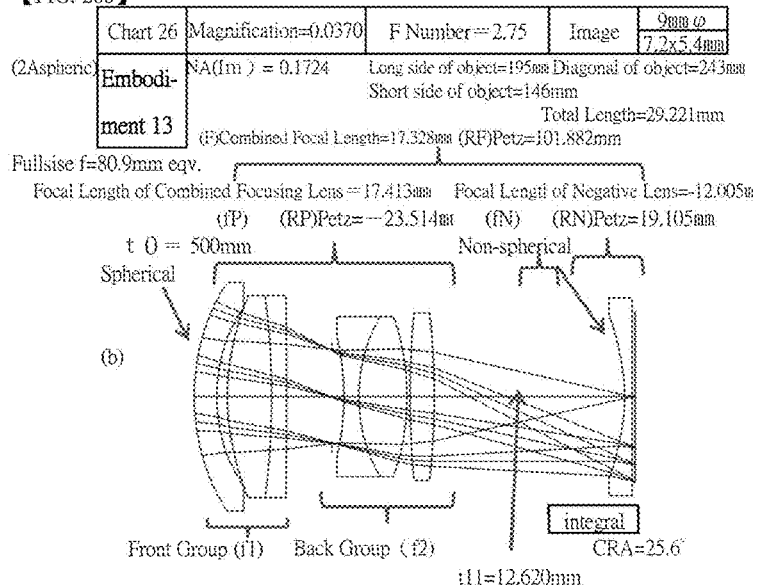
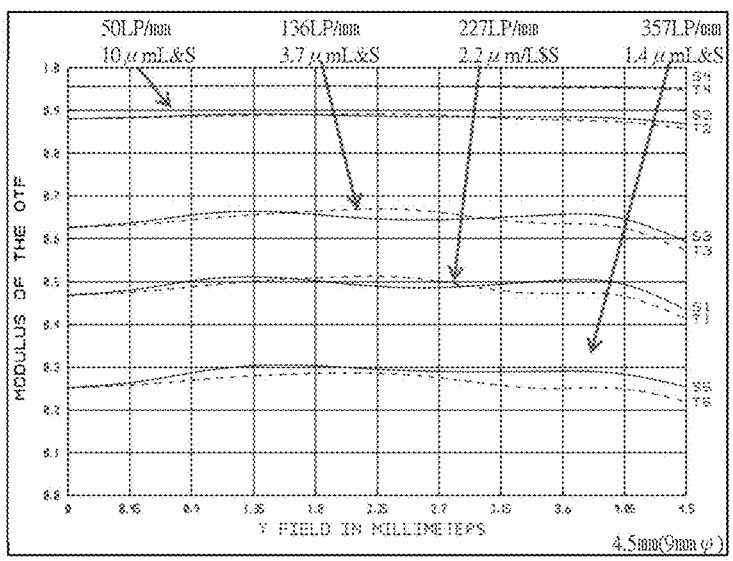
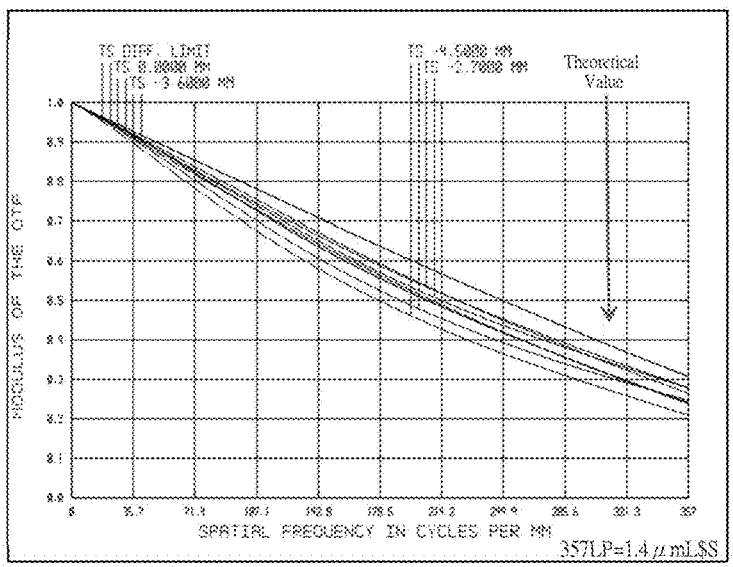

[FIG. 26c]

| Chart 26 | Magnification=0.1277 | F Number = 2.35 | Image | 9mm φ / 7.2×5.4mm |

(2Aspheric) Embodiment 13

NA(Im) = 0.1530  Long side of object=56mm  Diagonal of object=70mm
Short side of object=42mm
Total Length=30.712mm
(F)Combined Focal Length=15.429mm  (RF)Petz=101.882mm Fullsize f=70.4mm eqv.
Focal Length of Combined Focusing Lens = 17.413mm  Focal Length of Negative Lens=-12.005m
(fP)  (RP)Petz=-23.514mm  (fN)  (RN)Petz=19.105mm t0 = 150mm Spherical — Non-spherical (c)

Front Group (f1)  Back Group (f2)  integral  CRA=25.6°
t11=14.111mm

[FIG. 27]

Chart 27 — Equivalent to Fullsize f=62.1mm — Embodiment 14

4-division-5-piece + Concave (2 Aspheric)

| Configuration | | | | | |
|---|---|---|---|---|---|
| Image Size | 1/1.8inch 9mm @ 7.2x5.4mm | | | | |
| t1 3: Galileo Concave+Cover Glass | Gauss+oConcave integral | | | | |
| | f[mm] | 150 | | | |
| (F) Combined Focal Length | 5.390 | 5.695 | 6.436 | | |
| | 12.999 | 12.601 | 11.743 | | |
| Magnification | 1/∞ | 0.0264 | 0.0264 | 0.09092 | |

| Entrety | Angle of View (Object Side) | Diagonal | ±19.1° | 341mm | 99mm |
| | | Long Side | ±15.5° | 273mm | 79mm |
| | | Short Side | ±11.7° | 205mm | 59mm |
| | Chief Ray Angle | Diagonal | 34.6° | 33.6° | |
| | F Number | | 2.80 | 2.60 | 2.35 |
| | ②Entrety Focus Plane - Front Group Paraxial Focus Plane | | -0.197 | -0.194 | -0.179 |
| | (FR)Radius of Petzval Curvature | | -5723.902 | | |

| Focusing Lens Assembly Negative | (FP)Focal Length | 12.355 |
| | (R )Radius of Petzval Curvature | -16.111 |
| | ( f N ) Concave Focal Length | -10.152 |
| Fixed Lens | (fR)Radius of Petzval Curvature | 16.157 |

| Claims | 0.8<(P/F<1.2 | 0.95 | 0.98 | 1.05 |
| | -1.5< f P/ f N<-1.1 | -1.217 |
| | -1.3<RP/RN<-0.9 | -0.997 |
| | -0.6<D/F<-0.4 | -0.498 |

| Surf | Radius | Thick | Catalog | Glass Index | Abbe | Semi-Dia |
|---|---|---|---|---|---|---|
| OBJ | Infinity | t0 | | | | |
| *1 | 9.928 | 1.700 | L-BSL7 | 1.5163 | 64.065 | 4.300 |
| 2 | -100.853 | 0.100 | | | | 4.300 |
| 3 | 7.861 | 1.600 | S-BSM81 | 1.6400 | 60.078 | 3.500 |
| 4 | 103.774 | 0.600 | S-BAH27 | 1.7015 | 41.239 | 3.500 |
| 5 | 5.995 | 0.500 | | | | 2.000 |
| STO | Infinity | 0.737 | | | | 1.700 |
| 7 | -15.355 | 0.600 | S-TIM8 | 1.5955 | 39.242 | 1.900 |
| 8 | 13.555 | 1.600 | S-BSM81 | 1.6400 | 60.078 | 3.300 |
| 9 | -14.508 | 2.586 | | | | 3.300 |
| 10 | 17.786 | 1.800 | S-FPM3 | 1.5378 | 73.703 | 4.200 |
| 11 | -17.665 | t11 | | | | 4.200 |
| *12 | -6.004 | 0.500 | L-BAL35 | 1.5891 | 61.153 | 4.100 |
| 13 | Infinity | 0.200 | | | | 4.800 |
| IMA | Infinity | | | | | |

*1 Aspheric  *12 Aspheric

D=(Virtual) Projection Pupil=-6.47

| | D/F | |
|---|---|---|
| | -0.498 | |

| Wavelength [um] | 0.546 | 0.436 | 0.486 | 0.579 | 0.656 |
| Weight | 1.0 | 0.6 | 0.2 | 0.6 | 0.2 |

| | Glass Name | L-LAH53 | L-LAL13 | L-BAL35 | L-BSL7 |
| | Refraction Index N d | 1.8061 | 1.6935 | 1.5891 | 1.5163 |

| Concave Lens | Surf | Radius | d | dR1 | D | F | D/F |
|---|---|---|---|---|---|---|---|
| L-LAH53 | R1 | -7.215 | 5.5 | -0.762 | -6.2 | 11.572 | -0.536 |
| L-LAL13 | R2 | -6.560 | 5.5 | -0.838 | -6.2 | 12.999 | -0.477 |
| L-BAL35 | | -5.004 | 5.77 | -1.153 | -6.47 | 12.999 | -0.498 |
| L-BSL7 | | -5.575 | 6.02 | -1.080 | -6.72 | 12.999 | -0.517 |

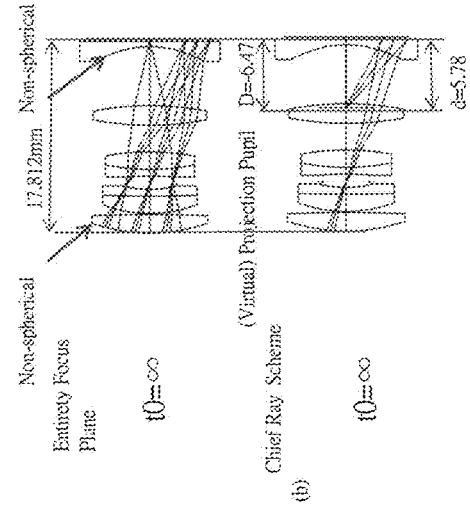

(b) Chief Ray Scheme  t0=∞  (Virtual) Projection Pupil D=-6.47  d=5.78
(a) Non-spherical  Entrety Focus Plane  17.812mm  Non-spherical  t0=∞

[FIG. 28a]
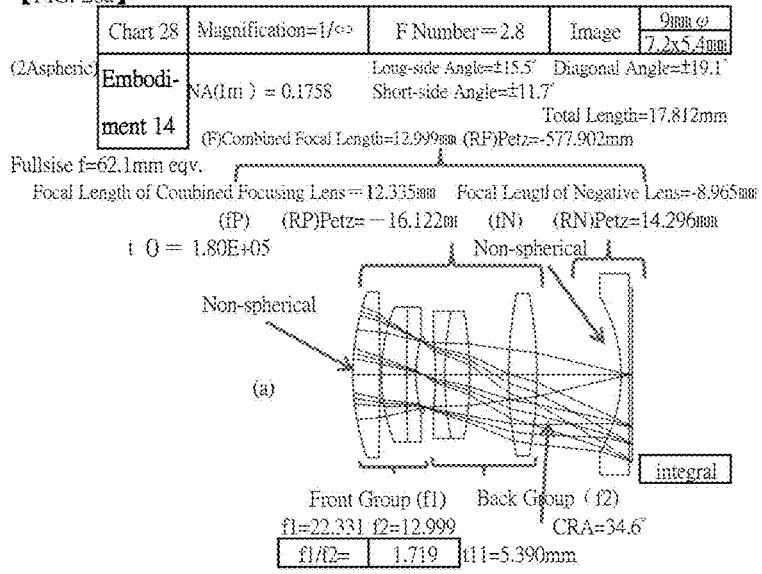
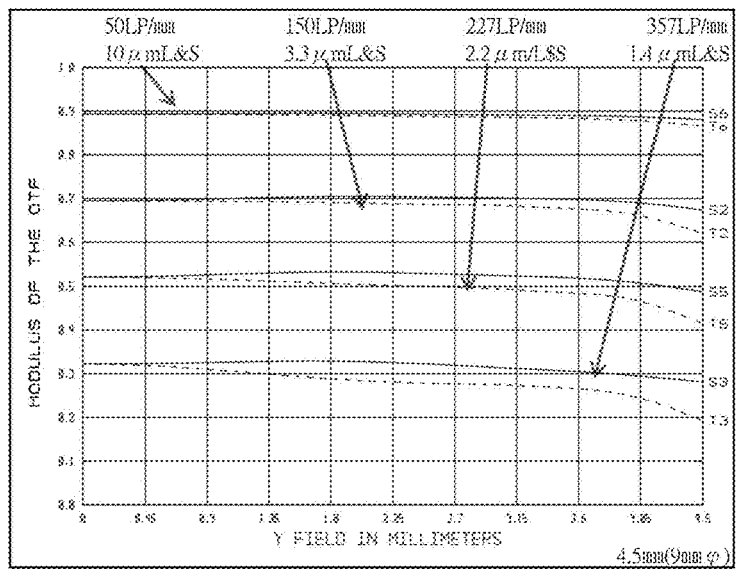
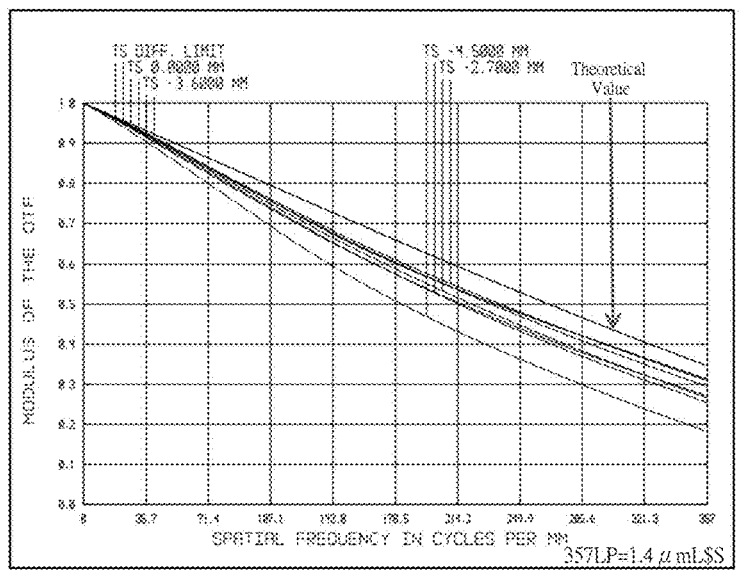

[FIG. 28b]

| Chart 28 | Magnification=0.0264 | F Number = 2.60 | Image | 9mm φ |
|---|---|---|---|---|
| | | | | 7.2×5.4mm |

(2Aspheric) Embodiment 14

NA(Im) = 0.1794  Long side of object=273mm  Diagonal of object=341mm
Short side of object=205mm
Total Length=18.117mm
(F)Combined Focal Length=12.601mm  (RF)Petz=-577.902mm Fullsize f=60.2mm eqv.
Focal Length of Combined Focusing Lens = 12.335mm   Focal Length of Negative Lens=-8.965mm
(fP)   (RP)Petz=-16.122mm   (fN)   (RN)Petz=14.296mm $t_0 = 500mm$ Non-spherical (b)

Front Group (f1)   Back Group (f2)
integral
CRA=34.4°
t11=5.695mm

50LP/mm  10μmL&S
150LP/mm  3.3μmL&S
227LP/mm  2.2μmL&S
357LP/mm  1.4μmL&S

MODULUS OF THE OTF vs Y FIELD IN MILLIMETERS (4.5mm(9mm φ))

TS DIFF. LIMIT
TS 0.0000 MM
TS -3.6000 MM
TS -4.5000 MM
TS -2.7000 MM
Theoretical Value MODULUS OF THE OTF vs SPATIAL FREQUENCY IN CYCLES PER MM
357LP=1.4μmL&S

[FIG. 28c]

| Chart 28 | Magnification=0.0909 | F Number = 2.60 | Image | 9mm φ |
|---|---|---|---|---|
| | | | | 7.2x5.4mm |

(2Aspheric) Embodiment 14  NA(m) = 0.1756  Long side of object=79mm  Diagonal of object=99mm
Short side of object=59mm
Total Length=18.585mm
(F)Combined Focal Length=11.743mm  (RF)Petz=-577.902mm Fullsise f=56.1mm eqv.
Focal Length of Combined Focusing Lens = 12.335mm   Focal Length of Negative Lens=-8.965mm
(fP)   (RP)Petz=−16.122mm   (fN)   (RN)Petz=14.296mm t0 = 150mm (c)

Non-spherical
Non-spherical
Front Group (f1)   Back Group (f2)
integral
CRA=33.6°
t11=6.436mm

[FIG. 29]

Chart 29

| Equivalent to Fullsize f=47.9mm | Embodiment 15 | | | | | | | | | |
|---|---|---|---|---|---|---|---|---|---|---|
| | Configuration | 4-division-5-piece + Concave (2 Aspheric) | | | | | | | | |
| | | Gauss+Galileo | | | | | | | | |
| | | †1 X: Galileo Concave-Cover Glass | | | | | | | | |
| | | | 9mm φ 7.2x5.4mm | | | | | | | |
| | Image Size | 1/1.8inch | integral | | | Surf | Radius | Thick | Catalog | Glass |
| | t0(mm) | ∞ | 500 | 150 | | | | | | Index | Abbe | Semi-Dia |
| | t1 | 3.888 | 6.062 | 4.477 | | OBJ | Infinity | t0 | | | | |
| | (F) Combined Focal Length | 10.023 | 9.777 | 9.236 | | 1 | 20.311 | 1.500 | L-BSL7 | 1.5163 | 64.095 | 4.300 |
| | Magnification | 1/∞ | 0.0202 | 0.06868 | | *2 | -25.995 | 0.100 | | | | 4.300 |
| Entirety | Angle of View (Object Side) | Diagonal | ±24.2° | 445mm | 131mm | | 3 | 5.828 | 2.100 | S-BSM81 | 1.6400 | 60.078 | 3.300 |
| | | Long Side | ±19.5° | 356mm | 105mm | | 4 | -19.386 | 0.600 | S-BAH27 | 1.7015 | 41.239 | 3.300 |
| | | Short Side | ±15.1° | 267mm | 79mm | | 5 | 4.982 | 0.500 | | | | 1.800 |
| | Chief Ray Angle | Diagonal | 40.9° | 40.4° | 40.2° | | STO | Infinity | 0.831 | | | | 1.800 |
| | F Number | | 2.80 | 2.65 | 2.60 | | 7 | -42.184 | 0.600 | S-TIM8 | 1.5955 | 39.242 | 3.500 |
| | @(Entirety Focus Plane - Front Group Paraxial Focus Plane | -0.218 | -0.216 | -0.209 | | 8 | 9.354 | 1.700 | S-BSM81 | 1.6400 | 60.078 | 3.500 |
| | (FR)Radius of Petzval Curvature | 939.174 | | | | 9 | -18.918 | 0.100 | | | | 3.500 |
| Focusing Lens Assembly | (fP)Focal Length | 9.367 | | | | 10 | 15.959 | 2.500 | S-FPM3 | 1.5378 | 73.703 | 4.100 |
| Negative Fixed Lens | (R1)Radius of Petzval Curvature | -11.939 | | | | 11 | -9.905 | t11 | | | | 4.100 |
| | ( f.N ) Concave Focal Length | 7.408 | | | | *12 | -4.382 | 0.500 | L-BAL35 | 1.5891 | 61.153 | 3.900 |
| | (fR)Radius of Petzval Curvature | 11.790 | | | | 13 | Infinity | 0.200 | | | | 5.000 |
| Claims | 0.8<P/f<1.2 | 0.96 | | 1.01 | | IMA | Infinity | -5.08 | | | | |
| | -1.5<f P/f N<1.1 | -1.264 | | | | | | | De(Virtual) Projection Pupil=-5.08 | | | |
| | -1.3<RP/RN<-0.9 | -1.013 | | | | | | | D/f | | | -0.507 |
| | -0.6<D/f<-0.4 | -0.507 | | | | | | | | | | |

| Wavelength | 0.546 | 0.486 | 0.579 | 0.656 |
|---|---|---|---|---|
| f mm | | | | |
| Weight | 1.9 | 0.2 | 0.6 | 0.2 |

| | Glass Name | L-LAH53 | L-LAL13 | L-BAL35 | L-BSL7 |
|---|---|---|---|---|---|
| | Refraction Index N d | 1.8061 | 1.6935 | 1.5891 | 1.5163 |

| Surf | Radius | R2 | d | dR1 | D | F | D/F |
|---|---|---|---|---|---|---|---|
| *1 Aspheric | 20.311 | ∞ | 3.83 | -0.750 | -4.53 | 10.018 | -0.452 |
| *12 Aspheric | -4.381 | ∞ | 4.1 | -0.892 | -4.8 | 10.020 | -0.479 |

| Surf | 2ndTerm | 4thTerm | 6thTerm | 8thTerm | 10thTerm |
|---|---|---|---|---|---|
| *1 Aspheric | 0.000 | -2.27E-04 | -5.93E-06 | 2.74E-07 | -6.68E-09 |
| *12 Aspheric | 0.000 | 8.88E-04 | 3.85E-04 | -2.92E-05 | 1.02E-06 |

| Concave Lens | R1 | R2 | d | dR1 | D | F | D/F |
|---|---|---|---|---|---|---|---|
| L-LAL53 | -5.107 | ∞ | 3.83 | -0.750 | -4.53 | 10.018 | -0.452 |
| L-LAL13 | -4.598 | ∞ | 4.1 | -0.892 | -4.8 | 10.020 | -0.479 |
| L-BAL35 | -4.382 | ∞ | 4.38 | -1.000 | -5.08 | 10.023 | -0.507 |
| L-BSL7 | -4.257 | | 4.87 | -1.144 | -5.07 | 10.004 | -0.507 |

(a)

Entirety Focus Plane 15.118mm  Non-spherical t0=∞

(Virtual) Projection Pupil D=-5.08

(b) Chief Ray Scheme t0=∞

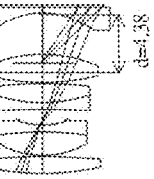

d=4.38

【FIG. 30a】
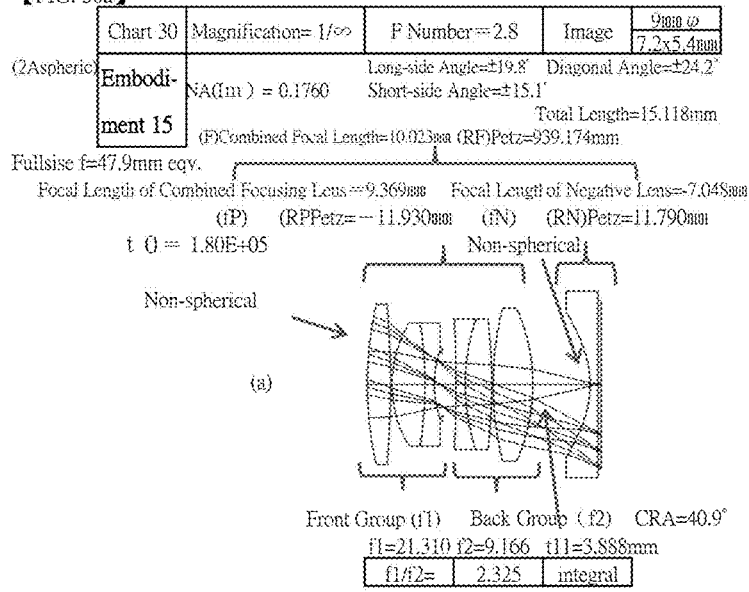
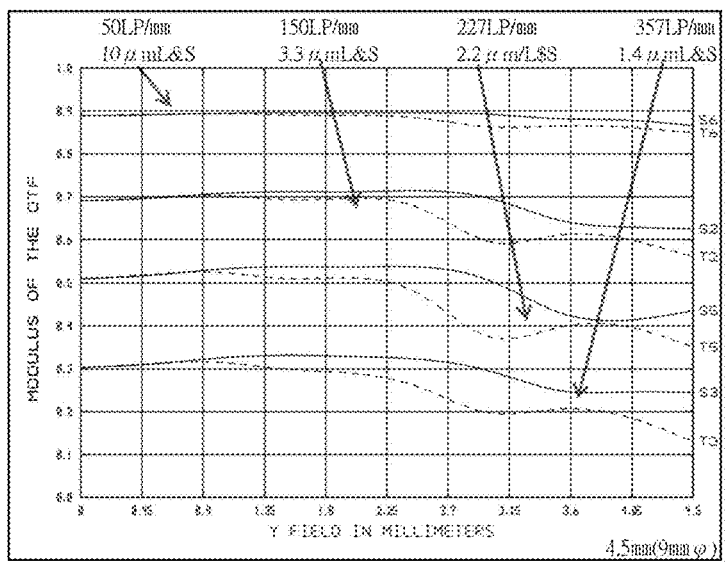
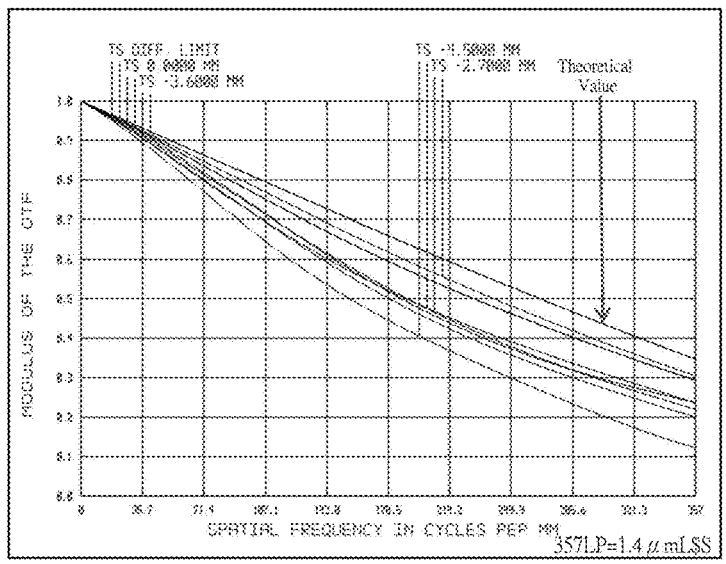

[FIG. 30b]
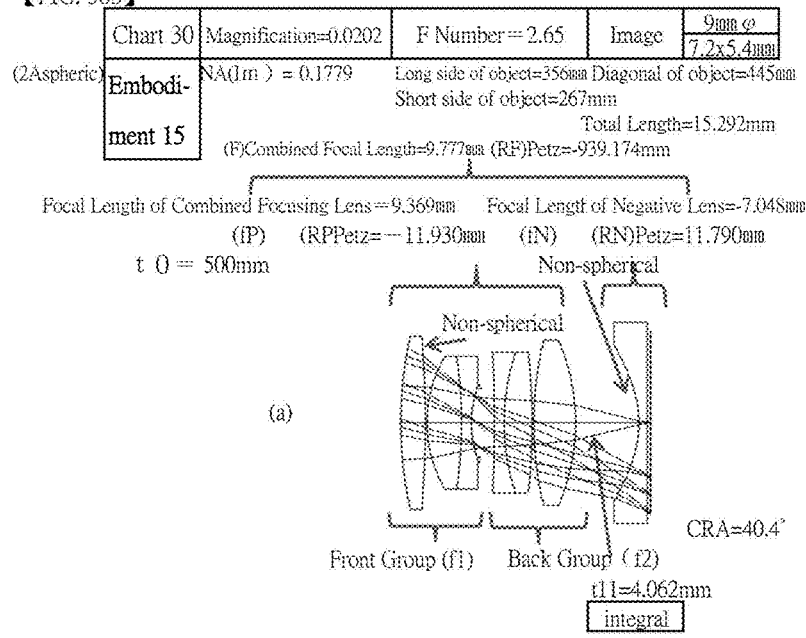
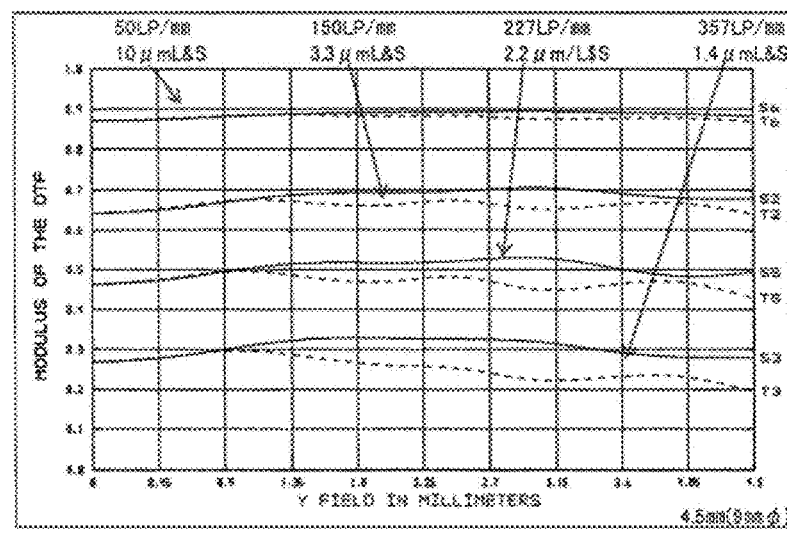
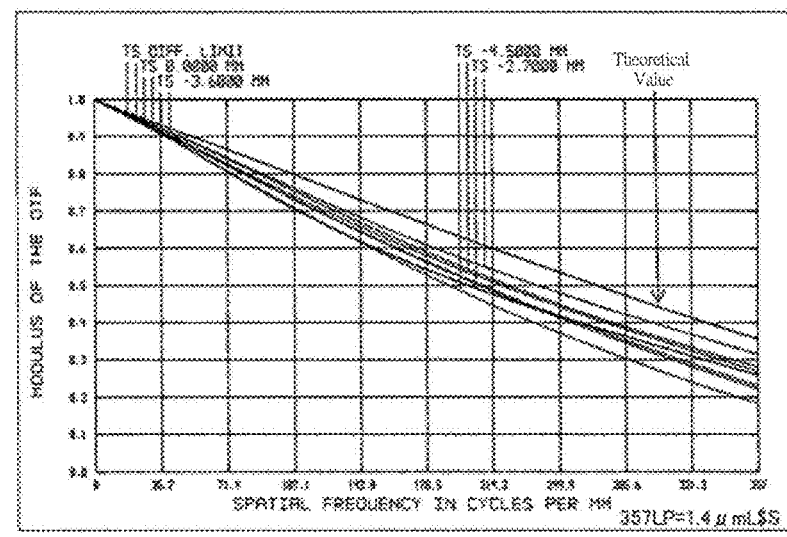

【FIG. 30c】
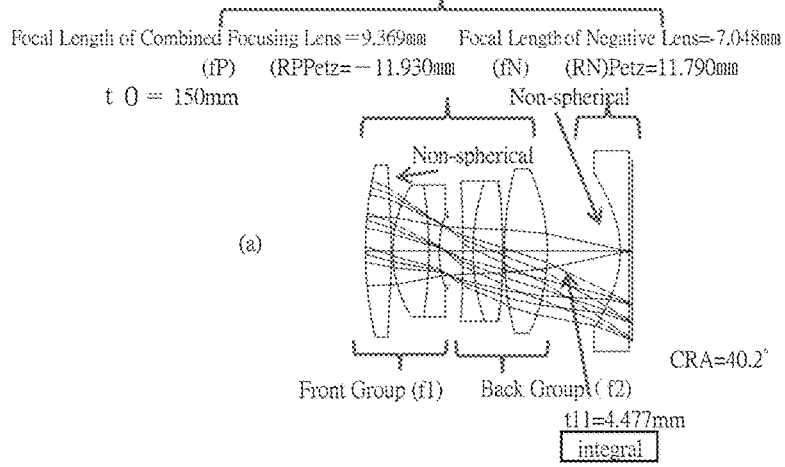
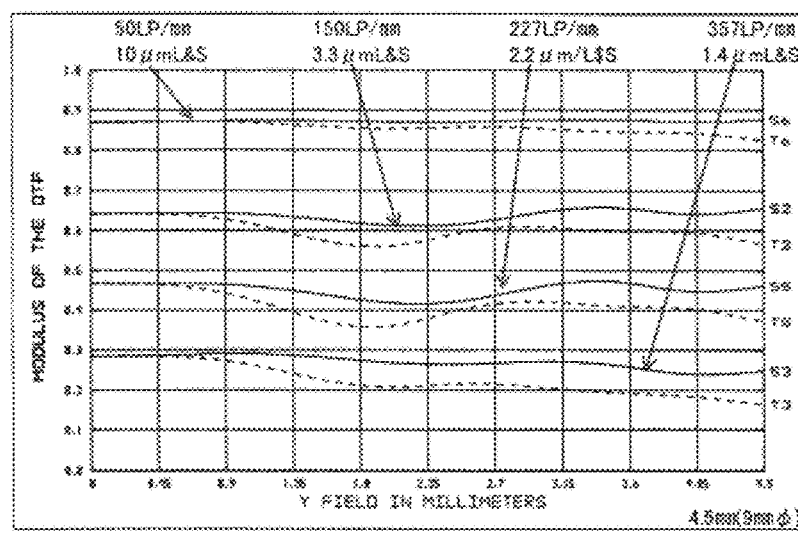
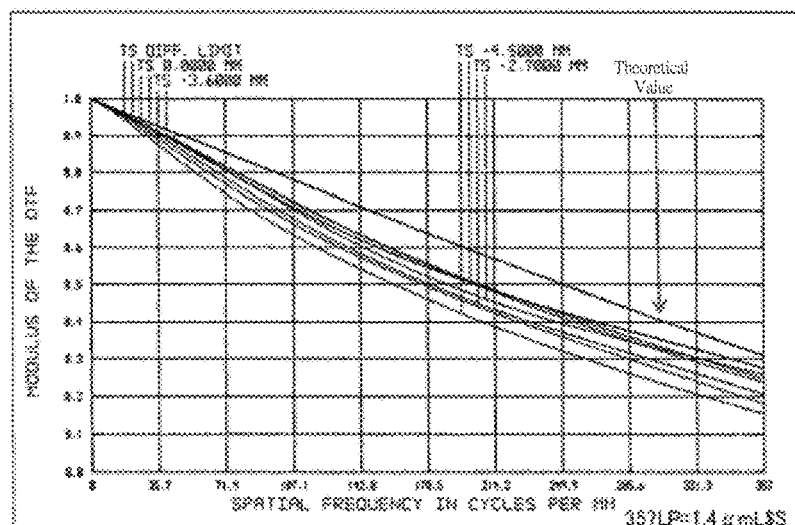

[FIG. 31]

| Embodiment No. | | | 1 | 2 | 3 | 4 | 5 | 6 | 7 | 8 | 9 | 10 | 11 | 12 | 13 | 14 | 15 | Average |
|---|---|---|---|---|---|---|---|---|---|---|---|---|---|---|---|---|---|---|
| (F)Combined Focal Length(∞) | | | 18.006 | 17.986 | 14.998 | 13.080 | 11.005 | 10.025 | 22.003 | 15.889 | 12.524 | 12.045 | 8.666 | 6.721 | 18.248 | 12.999 | 10.019 | |
| Fullsize Conversion | | | 85.9 | 85.9 | 71.7 | 62.1 | 52.6 | 47.9 | 86.0 | 62.1 | 49.0 | 86.3 | 62.1 | 48.2 | 87.2 | 62.1 | 47.9 | |
| Image size [mm×mm] | | | 7.2×5.4 | 7.2×5.4 | 7.2×5.4 | 7.2×5.4 | 7.2×5.4 | 7.2×5.4 | 8.8×6.6 | 8.8×6.6 | 8.8×6.6 | 4.8×3.6 | 4.8×3.6 | 4.8×3.6 | 7.2×5.4 | 7.2×5.4 | 7.2×5.4 | |
| Half Angle of View [degree] | | | 14.0 | 14.0 | 16.7 | 19.1 | 22.2 | 24.2 | 14.0 | 19.1 | 23.7 | 14.0 | 19.1 | 24.1 | 13.9 | 19.1 | 24.2 | |
| 0.8<fP/F<1.2 | Combined Focusing Lens | Infinity | 0.90 | 0.89 | 0.91 | 0.89 | 0.88 | 0.87 | 0.91 | 0.89 | 0.86 | 0.89 | 0.86 | 0.83 | 0.96 | 0.95 | 0.93 | 0.895 |
| | | 500mm | 0.95 | 0.93 | 0.94 | 0.92 | 0.90 | 0.89 | 0.96 | 0.92 | 0.89 | 0.92 | 0.88 | 0.84 | 1.01 | 0.98 | 0.96 | 0.926 |
| (fP)Combined Focal Length F | | 150mm | 1.06 | 1.03 | 1.02 | 0.99 | 0.96 | 0.94 | 1.06 | 0.98 | 0.93 | 0.99 | 0.93 | 0.87 | 1.13 | 1.05 | 1.01 | 0.997 |
| Combined Focusing Lens RP/Negative Lens fN -1.5<fP/fN<-1.1 | | | -1.322 | -1.269 | -1.261 | -1.291 | -1.285 | -1.296 | -1.452 | -1.292 | -1.316 | -1.373 | -1.322 | -1.239 | -1.456 | -1.217 | -1.264 | -1.310 |
| Combined Focusing Lens RP/RN -1.3<RP/RN<-0.9 | | | -1.087 | -1.199 | -0.982 | -0.993 | -0.991 | -0.967 | -1.107 | -0.990 | -1.024 | -1.036 | -0.997 | -0.947 | -1.231 | -0.997 | -1.013 | -1.037 |
| -0.6<D/F<-0.4 Pupil D/Combination F | | | -0.478 | -0.545 | -0.505 | -0.505 | -0.520 | -0.545 | -0.485 | -0.503 | -0.549 | -0.486 | -0.525 | -0.536 | -0.488 | -0.498 | -0.507 | -0.512 |
| D=(Virtual) Projection Pupil | | | -8.6 | -9.8 | -7.58 | -6.57 | -5.72 | -5.46 | -10.67 | -8.0 | -6.88 | -5.85 | -4.55 | -3.6 | -8.9 | -6.47 | -5.08 | -6.916 |
| Combined Lens 4-division-6-piece | Combined Focusing Lens Assembly | fP | 16.295 | 16.016 | 13.604 | 11.572 | 9.654 | 8.670 | 20.058 | 14.089 | 10.801 | 10.605 | 7.460 | 5.575 | 17.483 | 12.355 | 9.367 | 12.240 |
| | | RP Petz | -19.584 | -20.613 | -16.883 | -14.192 | -11.853 | -10.330 | -24.340 | -17.206 | -13.400 | -12.844 | -8.970 | -6.776 | -23.514 | -16.111 | -11.939 | -15.237 |
| | Front Group | f1 | 24.420 | 35.855 | 28.192 | 24.342 | 23.439 | 25.128 | 30.757 | 30.290 | 43.059 | 16.518 | 7.460 | 16.110 | 31.275 | 22.351 | 21.310 | 25.367 |
| | | R1 Petz | -37.023 | -85.953 | -62.802 | -57.709 | -86.111 | 1359.189 | -47.097 | -72.103 | 115.889 | -24.823 | -8.970 | -127.737 | -45.767 | -53.351 | -77.792 | 45.876 |
| | Back Group | f2 | 22.520 | 16.312 | 15.516 | 12.119 | 9.018 | 7.079 | 27.567 | 14.440 | 8.163 | 13.657 | 5.664 | 4.908 | 22.648 | 12.999 | 9.166 | 13.452 |
| | | R2 Petz | -41.575 | -27.218 | -23.130 | -18.820 | -13.754 | -10.252 | -50.373 | -22.596 | -12.011 | -26.615 | 8.996 | -7.156 | -45.405 | 5773.9 | -14.104 | 405.2 |
| Front Group f1/Back Group f2 | | | 1.084 | 2.198 | 1.817 | 2.009 | 2.599 | 3.550 | 1.116 | 2.098 | 5.275 | 1.209 | 1.317 | 3.282 | 1.381 | 1.719 | 2.325 | 2.199 |
| Negative Lens | | fN | -12.329 | -12.924 | -10.784 | -8.965 | -7.515 | -6.699 | -13.816 | -10.904 | -8.206 | -7.788 | -5.644 | -4.501 | -12.005 | -10.152 | -7.408 | -8.322 |
| Fixed Lens Assembly with negative refractive power | | RN Petz | 18.023 | 17.186 | 17.186 | 14.296 | 11.962 | 10.680 | 21.967 | 17.381 | 13.089 | 12.395 | 8.996 | 7.157 | 19.105 | 16.157 | 11.790 | 14.491 |

IMAGE FORMING LENS

CROSS REFERENCE TO RELATED APPLICATION

The present application is a U.S. National Stage Application under 35 U.S.C. § 371 of International Patent Application No. PCT/JP2023/018580, filed on May 18, 2023, which is based on and claims priority to Japanese Patent Application No. 2002-089667 filed on Jun. 1, 2022. The disclosures of both of the patent applications are incorporated by reference herein in their entirety.

BACKGROUND OF THE INVENTION

1. Field of the Invention

The present invention relates to an imaging lens for having a light form an image on a light-receiving portion of, for example, a CMOS image sensor.

2. Description of the Prior Art

In these years, Complementary Metal Oxide Semiconductor (CMOS) image sensors have been widely used as image sensors. The structures of CMOS image sensors are basically classified into a front-side illumination type and a back-side illumination type.

For the front-side illumination type, a photodiode is processed on a silicon wafer, and a wiring layer, a color filter and a microlens are arranged thereabove. With miniaturization, the number of wires is increasing, and thus light might be adversely shielded from reaching the CMOS photodiode. Furthermore, due to the increased thickness of the wiring layer, the photodiode of the CMOS device is arranged at the bottom of a deep well, and only a narrow angle of light beam, which is almost perpendicular to the photodiode, can be used. Therefore, the light beam reflected from the shielded area and scattered as described in the above former case and the light beam reflected from the wall of the well and scattered as described in the above latter case reach the photodiode as flare beams, which adversely lower the contrast of the image.

For the back-side illumination type, a silicon wafer formed with a photodiode layer is laminated to a silicon wafer formed with a wiring layer, the silicon wafer is machinery removed until the surface of the photodiode layer just appears, and the color filter and the microlens are processed and formed. Since the photodiode layer is disposed in front of the wiring layer for the back-side illumination type, the disadvantage encountered by the front-side illumination type can be solved. Although the processing of the back-side illumination type requires high technique, it is replacing the front-side illumination type.

Furthermore, with logic circuit embedded in the wiring layer and even exhibiting functions of an image processor, it can also be called a stacked CMOS image sensor.

For obtaining a high quality image, an imaging lens suitable for a miniaturized CMOS image sensor will be needed. In consideration of the image resolution required by the imaging lens, the pixel size of the CMOS image sensor is considered.

The stacked CMOS image sensor is used as a variety of image input means of, for example, digital cameras, smart phones (=mobile phones), surveillance cameras, car cameras, etc. For enhancing image resolution up to 3.5 μm×3.5 μm for a 35 mm full-size digital camera and 1.4 μm×1.4 μm for a 1-inch to ⅓-inch industrial camera, a CMOS element (one pixel of the CMOS image sensor) can be further miniaturized.

For a smart phone (mobile phone), a CMOS image sensor which has four 0.8 μm×0.8 μm CMOS pixels, i.e., R(red)+G(green)×2+B(blue), grouped with one microlens has also been commercialized. However, for an imaging lens, the required resolution is 0.8 μm×2 times of the microlens aperture=1.6 μm×1.6 μm.

SUMMARY OF THE INVENTION

Problem to be Solved by the Invention

An imaging lens, which is a prototype of the present invention, is configured with a concave lens disposed close to an imaging plane, whereby an image plane is upright. The same inventor got a patent in the United States in 1986 (Patent Reference 1). The lens disclosed in Patent Reference 1 is a projection lens projecting a CRT cathode ray tube onto a screen, whose resolution is at a level of 5 LP/mm(100 μmL&S) to 7 LP/mm(71 μmL&S).

Herein, L&S is named under line-and-space, which means the width of a wire and the spacing between adjacent wires. LP/mm is named under line-pair/mm, which indicates the resolution of the imaging system. If X[μmL&S]=Y[LP/mm], then the relationship X=1000/Y/2 stands.

As an imaging lens for use in a front-side type CMOS, a 2.2 μm×2.2 μm pixel at an APS-H size (35.5 mmΦ, 29.2×20.2 mm) for industrial use has been developed. The same inventor has patents in Japan and China for the corresponding imaging lenses (Patent References 1, 2 and 3). According to the patents, the performance of lenses produced in small quantities can be approved, but the structure is complicated and has a problem in ease of use due to the use of a floating mechanism in which the lens group moves for focusing.

PRIOR ART REFERENCE

Patent Reference

Patent Reference 1: U.S. Pat. No. 4,564,269
Patent Reference 2: U.S. Pat. No. 6,725,740
Patent Reference 3: Chinese Patent No. 112198642

As described above, there is no lens that can image the entire imaging plane of a ⅔-inch to ⅓-inch CMOS camera for industrial use with a resolution of 1.4 μm×1.4 μm (357 LP/mm) CMOS element with an MTF contrast of 15% or above, preferably 20% or above. Therefore, there is a strong need for an imaging lens that has a resolution that corresponds to the elements of such a miniaturized image sensor, and meanwhile, that can be focused with a simple structure.

Herein, MTF (Modulation Transfer Function) is one of the indicators to evaluate the performance of a lens, and it is an expression of the degree to which the contrast of a subject can be faithfully reproduced as a spatial frequency characteristic for realizing the imaging performance of the lens.

Means for Solving the Problem

For solving the above-mentioned problems, an imaging lens according to an embodiment of the present invention includes a focusing lens assembly with a positive refractive power, which can move in a direction of an optical axis depending on an object distance, and a fixed lens assembly with a negative refractive power, which is fixed near the imaging plane. The focusing lens assembly is characterized to have two positive lens groups with an aperture disposed therebetween.

Effect of the Invention

According to the above-mentioned embodiment, an imaging lens, which has a resolution corresponding to the miniaturized image sensor elements, and meanwhile, can be focused with a simple structure, can be provided.

BRIEF DESCRIPTION OF THE DRAWINGS

FIG. 1 is a diagram illustrating Chart 1 according to Embodiment 1.

FIGS. 2a-2c are diagrams illustrating Chart 2 according to Embodiment 1 (shooting distances t0=∞, 500 mm, 150 mm) and a graph corresponding to MTF.

FIG. 3 is a diagram illustrating Chart 3 according to Embodiment 2.

FIGS. 4a-4c are diagrams illustrating Chart 4 according to Embodiment 2 (shooting distances t0=∞, 500 mm, 150 mm) and a graph corresponding to MTF.

FIG. 5 is a diagram illustrating Chart 5 according to Embodiment 3.

FIGS. 6a-6c are diagrams illustrating Chart 6 according to Embodiment 3 (shooting distances t0=∞, 500 mm, 150 mm) and a graph corresponding to MTF.

FIG. 7 is a diagram illustrating Chart 7 according to Embodiment 4.

FIGS. 8a-8c are diagrams illustrating Chart 8 according to Embodiment 4 (shooting distances t0=∞, 500 mm, 150 mm) and a graph corresponding to MTF.

FIG. 9 is a diagram illustrating Chart 9 according to Embodiment 5.

FIGS. 10a-10c are diagrams illustrating Chart 10 according to Embodiment 5 (shooting distances t0=∞, 500 mm, 150 mm) and a graph corresponding to MTF.

FIG. 11 is a diagram illustrating Chart 11 according to Embodiment 6.

FIGS. 12a-12c are diagrams illustrating Chart 12 according to Embodiment 6 (shooting distances t0=∞, 500 mm, 150 mm) and a graph corresponding to MTF.

FIG. 13 is a diagram illustrating Chart 13 according to Embodiment 7.

FIGS. 14a-14c are diagrams illustrating Chart 14 according to Embodiment 7 (shooting distances t0=∞, 500 mm, 200 mm) and a graph corresponding to MTF.

FIG. 15 is a diagram illustrating Chart 15 according to Embodiment 8.

FIGS. 16a-16c are diagrams illustrating Chart 16 according to Embodiment 8 (shooting distances t0=∞, 500 mm, 200 mm) and a graph corresponding to MTF.

FIG. 17 is a diagram illustrating Chart 17 according to Embodiment 9.

FIGS. 18a-18c are diagrams illustrating Chart 18 according to Embodiment 9 (shooting distances t0=∞, 500 mm, 200 mm) and a graph corresponding to MTF.

FIG. 19 is a diagram illustrating Chart 19 according to Embodiment 10.

FIGS. 20a-20c are diagrams illustrating Chart 20 according to Embodiment 10 (shooting distances t0=∞, 500 mm, 150 mm) and a graph corresponding to MTF.

FIG. 21 is a diagram illustrating Chart 21 according to Embodiment 11.

FIGS. 22a-22c are diagrams illustrating Chart 22 according to Embodiment 11 (shooting distances t0=∞, 500 mm, 150 mm) and a graph corresponding to MTF.

FIG. 23 is a diagram illustrating Chart 23 according to Embodiment 12.

FIGS. 24a-24c are diagrams illustrating Chart 24 according to Embodiment 12 (shooting distances t0=∞, 500 mm, 150 mm) and a graph corresponding to MTF.

FIG. 25 is a diagram illustrating Chart 25 according to Embodiment 13.

FIGS. 26a-26c are diagrams illustrating Chart 26 according to Embodiment 13 (shooting distances t0=∞, 500 mm, 150 mm) and a graph corresponding to MTF.

FIG. 27 is a diagram illustrating Chart 27 according to Embodiment 14.

FIGS. 28a-28c are diagrams illustrating Chart 28 according to Embodiment 14 (shooting distances t0=∞, 500 mm, 150 mm) and a graph corresponding to MTF.

FIG. 29 is a diagram illustrating Chart 29 according to Embodiment 15.

FIGS. 30a-30c are diagrams illustrating Chart 30 according to Embodiment 15 (shooting distances t0=∞, 500 mm, 150 mm) and a graph corresponding to MTF.

FIG. 31 is a table summarizing the results of Embodiment 1 to Embodiment 15.

DETAILED DESCRIPTION

In the following, each example of the invention will be explained with reference to the figures and tables attached as drawings. The examples shown below are intended to embody the technical concept of the invention and do not limit the invention to the following, unless specifically stated otherwise.

General Description

Before describing each example, a general description of the invention is given.

The imaging lens in Embodiment 1 of the present application has a focusing lens assembly with a positive refractive power, which is enabled to move in the optical axis direction depending on an object distance, and a fixed lens assembly with a negative refractive power, which is fixed near the imaging plane, and the focusing lens assembly has two positive lens groups with an aperture positioned therebetween.

With regards to Embodiment 1, Embodiment 1 will be briefly outlined with reference to FIG. 1 and FIGS. 2a-2c. FIG. 1 is a diagram illustrating Chart 1 according to Embodiment 1. FIGS. 2a-2c are diagrams illustrating Chart 2 according to Embodiment 1 (shooting distances t0=∞, 500 mm, 150 mm) and a graph corresponding to MTF.

In the focusing lens assembly at an object side shown in FIG. 1 and FIGS. 2a-2c, the radius of the Petzval curvature of the lens group calculated by third-order aberration is −19.584 mm, significantly curving to the lens side. On the other hand, the radius of Petzval curvature of a concave lens, which forms the fixed lens assembly fixedly disposed near the imaging plane, is +18.023 mm, significantly curving to the opposite from the lens side. Therefore, the radius of Petzval curvature of the overall imaging lens consisting of the focusing lens assembly, which is composed of four divisions and six pieces, and the fixed lens assembly, is 1/(−1/19.584+1/18.023)=+226.113 mm, and the imaging plane stands almost vertically. If the imaging plane stands within the range of third-order aberration, it is possible to achieve an aberration close to the theoretical value by optimizing the lens data.

Chart 2 shows, from left to right, examples where the shooting distance tO is (a) infinity, (b) 500 mm, and (c) 150 mm. The upper portion is an optical path diagram, the middle portion is a graph showing MTF (vertical axis) of resolving power against field of view (horizontal axis), and the lower portion is a graph showing MTF (vertical axis) against resolving power (horizontal axis). The theoretical values are noted in each of the graphs in the lower portions, and the design values achieve curves close to the theoretical values. The configuration of the even-numbered drawings starting with FIGS. 4a-4c, which will be described later, is also the same as that of FIGS. 2a-2c above.

In the imaging lens according to this embodiment, since focusing on a close-range object is performed by fixing a fixed lens assembly in the vicinity of the imaging plane and bringing out the focusing lens assembly at the object side, focusing can be conducted with a simple structure. Furthermore, by fixedly arranging one piece of non-spherical concave lens (negative lens) in the vicinity of the imaging plane of the entirety of the 4-division-6-piece focusing lens assembly, as described above, a resolution close to the theoretical value can be obtained by advancing the focusing lens assembly from an infinite shooting distance tO to a close-up shooting distance 150 mm.

In this way, in the imaging lens according to this embodiment, a resolution corresponding to the miniaturized image sensor element can be exhibited, and meanwhile, focusing can be conducted with a simple structure. The fixed lens assembly is not limited to the case where only one lens is included, but the fixed lens assembly may consist of multiple lenses.

An imaging lens according to Embodiment 2 of the present application is characterized in that the focusing lens assembly of Embodiment 1 includes, sequentially from the object side, a 2-division-3-piece front group with a positive refractive power consisting of a single lens and doublet lenses, the aperture, and a 2-division-3-piece back group with a positive refractive power consisting of doublet lenses and a single lens.

In this way, by allocating, sequentially from the object side, the 2-division-3-piece front group with a positive refractive power, the aperture, and the 2-division-3-piece back group with a positive refractive power in the focusing lens assembly, bending and distortion of the image plane can be mutually offset with the front and back configurations. Accordingly, bending and distortion of the image plane can be inhibited.

Embodiment 3 of the present application is configured as in Embodiment 2 described above, in which a focal length f1 of the front group of the focusing lens assembly and a focal length f2 of the back group comply with a correlation of $0.9<f1/f2<6.0$. It is effective for steady correction of various aberrations.

Making the upper limit of the above correlation be 5.0, or even 4.0, would be further advantageous for aberration correction.

In particularly, in a case of using the lens assembly, which is sequentially allocated with, sequentially from the object side, a convex lens, a doublet, an aperture, a doublet and a convex lens, i.e., a Gauss type lens assembly with the aperture interposed and anteroposteriorly symmetrically arranged, bending and distortion of the image plane can be inhibited.

In an imaging lens according to Embodiment 4 of the present application, the focusing lens assembly in Embodiment 3 is sequentially arranged with, sequentially from the object side, a convex lens, a doublet, an aperture, a doublet and a convex lens, i.e., a lens assembly with the aperture interposed and symmetrically arranged.

In general, if lenses are anteroposteriorly symmetrically arranged, the occurrence of bending and distortion of the image plane can be prevented since bending and distortion of the image plane are mutually offset with the front and back configurations. In this embodiment, a Gauss type with the aperture interposed and three pieces of lens anteroposteriorly symmetrically arranged is used. The so-called Gauss type is also typically referred to as double Gauss type, and characterized in that the aperture is interposed, the front group and the back group are almost objectively shaped, and a space of the aperture between the front group and the back group are formed with concave surfaces of the two groups facing each other. Therefore, in the configuration of the almost symmetric front group and back group, it is preferred that the positive lens, which is closest to the object side, is designed with a non-spherical surface.

In this kind of typical Gauss type of imaging lens according to Embodiment 4, it is possible to have the focal length f1 of the front group and the focal length f2 of the back group, between which the aperture is interposed, comply with a correlation of $0.9<f1/f2<3.6$.

Furthermore, the lens closest to the object side may be implemented with a modified Gauss type, which has a convex meniscus shape at the object side.

In an imaging lens according to Embodiment 5 of the present application, the focusing lens assembly in Embodiment 3 is configured so that a lens closest to the object side has a convex meniscus shape at the object side, and the meniscus lens has a convex surface at the object side, has a concave surface at the image side, and has the weakest refractive power out of all in the entire system.

In this kind of modified Gauss type, it is possible to maintain considerable imaging performance with a simple shape of lens without a non-spherical surface. In this modified Gauss type, it is possible to have the focal length f1 of the front group and the focal length f2 of the back group, between which the aperture is interposed, comply with a correlation of $0.9<f1/f2<1.3$.

In such a case of modified Gauss type, it is effective that a surface of the front group at an aperture side for forming a space of the aperture is a planar surface or a convex surface at the image side other than a concave surface. Embodiments 1, 7, 10 and 13 to be described later correspond to the modified Gauss type.

On the other hand, in a case of larger angle of view, e.g., a case that half angle of view exceeds 20 degrees, it is effective to further modify the Gauss type.

In an imaging lens according to Embodiment 6 of the present application, the focusing lens assembly in Embodiment 3 has a surface of the back group at an aperture side for forming a space of the aperture is a planar surface or a convex surface at the object side other than a concave surface.

In this further modified Gauss type, it is possible to have the focal length f1 of the front group and the focal length f2 of the back group, between which the aperture is interposed, comply with a correlation of $3.0<f1/f2<4.0$.

Embodiments 6, 9 and 12 to be described later correspond to the further modified Gauss type.

Hereinbefore, the typical Gauss type, the modified Gauss type and the further modified Gauss type of lens configurations, have been described as the focus movable lens assembly. In this embodiment, each of the front group at the object side and the back group at the imaging side, between which the aperture is interposed, has 2-division-3-piece positive power. Therefore, as shown in the plurality of embodiments to be described later, bending and distortion of the image plane can be effectively inhibited.

An imaging lens assembly according to Embodiment 7 of the present application, for any of Embodiment 3 to Embodiment 6, has the correlation of $0.8<fP/F<1.2$, where F denotes a combined focal length of the entire system with infinite focus and fP denotes a focal length of the focusing lens assembly.

In this embodiment, a focus position of the focusing lens assembly is confined to be in the vicinity of an imaging position of the entirety of the imaging lens.

An imaging lens assembly according to Embodiment 8 of the present application, for any of Embodiment 3 to Embodiment 7, has the correlation of $-1.5<fP/fN<-1.1$, where fP denotes a focal length of the focusing lens assembly and fN denotes a focal length of a negative lens forming the fixed lens assembly.

In other words, the range shown as $-1.5<fP/fN<-1.1$ is effective for aberration correction, but also reduces aberration variation at close focus. In this embodiment, since the focusing lens assembly with the positive power has the image plane curves forwards, the power balance with the non-spherical concave lens of the fixed lens assembly, which curves the image plane backwards, is numerically limited by way of the focal length ratio.

An imaging lens assembly according to Embodiment 9 of the present application, for any of Embodiment 3 to Embodiment 8, a radius RP of Petzval curvature of the focusing lens assembly and a radius RN of Petzval curvature of a negative lens, which forms the fixed lens assembly, comply with a correlation of $-1.3<RP/RN<-0.9$.

In other words, the range shown as $-1.5<RP/RN<-0.8$ is effective for aberration correction but also reduces aberration variation at close focus. In this embodiment, since the focusing lens assembly with the positive power has the image plane curves forwards, the power balance with the non-spherical concave lens of the fixed lens assembly, which curves the image plane backwards, is numerically limited by way of the radius ratio of Petzval curvature.

An imaging lens assembly according to Embodiment 10 of the present application, for any of Embodiment 3 to Embodiment 9, a combined focal length F of the entire system with infinite focus and a distance D from an image plane to an virtual pupil, which is measured in the optical axis, comply with a correlation of $-0.6<D/F<-0.4$.

In this embodiment, the distance from an image plane to an virtual pupil is numerically limited to about ½ the combined focal length.

With regards to this, the Chief Ray diagram shown in the lower left portion of each odd-numbered drawing except FIG. 31 is referred to for illustration. The Chief Ray diagram can be obtained by inputting approximately minus focal length/2=D to Thick in the IMA plane of the lens data and depicting the light path diagram of the main ray. The three main rays from the half-diagonal, half long side, and half short side of the IMA plane intersect the optical axis in the negative direction. Once D where the main ray from the half long side intersects the optical axis is found by way of cut and try, it is realized that D=-8.6 in Embodiment 1, and this virtual plane is called a (virtual) projection pupil distance D. Specifically, the main ray emitting out of the last lens surface and a ray extending in an opposite direction to the direction of travel are considered. The position where the ray intersects the optical axis is defined as the (virtual) projection pupil. The distance between the imaging plane and the "(virtual) projection pupil" is D. For the main ray of the half long side in Embodiment 1, D=-8.6. In any embodiment, D/F, which is a value obtained by dividing the (virtual) projection pupil distance D by the combined focal length F, is within the range of less than -0.4 and greater than -0.6.

An imaging lens assembly according to Embodiment 11 of the present application, for any of Embodiment 1 to Embodiment 10, with a standard specification of 1/1.8 inch (9 mmΦ, 7.2×5.4 mm) imaging plane and ±14. 1° angle of view, a size range of the imaging plane is characterized to be ⅓ inch (6 mmΦ, 8×3.6 mm) to ⅔ inch (11 mmΦ, 8.8×6.6 mm) and a range of the angle of view is characterized to be ±14° to ±24.2°.

An imaging lens assembly according to Embodiment 12 of the present application, for any of Embodiment 1 to Embodiment 11, a single non-spherical negative lens, which forms the fixed lens assembly, is characterized to be integrated with a cover glass at an imaging lens side of an image sensor.

This embodiment, for example, as shown by Embodiment 13 to Embodiment 15 to be described later, the non-spherical concave lens forming the fixed lens assembly is integrated with a cover glass at an imaging lens side of an image sensor. In other words, the non-spherical concave lens can also be used as the cover glass at the imaging lens side of the image sensor. Accordingly, since the glass interfaces can be two fewer, a compact imaging lens with excellent optical properties can be provided. Herein, the integration of the lens and the cover glass is directed not only the case that the lens and the cover glass are laminated to each other, but also the case that the lens and the cover glass are integrally formed.

In the imaging lens designed under the above conditions, a CMOS element of a back-side illumination CMOS image sensor is miniaturized to even 1.4 μm×1.4 μm, and further by way of stacking, corresponds to an AI image input element even exhibiting an edge computer function. While a conventional imaging lens has been improved for roll-up film, since a back-side illumination stacked CMOS image sensor exhibits high-speed electronic image transfer and even an electronic shutter function, the space immediately in front of the sensor can be effectively used, and the arrangement of the non-spherical concave lens forming the fixed lens assembly with the minus power, which has a flat function of image plane upright, can be made easy. With a Galileo-type lens, image resolution was effective for silver salt film of ten plus micrometers, but by fixing a non-spherical concave lens of the fixed lens assembly near the miniaturized CMOS element, resolution of even 1.4 μmL&S is possible.

By way of the imaging lens according to the embodiment of the present application+back-side illumination stacked CMOS image sensor, an AI image means with an MTF contrast of more than 15% and preferably more than 20% at 1.4 μmL&S over the entire CMOS surface can be achieved.

DESCRIPTIONS OF EMBODIMENTS

Hereinafter, embodiments of the present application are described. Each of the 15 embodiments, from the first one to the fifteenth one, will be described with reference to two figures.

For example, in a case of Embodiment 1, the description is given with simultaneous reference to Chart 1 corresponding to Embodiment 1, Chart 2 corresponding to Embodiment 1 (shooting distance t0=∞, 500 mm, 150 mm), and FIGS.

2*a*-2*c*, which show graphs corresponding to MTF. The case of shooting distance t0=∞ is shown in (a), the case of shooting distance t0=500 mm is shown in (b), and the case of shooting distance t0=150 mm is shown in (c).

Likewise, in a case of the nth example (n=1~15), the description is given with simultaneous reference to Chart (2n-1) corresponding to the nth embodiment, Chart (2n) corresponding to the nth embodiment (shooting distance t0=∞, 500 mm, 150 mm or 200 mm), and FIGS. 2*a*-2*c*, which show graphs corresponding to MTF. The case of shooting distance t0=∞ is shown in (a), the case of shooting distance t0=500 mm is shown in (b), and the case of shooting distance t0=150 (200) mm is shown in (c).

Embodiment 1

Embodiment 1 (with reference to FIG. 1 and FIGS. 2*a*-2*c*) has an image size=1/1.8 inch 9 mmΦ, and includes a modified Gauss-type focusing lens assembly configured with four divisions and six pieces, one of which is a lens closest to the object side and having a meniscus shape, and one piece of non-spherical concave lens forming a fixed lens assembly. In more detail, the surface of the lens of the focusing lens assembly closest to the object side is a spherical surface, and the surface of the non-spherical concave lens of the fixed lens assembly at the object side is an aspheric surface.

As can be seen from FIG. 1, the focusing lens assembly includes respective 2-division-3-piece positive power at each of the object side and the imaging side, between which the aperture is interposed.

The value fP/F, which is obtained by dividing the focal length fP of the focusing lens assembly by the combined focal length F of the entirety of the imaging lens, is 0.9 at the shooting distance t0=∞, is 0.95 at t0=500 mm, and is 1.06 at t0=150 mm. The value fP/fN, which is obtained by dividing the focal length fP of the focusing lens assembly by the focal length fN of the non-spherical concave lens of the fixed lens assembly, is −1.322. The value RP/RN, which is obtained by dividing a radius RP of Petzval curvature of the focusing lens assembly by a radius RN of Petzval curvature of the non-spherical concave lens of the fixed lens assembly, is −1.087.

In addition, the value D/F, which is obtained by dividing the (virtual) projection pupil distance D by the combined focal length F of the entire system, is −0.478.

As can be seen from FIGS. 2*a*-2*c*, the MTF contrast at 357 LP=1.4 μmL&S is over about 20% over the entire image surface from infinity to 150 mm close-up, which is almost overlapping with the theoretical value and provides good aberration correction.

Embodiment 2

Embodiment 2 (with reference to FIG. 3 and FIGS. 4*a*-4*c*) has an image size=1/1.8 inch 9 mmΦ, and includes a 4-division-6-piece Gauss-type focusing lenses and one piece of non-spherical concave lens forming a fixed lens assembly. In more detail, the surface of one of the focusing lenses closest to the object side is an aspheric surface, and the surface of the non-spherical concave lens of the fixed lens assembly at the object side is an aspheric surface.

As can be seen from FIG. 3, the focusing lenses include respective 2-division-3-piece positive power at each of the object side and the imaging side, between which the aperture is interposed.

The value fP/F, which is obtained by dividing the focal length fP of the focusing lens assembly by the combined focal length F of the entirety of the imaging lens, is 0.89 at the shooting distance t0=∞, is 0.93 at t0=500 mm, and is 1.03 at t0=150 mm. The value fP/fN, which is obtained by dividing the focal length fP of the focusing lens assembly by the focal length fN of the non-spherical concave lens of the fixed lens assembly, is −1.269. The value RP/RN, which is obtained by dividing a radius RP of Petzval curvature of the focusing lens assembly by a radius RN of Petzval curvature of the non-spherical concave lens of the fixed lens assembly, is −1.199.

In addition, the value D/F, which is obtained by dividing the (virtual) projection pupil distance D by the combined focal length F of the entire system, is −0.534.

As can be seen from FIGS. 4*a*-4*c*, the MTF contrast of 357 LP=1.4 μmL&S is approximately 20% or above over the entire image surface from infinity to 150 mm close-up, which is almost overlapping with the theoretical value and provides good aberration correction.

Embodiment 3

Embodiment 3 (with reference to FIG. 5 and FIGS. 6*a*-6*c*) has an image size=1/1.8 inch 9 mmΦ, and includes a 4-division-6-piece Gauss-type focusing lens assembly and one piece of non-spherical concave lens forming a fixed lens assembly. In more detail, the surface of a lens of the focusing lens assembly closest to the object side is an aspheric surface, and the surface of the non-spherical concave lens of the fixed lens assembly at the object side is an aspheric surface.

As can be seen from FIG. 5, the focusing lens assembly includes respective 2-division-3-piece positive power at each of the object side and the imaging side, between which the aperture is interposed.

The value fP/F, which is obtained by dividing the focal length fP of the focusing lens assembly by the combined focal length F of the entirety of the imaging lens, is 0.91 at the shooting distance t0=∞, is 0.94 at t0=500 mm, and is 1.02 at t0=150 mm. The value fP/fN, which is obtained by dividing the focal length fP of the focusing lens assembly by the focal length fN of the non-spherical concave lens of the fixed lens assembly, is −1.261. The value RP/RN, which is obtained by dividing a radius RP of Petzval curvature of the focusing lens assembly by a radius RN of Petzval curvature of the non-spherical concave lens of the fixed lens assembly, is −0.982.

In addition, the value D/F, which is obtained by dividing the (virtual) projection pupil distance D by the combined focal length F of the entire system, is −0.505.

As can be seen from FIGS. 6*a*-6*c*, the MTF contrast of 357 LP=1.4 μmL&S is approximately 20% or above over the entire image surface from infinity to 150 mm close-up, which is almost overlapping with the theoretical value and provides good aberration correction.

Embodiment 4

Embodiment 4 (with reference to FIG. 7 and FIGS. 8*a*-8*c*) has an image size=1/1.8 inch 9 mmΦ, and includes a 4-division-6-piece Gauss-type focusing lens assembly and one piece of non-spherical concave lens forming a fixed lens assembly. In more detail, the surface of a lens of the focusing lens assembly closest to the object side is an aspheric surface, and the surface of the non-spherical concave lens of the fixed lens assembly at the object side is an aspheric surface.

As can be seen from FIG. 7, the focusing lens assembly includes respective 2-division-3-piece positive power at each of the object side and the imaging side, between which the aperture is interposed.

The value fP/F, which is obtained by dividing the focal length fP of the focusing lens assembly by the combined focal length F of the entirety of the imaging lens, is 0.89 at the shooting distance t0=∞, is 0.92 at t0=500 mm, and is 0.99 at t0=150 mm. The value fP/fN, which is obtained by dividing the focal length fP of the focusing lens assembly by the focal length fN of the non-spherical concave lens of the fixed lens assembly, is −1.291. The value RP/RN, which is obtained by dividing a radius RP of Petzval curvature of the focusing lens assembly by a radius RN of Petzval curvature of the non-spherical concave lens of the fixed lens assembly, is −0.993.

In addition, the value D/F, which is obtained by dividing the (virtual) projection pupil distance D by the combined focal length F of the entire system, is −0.505.

As can be seen from FIGS. 8a-8c, the MTF contrast of 357 LP=1.4 μmL&S is approximately 20% or above over the entire image surface from infinity to 150 mm close-up, which is almost overlapping with the theoretical value and provides good aberration correction.

Embodiment 5

Embodiment 5 (with reference to FIG. 9 and FIGS. 10a-10c) has an image size=1/1.8 inch 9 mmΦ, and includes a 4-division-6-piece Gauss-type focusing lens assembly and one piece of non-spherical concave lens forming a fixed lens assembly. In more detail, the surface of a lens of the focusing lens assembly closest to the object side is an aspheric surface, and the surface of the non-spherical concave lens of the fixed lens assembly at the object side is an aspheric surface.

As can be seen from FIG. 9, the focusing lens assembly includes respective 2-division-3-piece positive power at each of the object side and the imaging side, between which the aperture is interposed.

The value fP/F, which is obtained by dividing the focal length fP of the focusing lens assembly by the combined focal length F of the entirety of the imaging lens, is 0.88 at the shooting distance t0=∞, is 0.90 at t0=500 mm, and is 0.96 at t0=150 mm. The value fP/fN, which is obtained by dividing the focal length fP of the focusing lens assembly by the focal length fN of the non-spherical concave lens of the fixed lens assembly, is −1.285. The value RP/RN, which is obtained by dividing a radius RP of Petzval curvature of the focusing lens assembly by a radius RN of Petzval curvature of the non-spherical concave lens of the fixed lens assembly, is −0.991.

In addition, the value D/F, which is obtained by dividing the (virtual) projection pupil distance D by the combined focal length F of the entire system, is −0.520.

As can be seen from FIGS. 10a-10c, the MTF contrast of 357 LP=1.4 μmL&S is approximately 20% or above over the entire image surface from infinity to 150 mm close-up, which is almost overlapping with the theoretical value and provides good aberration correction.

Embodiment 6

Embodiment 6 (with reference to FIG. 11 and FIGS. 12a-12c) has an image size=1/1.8 inch 9 mmΦ, and includes a 4-division-6-piece Gauss-type focusing lens assembly and one piece of non-spherical concave lens forming a fixed lens assembly. In more detail, the surface of one of the focusing lenses closest to the object side is an aspheric surface, and the surface of the non-spherical concave lens of the fixed lens assembly at the object side is an aspheric surface.

As can be seen from FIG. 11, the focusing lens assembly includes respective 2-division-3-piece positive power at each of the object side and the imaging side, between which the aperture is interposed.

The value fP/F, which is obtained by dividing the focal length fP of the focusing lens assembly by the combined focal length F of the entirety of the imaging lens, is 0.87 at the shooting distance t0=∞, is 0.89 at t0=500 mm, and is 0.94 at t0=150 mm. The value fP/fN, which is obtained by dividing the focal length fP of the focusing lens assembly by the focal length fN of the non-spherical concave lens of the fixed lens assembly, is −1.296. The value RP/RN, which is obtained by dividing a radius RP of Petzval curvature of the focusing lens assembly by a radius RN of Petzval curvature of the non-spherical concave lens of the fixed lens assembly, is −0.967.

In addition, the value D/F, which is obtained by dividing the (virtual) projection pupil distance D by the combined focal length F of the entire system, is −0.545.

As can be seen from FIGS. 12a-12c, the MTF contrast of 357 LP=1.4 μmL&S is approximately 20% or above over the entire image surface from 500 mm to 150 mm close-up, which is almost overlapping with the theoretical value and provides good aberration correction.

Even at the four corners of the image at infinity, MTF of more than 15% is obtained, and since MTF of more than 20% is obtained over the entire image surface from 500 mm to 150 mm close-up, it can be said to achieve the resolution corresponding to the miniaturized image sensor element.

Embodiment 7

In the above Embodiments 1-6, the image size is 1/1.8 inch 9 mmΦ, and in the following Embodiments 7~9, the image size is enlarged by 1.22 times to reach ⅔ inch, under which the effectiveness was confirmed. Embodiment 7 (with reference to FIG. 13 and FIGS. 14a-14c) has an image size=⅔ inch 11 mmΦ, and like Embodiment 1, includes a 4-division-6-piece modified Gauss-type focusing lens assembly and one piece of non-spherical concave lens forming a fixed lens assembly. In more detail, the surface of one of the focusing lenses closest to the object side is a spherical surface, and the surface of the non-spherical concave lens of the fixed lens assembly at the object side is an aspheric surface.

As can be seen from FIG. 13, the focusing lens assembly includes respective 2-division-3-piece positive power at each of the object side and the imaging side, between which the aperture is interposed.

The value fP/F, which is obtained by dividing the focal length fP of the focusing lens assembly by the combined focal length F of the entirety of the imaging lens, is 0.91 at the shooting distance t0=∞, is 0.96 at t0=500 mm, and is 1.06 at t0=200 mm. The value fP/fN, which is obtained by dividing the focal length fP of the focusing lens assembly by the focal length fN of the non-spherical concave lens of the fixed lens assembly, is −1.452. The value RP/RN, which is obtained by dividing a radius RP of Petzval curvature of the focusing lens assembly by a radius RN of Petzval curvature of the non-spherical concave lens of the fixed lens assembly, is −1.107.

In addition, the value D/F, which is obtained by dividing the (virtual) projection pupil distance D by the combined focal length F of the entire system, is −0.485.

Since Embodiment 7 is optimized from Embodiment 1 by enlarging (⅔ inch)/(1/1.8 inch)=1.222 times, as can be seen from FIGS. 14*a*-14*c*, at the shooting distances t0=∞ and t0=500 mm, MTF is a little down as aberration is also enlarged. At t0=200 mm, which is about 1.222 times the close-up distance t0=150 mm, MTF was calculated and confirmed to be a little down in comparison with Embodiment 1. However, at the four corners of the image at infinity, MTF of more than 15% can still be obtained. Furthermore, MTF of more than 20% is obtained over the entire image surface from 500 mm to 200 mm close-up, which is almost overlapping with the theoretical value and provides good aberration correction.

Embodiment 8

In Embodiment 8, the image size is enlarged from 1/1.18 inch of that of Embodiment 4 by 1.222 times to reach ⅔ inch, under which the effectiveness was confirmed. Embodiment 8 (with reference to FIG. 15 and FIGS. 16*a*-16*c*) has an image size=⅔ inch 11 mmΦ, and like Embodiment 4, includes a 4-division-6-piece Gauss-type focusing lens assembly and one piece of non-spherical concave lens forming a fixed lens assembly. In more detail, the surface of one of the focusing lenses closest to the object side is an aspheric surface, and the surface of the non-spherical concave lens of the fixed lens assembly at the object side is an aspheric surface.

As can be seen from FIG. 15, the focusing lens assembly includes respective 2-division-3-piece positive power at each of the object side and the imaging side, between which the aperture is interposed.

The value fP/F, which is obtained by dividing the focal length fP of the focusing lens assembly by the combined focal length F of the entirety of the imaging lens, is 0.89 at the shooting distance t0=∞, is 0.92 at t0=500 mm, and is 0.98 at t0=200 mm. The value fP/fN, which is obtained by dividing the focal length fP of the focusing lens assembly by the focal length fN of the non-spherical concave lens of the fixed lens assembly, is −1.292. The value RP/RN, which is obtained by dividing a radius RP of Petzval curvature of the focusing lens assembly by a radius RN of Petzval curvature of the non-spherical concave lens of the fixed lens assembly, is −0.990.

In addition, the value D/F, which is obtained by dividing the (virtual) projection pupil distance D by the combined focal length F of the entire system, is −0.503.

Since Embodiment 8 is optimized from Embodiment 4 by enlarging (⅔ inch)/(1/1.8 inch)=1.222 times, at the shooting distances t0=c and t0=500 mm, MTF is a little down as aberration is also enlarged. At t0=200 mm, which is about 1.222 times the close-up distance t0=150 mm, MTF was calculated and confirmed to be a little down in comparison with Embodiment 4. However, at the four corners of the image at infinity, MTF of more than 15% can still be obtained. Furthermore, MTF of more than 20% is obtained over the entire image surface from 500 mm to 200 mm close-up, which is almost overlapping with the theoretical value and provides good aberration correction.

Embodiment 9

In Embodiment 9, the image size is enlarged from 1/1.18 inch of that of Embodiment 6 by 1.222 times to reach ⅔ inch, under which the effectiveness was confirmed. Embodiment 9 (with reference to FIG. 17 and FIGS. 18*a*-18*c*) has an image size=⅔ inch 11 mmΦ, and like Embodiment 6, includes a 4-division-6-piece Gauss-type focusing lens assembly and one piece of non-spherical concave lens forming a fixed lens assembly. In more detail, the surface of a lens of the focusing lens assembly closest to the object side is an aspheric surface, and the surface of the non-spherical concave lens of the fixed lens assembly at the object side is an aspheric surface.

As can be seen from FIG. 17, the focusing lens assembly includes respective 2-division-3-piece positive power at each of the object side and the imaging side, between which the aperture is interposed.

The value fP/F, which is obtained by dividing the focal length fP of the focusing lens assembly by the combined focal length F of the entirety of the imaging lens, is 0.86 at the shooting distance t0=∞, is 0.89 at t0=500 mm, and is 0.93 at t0=200 mm. The value fP/fN, which is obtained by dividing the focal length fP of the focusing lens assembly by the focal length fN of the non-spherical concave lens of the fixed lens assembly, is −1.316. The value RP/RN, which is obtained by dividing a radius RP of Petzval curvature of the focusing lens assembly by a radius RN of Petzval curvature of the non-spherical concave lens of the fixed lens assembly, is −1.024.

In addition, the value D/F, which is obtained by dividing the (virtual) projection pupil distance D by the combined focal length F of the entire system, is −0.549.

Since Embodiment 9 is optimized from Embodiment 6 by enlarging (⅔ inch)/(1/1.8 inch)=1.222 times, at the shooting distances t0=c and t0=500 mm, MTF is a little down as aberration is also enlarged. At t0=200 mm, which is about 1.222 times the close-up distance t0=150 mm, MTF was calculated and confirmed to be a little down in comparison with Embodiment 6. However, at the four corners of the image at infinity, MTF of more than 15% can still be obtained. Furthermore, MTF of more than 20% is obtained over the entire image surface from 500 mm to 200 mm close-up, which is almost overlapping with the theoretical value and provides good aberration correction.

Embodiment 10

In the above Embodiments 1~6, the image size is 1/1.8 inch 9 mmΦ, and in the following Embodiments 10~12, the image size is reduced by 0.667 times to reach ⅓ inch, under which the effectiveness was confirmed. Embodiment 10 (with reference to FIG. 19 and FIGS. 20*a*-20*c*) has an image size=⅓ inch 6 mmΦ, and like Embodiment 1, includes a 4-division-6-piece modified Gauss-type focusing lens assembly and one piece of non-spherical concave lens forming a fixed lens assembly. In more detail, the surface of a lens of the focusing lens assembly closest to the object side is a spherical surface, and the surface of the non-spherical concave lens of the fixed lens assembly at the object side is an aspheric surface.

As can be seen from FIG. 19, the focusing lens assembly includes respective 2-division-3-piece positive power at each of the object side and the imaging side, between which the aperture is interposed.

The value fP/F, which is obtained by dividing the focal length fP of the focusing lens assembly by the combined focal length F of the entirety of the imaging lens, is 0.89 at the shooting distance t0=∞, is 0.92 at t0=500 mm, and is 0.99 at t0=150 mm. The value fP/fN, which is obtained by dividing the focal length fP of the focusing lens assembly by the focal length fN of the non-spherical concave lens of the fixed lens assembly, is −1.373. The value RP/RN, which is obtained by dividing a radius RP of Petzval curvature of the focusing lens assembly by a radius RN of Petzval curvature of the non-spherical concave lens of the fixed lens assembly, is −1.036.

In addition, the value D/F, which is obtained by dividing the (virtual) projection pupil distance D by the combined focal length F of the entire system, is −0.486.

Since Embodiment 10 is optimized from Embodiment 1 by reducing (⅓ inch)/(1/1.8 inch)=0.667 times, as shown in FIGS. 20a-20c, MTF is a little improved as aberration is also reduced. It is approximately 25% or above over the entire image surface from infinity to 150 mm close-up, which is almost overlapping with the theoretical value and provides good aberration correction.

Embodiment 11

In Embodiment 11, the image size is reduced from 1/1.18 inch of that of Embodiment 4 by 0.667 times to reach ⅓ inch, under which the effectiveness was confirmed. Embodiment 11 (with reference to FIG. 21 and FIGS. 22a-22c) has an image size=⅓ inch 6 mmΦ, and like Embodiment 4, includes a 4-division-6-piece Gauss-type focusing lens assembly and one piece of non-spherical concave lens forming a fixed lens assembly. In more detail, the surface of one of the focusing lenses closest to the object side is an aspheric surface, and the surface of the non-spherical concave lens of the fixed lens assembly at the object side is an aspheric surface.

As can be seen from FIG. 21, the focusing lens assembly includes respective 2-division-3-piece positive power at each of the object side and the imaging side, between which the aperture is interposed.

The value fP/F, which is obtained by dividing the focal length fP of the focusing lens assembly by the combined focal length F of the entirety of the imaging lens, is 0.86 at the shooting distance t0=∞, is 0.88 at t0=500 mm, and is 0.93 at t0=150 mm. The value fP/fN, which is obtained by dividing the focal length fP of the focusing lens assembly by the focal length fN of the non-spherical concave lens of the fixed lens assembly, is −1.322. The value RP/RN, which is obtained by dividing a radius RP of Petzval curvature of the focusing lens assembly by a radius RN of Petzval curvature of the non-spherical concave lens of the fixed lens assembly, is −0.997.

In addition, the value D/F, which is obtained by dividing the (virtual) projection pupil distance D by the combined focal length F of the entire system, is −0.525.

Since Embodiment 11 is optimized from Embodiment 4 by reducing (⅓ inch)/(1/1.8 inch)=0.667 times, as shown in FIGS. 22a-22c, MTF is a little improved as aberration is also reduced. It is approximately 25% or above over the entire image surface from infinity to 150 mm close-up, which is almost overlapping with the theoretical value and provides good aberration correction.

Embodiment 12

In Embodiment 12, the image size is reduced from 1/1.18 inch of that of Embodiment 6 by 0.667 times to reach ⅓ inch, under which the effectiveness was confirmed. Embodiment 12 (with reference to FIG. 23 and FIGS. 24a-24c) has an image size=⅓ inch 6 mmΦ, and like Embodiment 6, includes a 4-division-6-piece Gauss-type focusing lens assembly and one piece of non-spherical concave lens forming a fixed lens assembly. In more detail, the surface of a lens of the focusing lens assembly closest to the object side is an aspheric surface, and the surface of the non-spherical concave lens of the fixed lens assembly at the object side is an aspheric surface.

As can be seen from FIG. 23, the focusing lens assembly includes respective 2-division-3-piece positive power at each of the object side and the imaging side, between which the aperture is interposed.

The value fP/F, which is obtained by dividing the focal length fP of the focusing lens assembly by the combined focal length F of the entirety of the imaging lens, is 0.83 at the shooting distance t0=∞, is 0.84 at t0=500 mm, and is 0.87 at t0=150 mm. The value fP/fN, which is obtained by dividing the focal length fP of the focusing lens assembly by the focal length fN of the non-spherical concave lens of the fixed lens assembly, is −1.239. The value RP/RN, which is obtained by dividing a radius RP of Petzval curvature of the focusing lens assembly by a radius RN of Petzval curvature of the non-spherical concave lens of the fixed lens assembly, is −0.947.

In addition, the value D/F, which is obtained by dividing the (virtual) projection pupil distance D by the combined focal length F of the entire system, is −0.536.

Since Embodiment 12 is optimized from Embodiment 6 by reducing (⅓ inch)/(1/1.8 inch)=0.667 times, as shown in FIGS. 24a-24c, MTF is a little improved as aberration is also reduced. It is approximately 20% or above over the entire image surface from infinity to 150 mm close-up, which is almost overlapping with the theoretical value and provides good aberration correction.

Embodiment 13

In Embodiment 13 (with reference to FIG. 25 and FIGS. 26a-26c), the non-spherical concave lens of the fixed lens assembly as shown in Embodiment 1 is integrated with a cover glass at an imaging lens side of an image sensor. In other words, the non-spherical concave lens can also be used as the cover glass at the imaging lens side of the image sensor. Accordingly, since the glass interfaces can be two fewer, excellent optical properties can be expected. The other configurations are the same as those of Embodiment 1.

The value fP/F, which is obtained by dividing the focal length fP of the focusing lens assembly by the combined focal length F of the entirety of the imaging lens, is 0.96 at the shooting distance t0=∞, is 1.01 at t0=500 mm, and is 1.13 at t0=150 mm. The value fP/fN, which is obtained by dividing the focal length fP of the focusing lens assembly by the focal length fN of the non-spherical concave lens of the fixed lens assembly, is −1.456. The value RP/RN, which is obtained by dividing a radius RP of Petzval curvature of the focusing lens assembly by a radius RN of Petzval curvature of the non-spherical concave lens of the fixed lens assembly, is −1.231.

In addition, the value D/F, which is obtained by dividing the (virtual) projection pupil distance D by the combined focal length F of the entire system, is −0.488.

As can be seen from FIGS. 26a-26c, almost the same MTF as Embodiment 1 can be obtained. The MTF contrast of 357 LP=1.4 μmL&S is approximately 20% or above over the entire image surface from infinity to 150 mm close-up, which is almost overlapping with the theoretical value and provides good aberration correction.

Embodiment 14

In Embodiment 14 (with reference to FIG. 27 and FIGS. 28a-28c), the non-spherical concave lens of the fixed lens assembly as shown in Embodiment 4 is integrated with a CMOS cover glass. Since the glass interfaces can be two fewer, excellent optical properties can be expected. The other configurations are the same as those of Embodiment 4.

The value fP/F, which is obtained by dividing the focal length fP of the focusing lens assembly by the combined focal length F of the entirety of the imaging lens, is 0.95 at the shooting distance t0=∞, is 0.98 at t0=500 mm, and is 1.05 at t0=150 mm. The value fP/fN, which is obtained by dividing the focal length fP of the focusing lens assembly by the focal length fN of the non-spherical concave lens of the fixed lens assembly, is −1.217. The value RP/RN, which is obtained by dividing a radius RP of Petzval curvature of the focusing lens assembly by a radius RN of Petzval curvature of the non-spherical concave lens of the fixed lens assembly, is −0.997.

In addition, the value D/F, which is obtained by dividing the (virtual) projection pupil distance D by the combined focal length F of the entire system, is −0.498.

As can be seen from FIGS. 28a-28c, almost the same MTF as Embodiment 4 can be obtained. The MTF contrast of 357 LP=1.4 μmL&S is approximately 20% or above over the entire image surface from infinity to 150 mm close-up, which is almost overlapping with the theoretical value and provides good aberration correction.

Embodiment 15

In Embodiment 15 (with reference to FIG. 29 and FIGS. 30a-30c), the non-spherical concave lens of the fixed lens assembly as shown in Embodiment 6 is integrated with a CMOS cover glass. Since the glass interfaces can be two fewer, excellent optical properties can be expected. In Embodiment 6, the "imaging side" surface of one of the focusing lenses closest to the object side is an aspheric surface, and in Embodiment 15, the "object side" surface of the one of the focusing lenses closest to the object side is an aspheric surface.

The value fP/F, which is obtained by dividing the focal length fP of the focusing lens assembly by the combined focal length F of the entirety of the imaging lens, is 0.93 at the shooting distance t0=∞, is 0.96 at t0=500 mm, and is 1.01 at t0=150 mm. The value fP/fN, which is obtained by dividing the focal length fP of the focusing lens assembly by the focal length fN of the non-spherical concave lens of the fixed lens assembly, is −1.264. The value RP/RN, which is obtained by dividing a radius RP of Petzval curvature of the focusing lens assembly by a radius RN of Petzval curvature of the non-spherical concave lens of the fixed lens assembly, is −1.013.

In addition, the value D/F, which is obtained by dividing the (virtual) projection pupil distance D by the combined focal length F of the entire system, is −0.507.

As can be seen from FIG. 30, almost the same MTF as Embodiment 6 can be obtained. For 357 LP=1.4 μmL&S MTF contrast, at the four corners of the image at infinity, MTF of more than 15% can still be obtained. Furthermore, MTF of slightly less than 20% is obtained over the entire image surface from 500 mm to 150 mm close-up, which provides good aberration correction.

FIG. 31 summarizes and records corresponding values under the various conditions described above for all of Embodiment 1 through Embodiment 15 described above. From the values, it is understood that each of the above-mentioned correlations is supported by each embodiment, and as shown in the figure indicating imaging performance for each embodiment, extremely excellent imaging performance is maintained on the imaging plane with a wide diagonal field of view, not only at infinity but also at close range in the focusing state.

What is claimed is:

1. An imaging lens, comprising:
    a focusing lens assembly with a positive refractive power, enabled to move in a direction of an optical axis depending on an object distance; and
    a fixed lens assembly with a negative refractive power, fixedly disposed in a vicinity of an imaging plane,
    wherein the focusing lens assembly comprises two positive lens groups with an aperture disposed therebetween;
    the focusing lens assembly comprises, sequentially from the object side, a 2-division-3-piece front group with a positive refractive power consisting of a single lens and doublet lenses, the aperture, and a 2-division-3-piece back group with a positive refractive power consisting of doublet lenses and a single lens; and
    one of the lens of the focusing lens assembly, which is closest to the object side, is a meniscus lens that is convex at the object side and concave at an image side, and has a weakest refractive power out of all, and the front group and the back group, between which the aperture is disposed, have respective focal lengths f1 and f2 complying with a correlation of 0.9<f1/f2<1.3.

2. An imaging lens, comprising:
    a focusing lens assembly with a positive refractive power, enabled to move in a direction of an optical axis depending on an object distance; and
    a fixed lens assembly with a negative refractive power, fixedly disposed in a vicinity of an imaging plane,
    wherein the focusing lens assembly comprises two positive lens groups with an aperture disposed therebetween;
    the focusing lens assembly comprises, sequentially from the object side, a 2-division-3-piece front group with a positive refractive power consisting of a single lens and doublet lenses, the aperture, and a 2-division-3-piece back group with a positive refractive power consisting of doublet lenses and a single lens; and
    a surface of the back group at an aperture side for forming a space of the aperture of the focusing lens assembly, is a planar surface or a convex surface at the object side other than a concave surface, and the front group and the back group, between which the aperture is disposed, have respective focal lengths f1 and f2 complying with a correlation of 3.0<f1/f2<4.0.

3. An imaging lens, comprising:
    a focusing lens assembly with a positive refractive power, enabled to move in a direction of an optical axis depending on an object distance; and
    a fixed lens assembly with a negative refractive power, fixedly disposed in a vicinity of an imaging plane,
    wherein the focusing lens assembly comprises two positive lens groups with an aperture disposed therebetween;
    the focusing lens assembly comprises, sequentially from the object side, a 2-division-3-piece front group with a positive refractive power consisting of a single lens and doublet lenses, the aperture, and a 2-division-3-piece back group with a positive refractive power consisting of doublet lenses and a single lens;
    the front group and the back group of the focusing lens assembly have respective focal lengths f1 and f2 complying with a correlation of 0.9<f1/f2<6.0; and a combined focal length F of the entire system with infinite focus and a focal length fP of the focusing lens assembly comply with a correlation of 0.8<fP/F<1.2.

4. The imaging lens according to claim 3, wherein the focal length fP of the focusing lens assembly and a focal length fN of the fixed lens assembly comply with a correlation of −1.5<fP/fN<−1.1.

5. An imaging lens, comprising:
a focusing lens assembly with a positive refractive power, enabled to move in a direction of an optical axis depending on an object distance; and
a fixed lens assembly with a negative refractive power, fixedly disposed in a vicinity of an imaging plane,
wherein the focusing lens assembly comprises two positive lens groups with an aperture disposed therebetween; and
a single non-spherical negative lens, which forms the fixed lens assembly with the negative refractive power fixedly disposed in the vicinity of the imaging plane, is integrated with a cover glass at an imaging lens side of an image sensor.

6. The imaging lens according to claim 5, wherein a radius RP of Petzval curvature of the focusing lens assembly and a radius RN of Petzval curvature of a negative lens, which forms the fixed lens assembly, comply with a correlation of −1.3<RP/RN<−0.9.

7. The imaging lens according to claim 5, wherein a combined focal length F of the entire system with infinite focus and a distance D from an image plane to an virtual pupil, which is measured in the optical axis, comply with a correlation of −0.6<D/F<−0.4.

8. The imaging lens according to claim 5, wherein with a standard specification of 1/1.8 inch (9 mmΦ, 7.2×5.4 mm) imaging plane and ±19.1° angle of view, a size range of the imaging plane is characterized to be ⅓ inch (6 mmΦ, 8×3.6 mm) to ⅔ inch (11 mmΦ, 8.8×6.6 mm) and a range of the angle of view is characterized to be ±14° to ±24.2°.

9. The imaging lens according to claim 4, wherein a radius RP of Petzval curvature of the focusing lens assembly and a radius RN of Petzval curvature of a negative lens, which forms the fixed lens assembly, comply with a correlation of −1.3<RP/RN<−0.9.

10. The imaging lens according to claim 4, wherein a combined focal length F of the entire system with infinite focus and a distance D from an image plane to an virtual pupil, which is measured in the optical axis, comply with a correlation of −0.6<D/F<−0.4.

11. The imaging lens according to claim 4, wherein with a standard specification of 1/1.8 inch (9 mmΦ, 7.2×5.4 mm) imaging plane and ±19.1° angle of view, a size range of the imaging plane is characterized to be ⅓ inch (6 mmΦ, 8×3.6 mm) to ⅔ inch (11 mmΦ, 8.8×6.6 mm) and a range of the angle of view is characterized to be ±14° to ±24.2°.

12. The imaging lens according to claim 3, wherein a radius RP of Petzval curvature of the focusing lens assembly and a radius RN of Petzval curvature of a negative lens, which forms the fixed lens assembly, comply with a correlation of −1.3<RP/RN<−0.9.

13. The imaging lens according to claim 3, wherein a combined focal length F of the entire system with infinite focus and a distance D from an image plane to an virtual pupil, which is measured in the optical axis, comply with a correlation of −0.6<D/F<−0.4.

14. The imaging lens according to claim 3, wherein with a standard specification of 1/1.8 inch (9 mmΦ, 7.2×5.4 mm) imaging plane and +19.1° angle of view, a size range of the imaging plane is characterized to be ⅓ inch (6 mmΦ, 8×3.6 mm) to ⅔ inch (11 mmΦ, 8.8×6.6 mm) and a range of the angle of view is characterized to be ±14° to ±24.2°.

15. The imaging lens according to claim 2, wherein a radius RP of Petzval curvature of the focusing lens assembly and a radius RN of Petzval curvature of a negative lens, which forms the fixed lens assembly, comply with a correlation of −1.3<RP/RN<−0.9.

16. The imaging lens according to claim 2, wherein a combined focal length F of the entire system with infinite focus and a distance D from an image plane to an virtual pupil, which is measured in the optical axis, comply with a correlation of −0.6<D/F<−0.4.

17. The imaging lens according to claim 2, wherein with a standard specification of 1/1.8 inch (9 mmΦ, 7.2×5.4 mm) imaging plane and =19.1° angle of view, a size range of the imaging plane is characterized to be ⅓ inch (6 mmΦ, 8×3.6 mm) to ⅔ inch (11 mmΦ, 8.8×6.6 mm) and a range of the angle of view is characterized to be ±14° to ±24.2°.

18. The imaging lens according to claim 1, wherein a radius RP of Petzval curvature of the focusing lens assembly and a radius RN of Petzval curvature of a negative lens, which forms the fixed lens assembly, comply with a correlation of −1.3<RP/RN<−0.9.

19. The imaging lens according to claim 1, wherein a combined focal length F of the entire system with infinite focus and a distance D from an image plane to an virtual pupil, which is measured in the optical axis, comply with a correlation of −0.6<D/F<−0.4.

20. The imaging lens according to claim 1, wherein with a standard specification of 1/1.8 inch (9 mmΦ, 7.2×5.4 mm) imaging plane and =19.1° angle of view, a size range of the imaging plane is characterized to be ⅓ inch (6 mmΦ, 8×3.6 mm) to ⅔ inch (11 mmΦ, 8.8×6.6 mm) and a range of the angle of view is characterized to be ±14° to ±24.2°.

\* \* \* \* \*